(12) United States Patent
Ben-Harosh

(10) Patent No.: US 9,514,065 B2
(45) Date of Patent: Dec. 6, 2016

(54) HOST DEVICE COUPLED TO A USB PERIPHERAL AND METHOD OF OPERATING THE SAME

(75) Inventor: Almog Ben-Harosh, Pardes Hanna (IL)

(73) Assignee: MCE-SYS LTD., Tel Aviv (IL)

( * ) Notice: Subject to any disclaimer, the term of this patent is extended or adjusted under 35 U.S.C. 154(b) by 0 days.

(21) Appl. No.: 13/990,041

(22) PCT Filed: Aug. 2, 2011

(86) PCT No.: PCT/IB2011/053440
§ 371 (c)(1),
(2), (4) Date: May 29, 2013

(87) PCT Pub. No.: WO2012/073126
PCT Pub. Date: Jun. 7, 2012

(65) Prior Publication Data
US 2014/0019651 A1    Jan. 16, 2014

Related U.S. Application Data

(60) Provisional application No. 61/417,460, filed on Nov. 29, 2010, provisional application No. 61/439,394, (Continued)

(51) Int. Cl.
*G06F 13/12* (2006.01)
*G06F 13/10* (2006.01)
(Continued)

(52) U.S. Cl.
CPC .......... *G06F 13/102* (2013.01); *G06F 9/4413* (2013.01); *G06F 13/385* (2013.01); *G06F 13/387* (2013.01)

(58) Field of Classification Search
CPC .. G06F 9/4413; G06F 9/4415; G06F 41/0809; G06F 13/102; G06F 13/385; G06F 13/387
(Continued)

(56) References Cited

U.S. PATENT DOCUMENTS 7,082,598 B1    7/2006  Le et al.
2004/0073912 A1*  4/2004  Meza .......................... 719/321
(Continued)

OTHER PUBLICATIONS

EP Communication for EP 11844416 dated Feb. 10, 2015.
(Continued)

*Primary Examiner* — Ernest Unelus
(74) *Attorney, Agent, or Firm* — Marc Van Dyke; Fourth Dimension IP

(57) ABSTRACT

Embodiments of the present invention relate to methods and apparatus for operating a host device (e.g. a 'plug-and-play' host device) coupled to a peripheral device (e.g. a mobile phone). In some embodiments, the host device may analyzed peripheral device-descriptive data (e.g. including but not limited to USB endpoint data) and determine information about the peripheral device in accordance with the results of the analysis. Operations that may be carried out by the host device in accordance with results of the analysis include but are not limited to protocol selection, retrieval of cell phone data, and determining software or hardware resource(s) of the peripheral device. In some embodiments, it is possible to actively suppress natural OS behavior whereby a device driver(s) specified by the peripheral device (e.g. in a hardware identifier) is loaded by the host device. For example, it is possible to load a surrogate driver instead. In one example, the hardware identifier is intercepted and not forwarded to a plug-and-play manager executing on the host device.

31 Claims, 39 Drawing Sheets

Related U.S. Application Data filed on Feb. 4, 2011, provisional application No. 61/497,224, filed on Jun. 15, 2011, provisional application No. 61/513,610, filed on Jul. 31, 2011.

(51) Int. Cl.
  *G06F 13/38* (2006.01)
  *G06F 9/44* (2006.01)
(58) Field of Classification Search
  USPC .......................................................... 710/16
  See application file for complete search history.

(56) References Cited

U.S. PATENT DOCUMENTS

| | | |
|---|---|---|
| 2006/0200612 A1 | 9/2006 | Hamid et al. |
| 2007/0174535 A1 | 7/2007 | Lou et al. |
| 2007/0264983 A1 | 11/2007 | Chen et al. |
| 2008/0208787 A1* | 8/2008 | Luchene .......................... 706/47 |
| 2009/0305789 A1* | 12/2009 | Patil ................................ 463/42 |
| 2010/0066677 A1 | 3/2010 | Garrett et al. |
| 2010/0185785 A1 | 7/2010 | Wu et al. |
| 2010/0274801 A1* | 10/2010 | Tomoda ......................... 707/769 |

OTHER PUBLICATIONS

Annex to EP Communication for EP 11844416 dated Feb. 10, 2015.
Universal Serial Bus Specification Revision V2.; Apr. 27, 2000.
International Search Report for PCT/IB2011/053440 published as WO2012073126.
Written Opinion for PCT/IB2011/053440 published as WO2012073126.
International Preliminary Report for PCT/IB2011/053440 published as WO2012073126.
European Search Report for EP 11844416 mailed Jun. 12, 2014 now published as EP 2646924.
Supplemental European Search Report for EP 11844416 mailed Jun. 12, 2014 now published as EP 2646924.
EP Communication for EP 11844416 dated Jul. 1, 2014.
Office Action for U.S. Appl. No. 13/149,642 (now abandoned)—Office Action Mailed on Mar. 21, 2013.

* cited by examiner

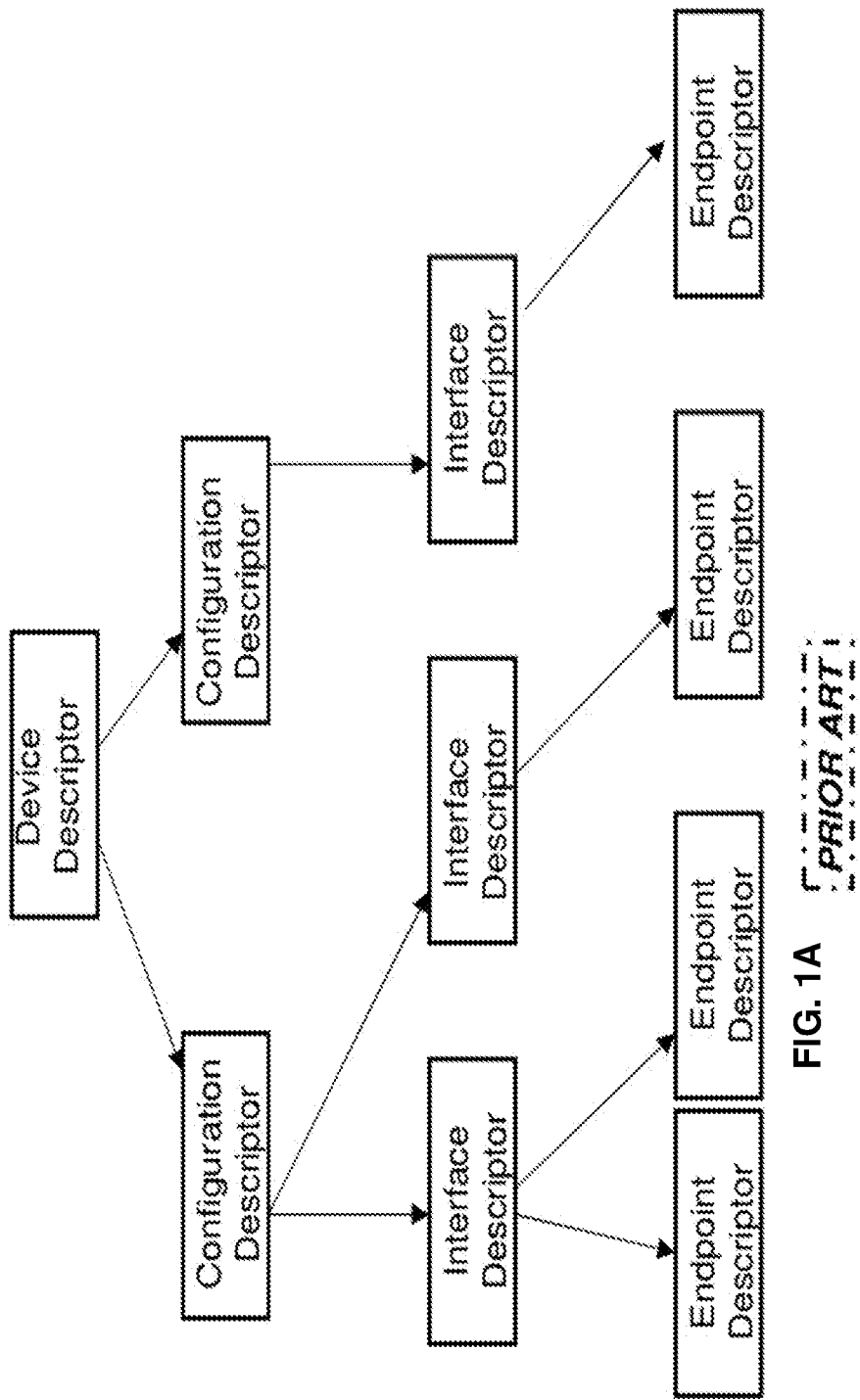
FIG. 1A  *PRIOR ART*

Interface Descriptor Struct

| Offset | Field | Size | Value | Description |
|---|---|---|---|---|
| 0 | bLength | 1 | Number | Size of Descriptor |
| 1 | bDescriptorType | 1 | Constant | Interface Descriptor (0x04) |
| 2 | bInterfaceNumber | 1 | Number | Number of Interface |
| 3 | bAlternateSetting | 1 | Number | Value used to select alternative setting |
| 4 | bNumEndpoints | 1 | Number | Number of Endpoints used for this interface |
| 5 | bInterfaceClass | 1 | Class | Class Code (Assigned by USB Org) |
| 6 | bInterfaceSubClass | 1 | SubClass | Subclass Code (Assigned by USB Org) |
| 7 | bInterfaceProtocol | 1 | Protocol | Protocol Code (Assigned by USB Org) |
| 8 | iInterface | 1 | Index | Index of String Descriptor Describing this interface |

FIG. 1B

*PRIOR ART*

Endpoint Descriptor Struct

| Offset | Field | Size | Value | Description |
|---|---|---|---|---|
| 0 | bLength | 1 | Number | Size of Descriptor |
| 1 | bDescriptorType | 1 | Constant | Endpoint Descriptor (0x06) |
| 2 | bEndpointAddress | 1 | Endpoint | Endpoint Address (Bits 0-3b Endpoint number) (Bit 7 Direction (in or out)) |
| 3 | bmAttributes | 1 | Bitmap | Bits 0-1 Transfer type (i.e. control, isochronous, bulk, or interrupt) If isochronous endpoint, Bits 3..2 = Synchronization type (Iso Mode) (i.e. no synchronization, asynchronous, adaptive, synchronous) Bits 5..4 = Usage Type (data endpoint, feedback endpoint, explicit feedback data endpoint) |
| 4 | wMaxPacketSize | 2 | Number | Maximum packet size |
| 6 | bInterval | 1 | Number | Control endpoint |

FIG. 1C

*PRIOR ART*

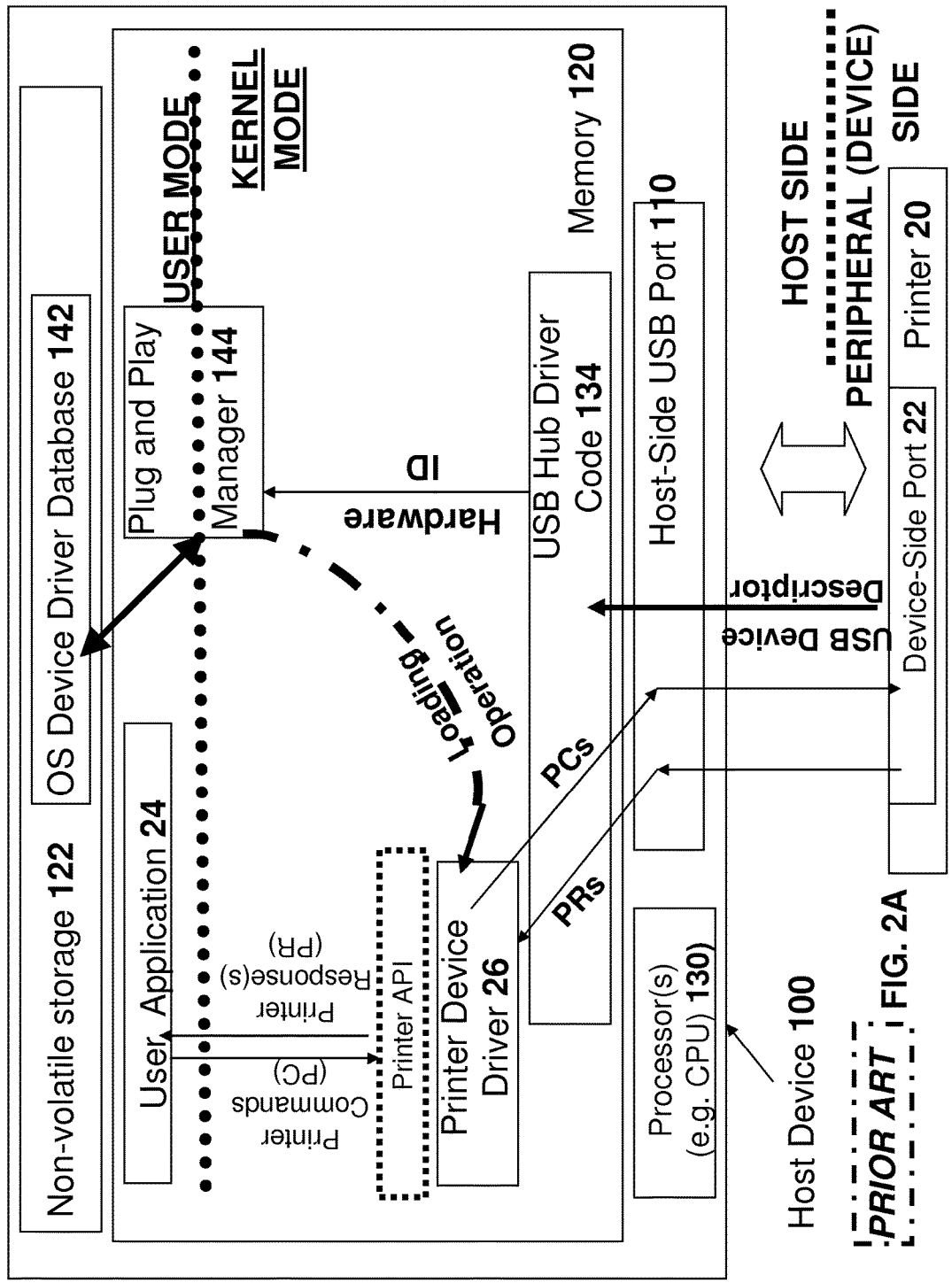
PRIOR ART FIG. 2A

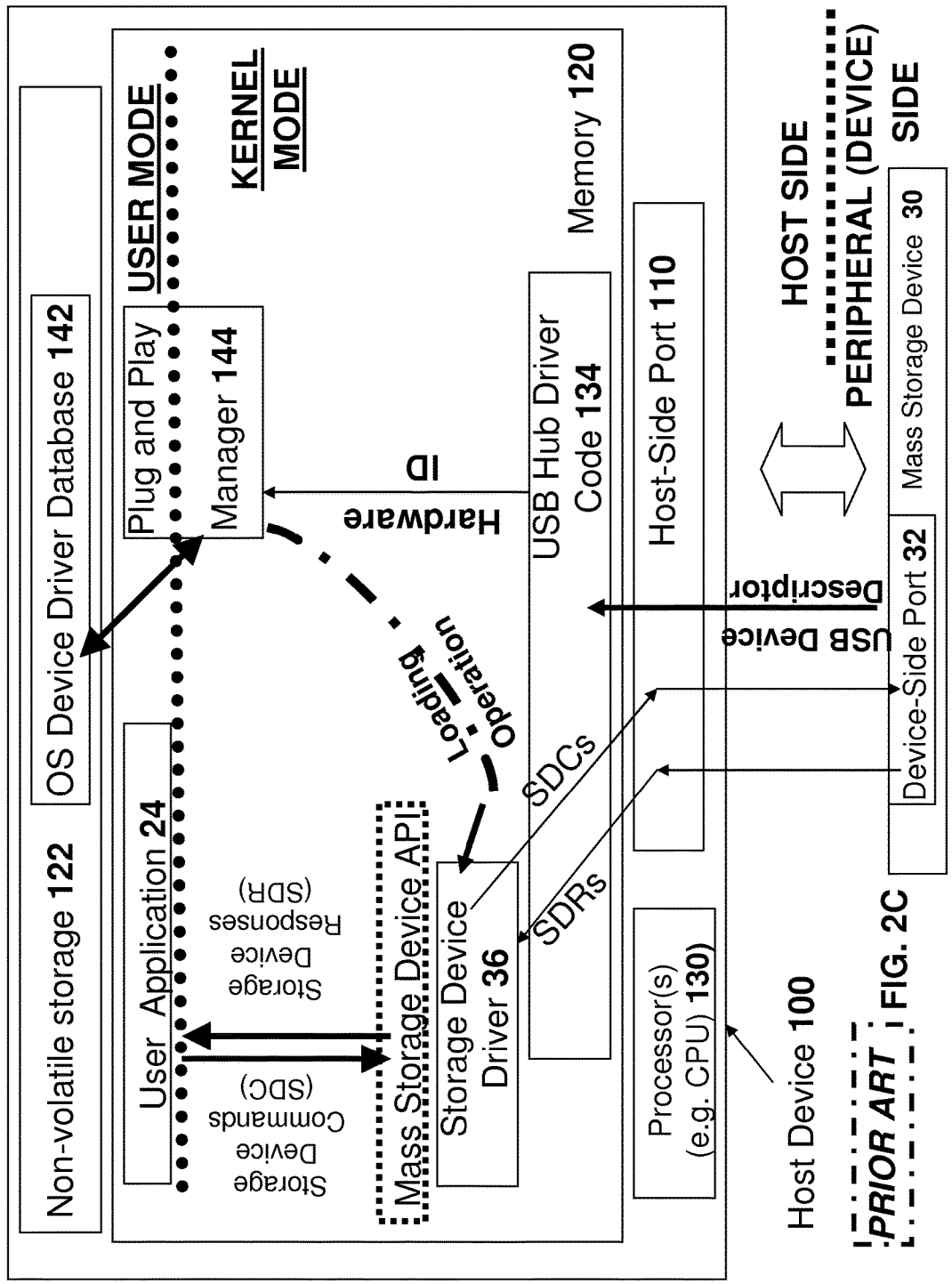
FIG. 2C *PRIOR ART*

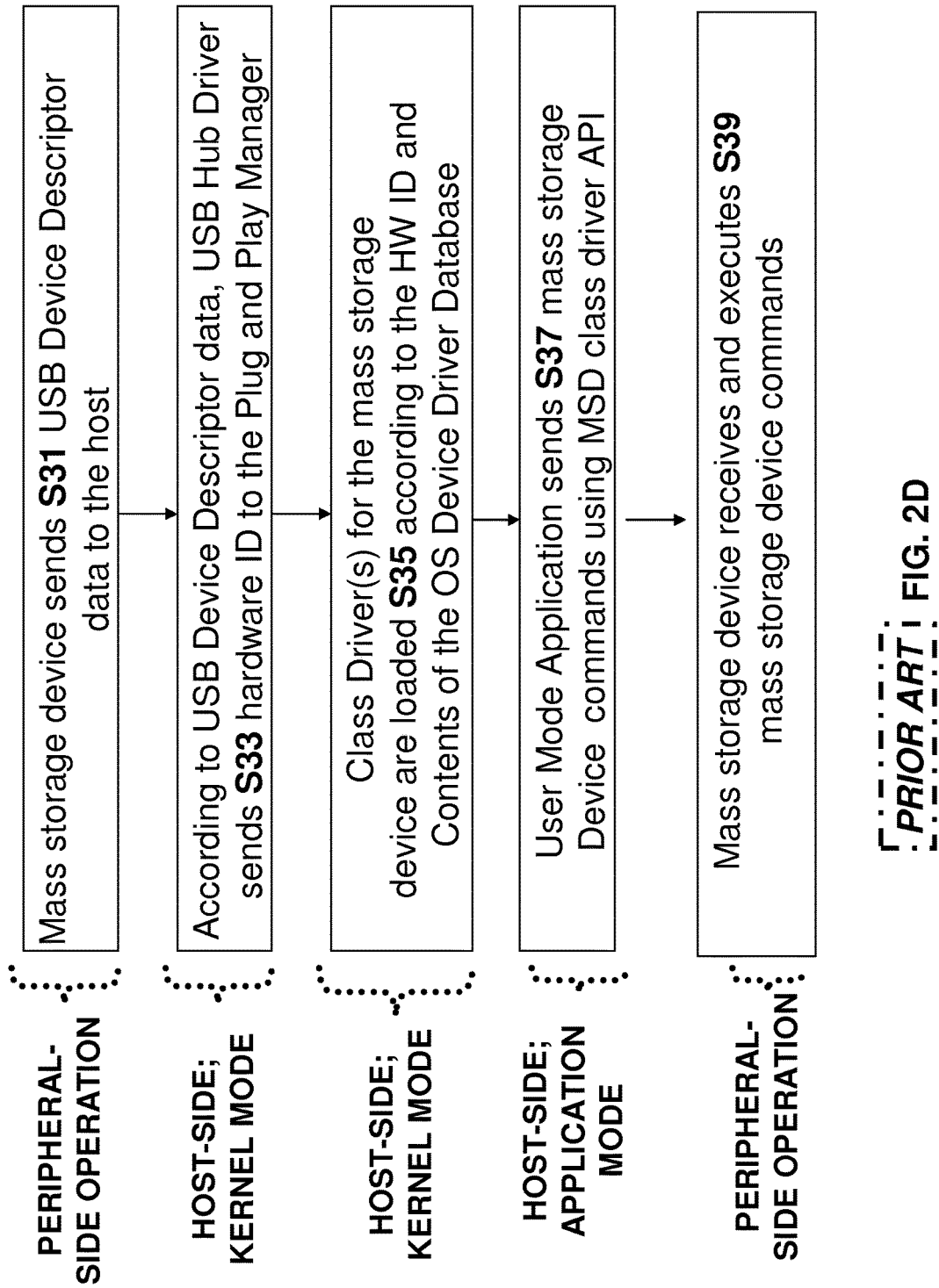
FIG. 2D  *PRIOR ART*

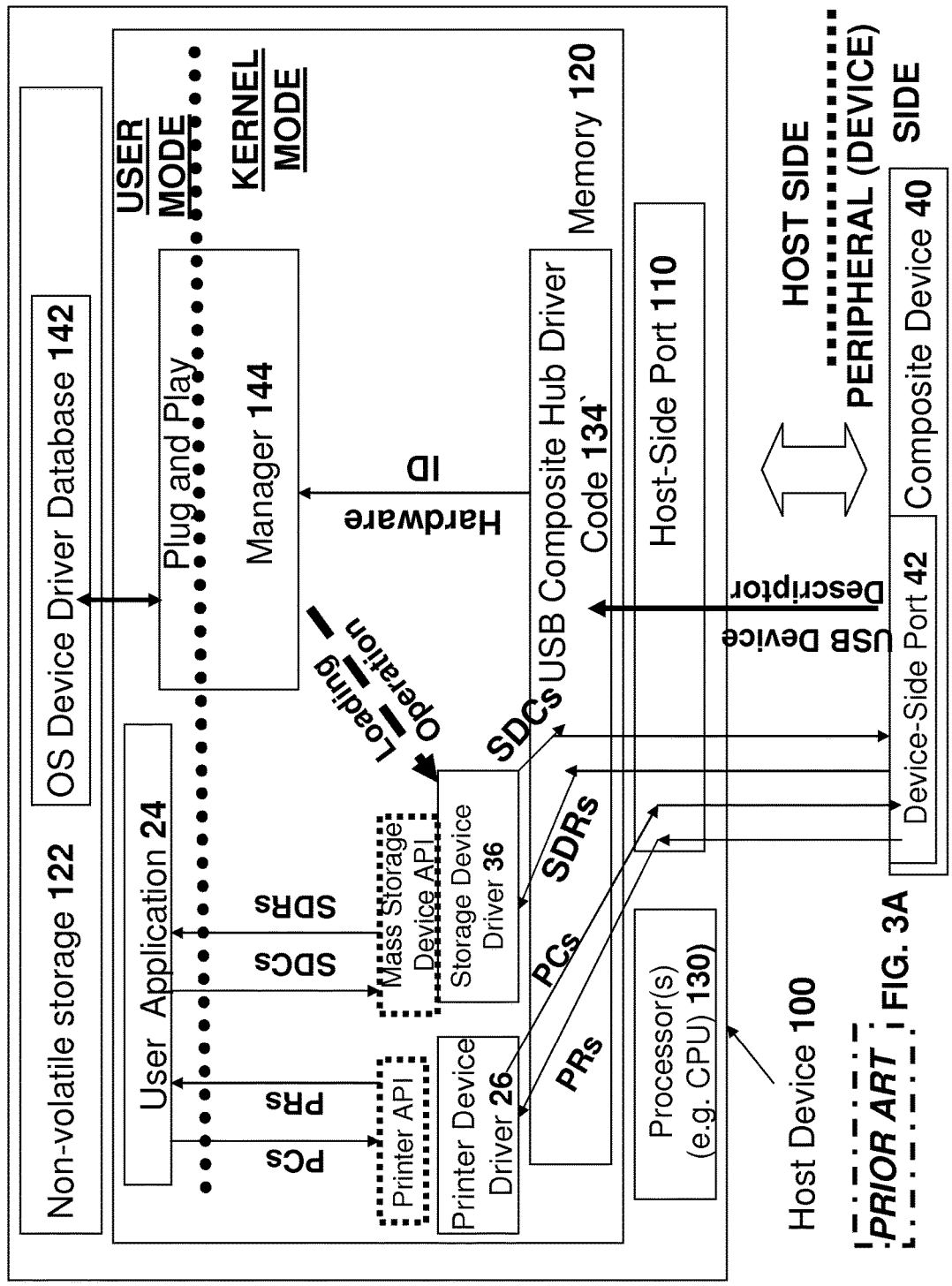
FIG. 3A *PRIOR ART*

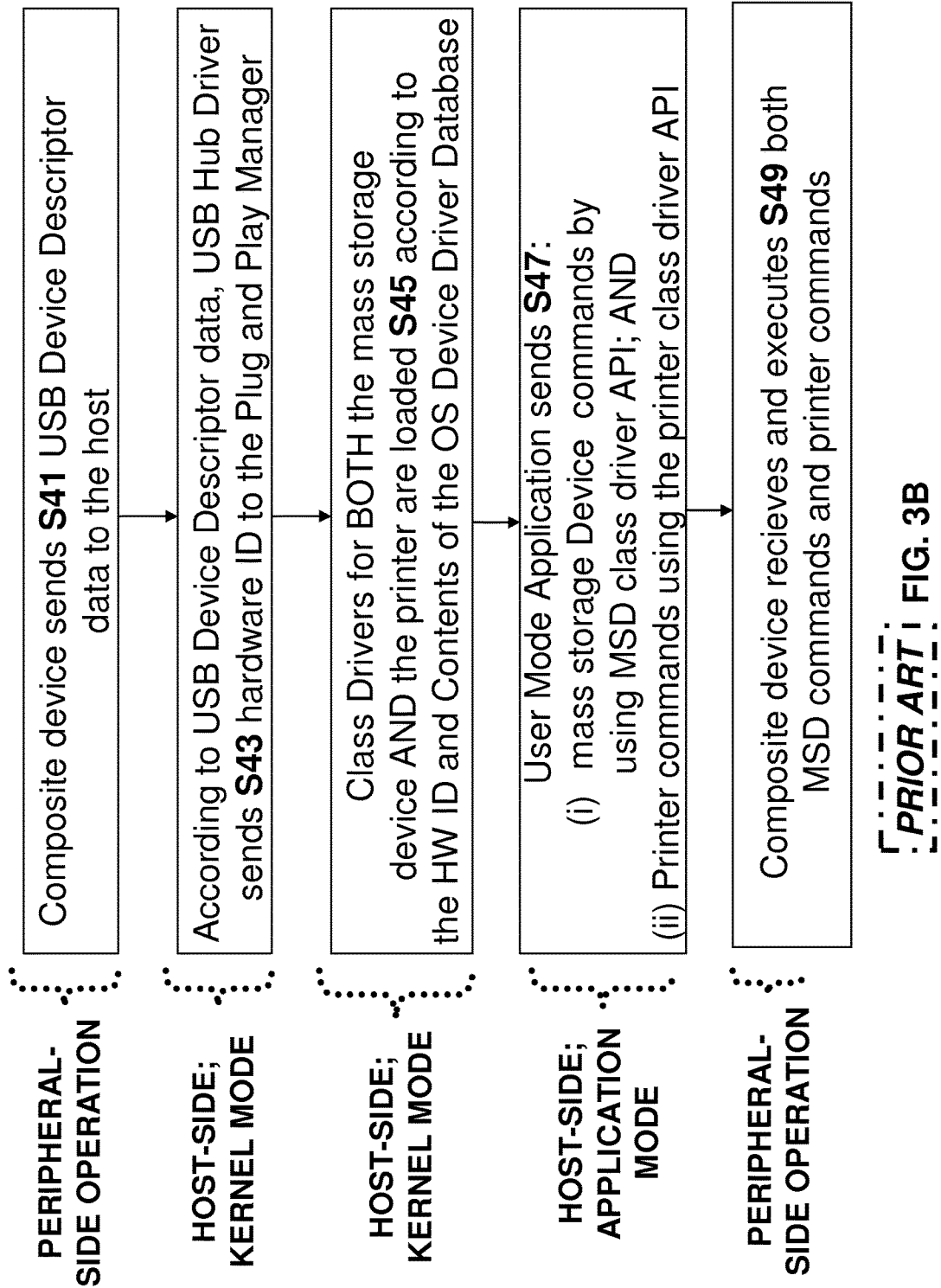
PRIOR ART  FIG. 3B

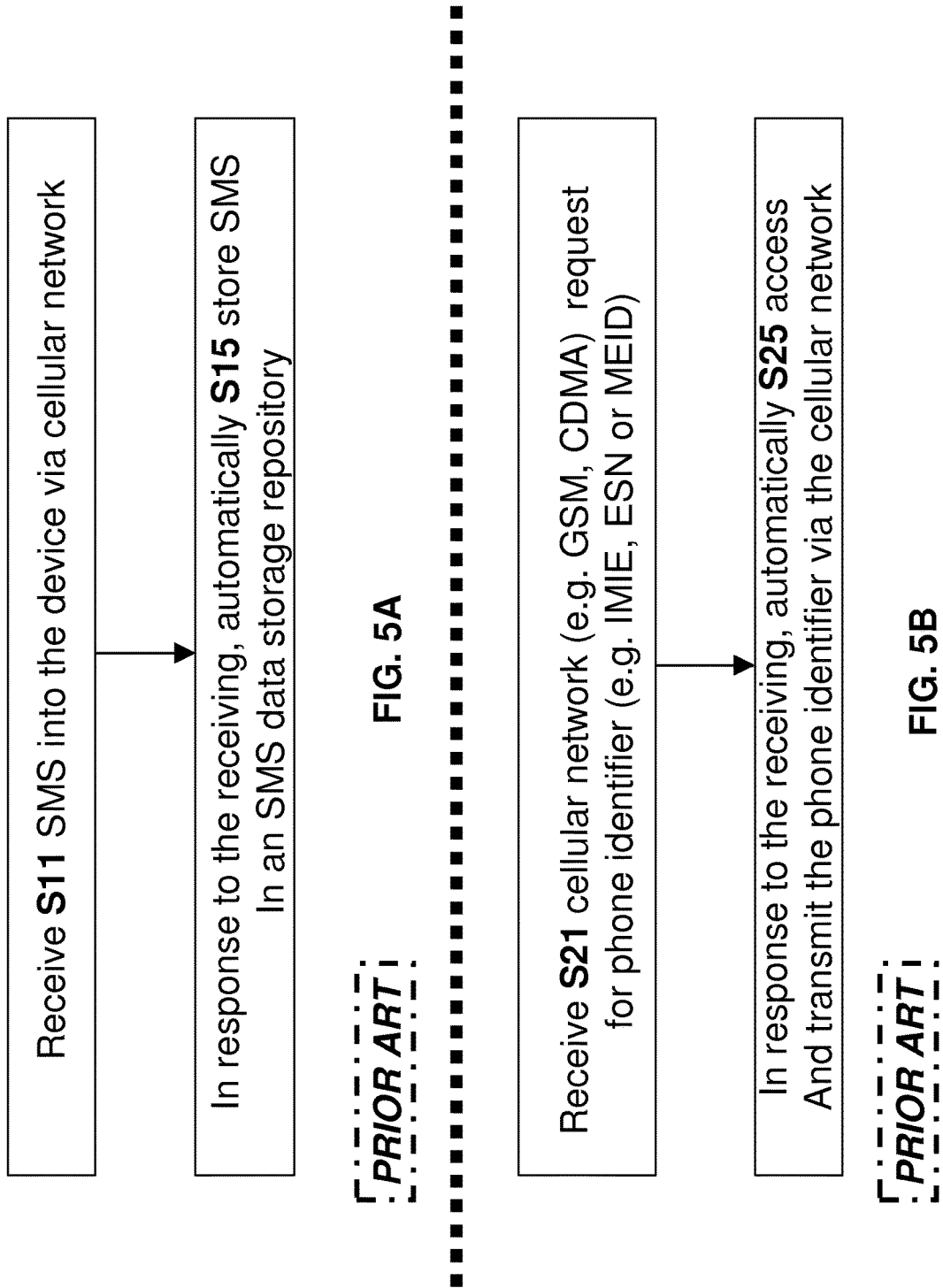

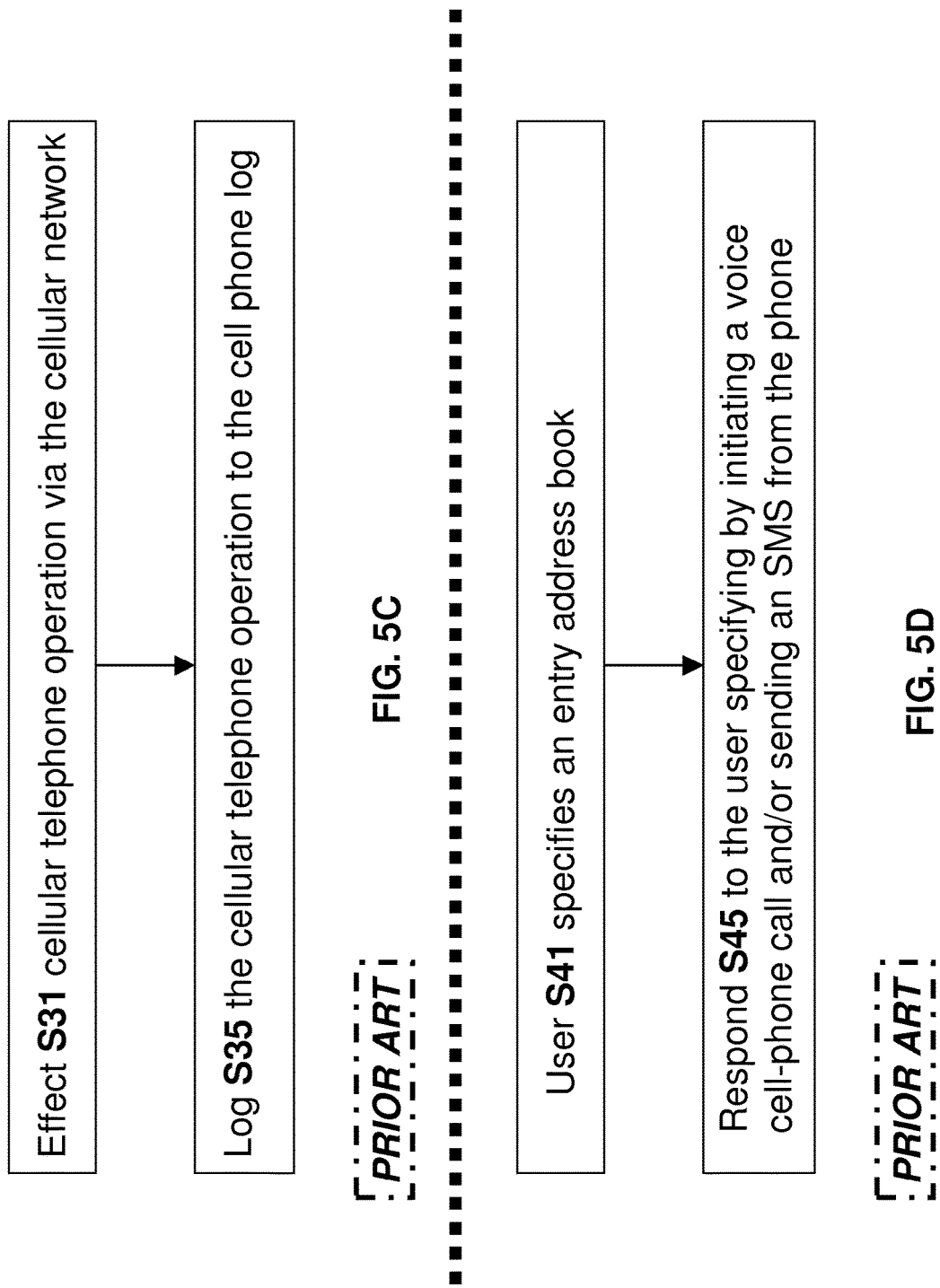

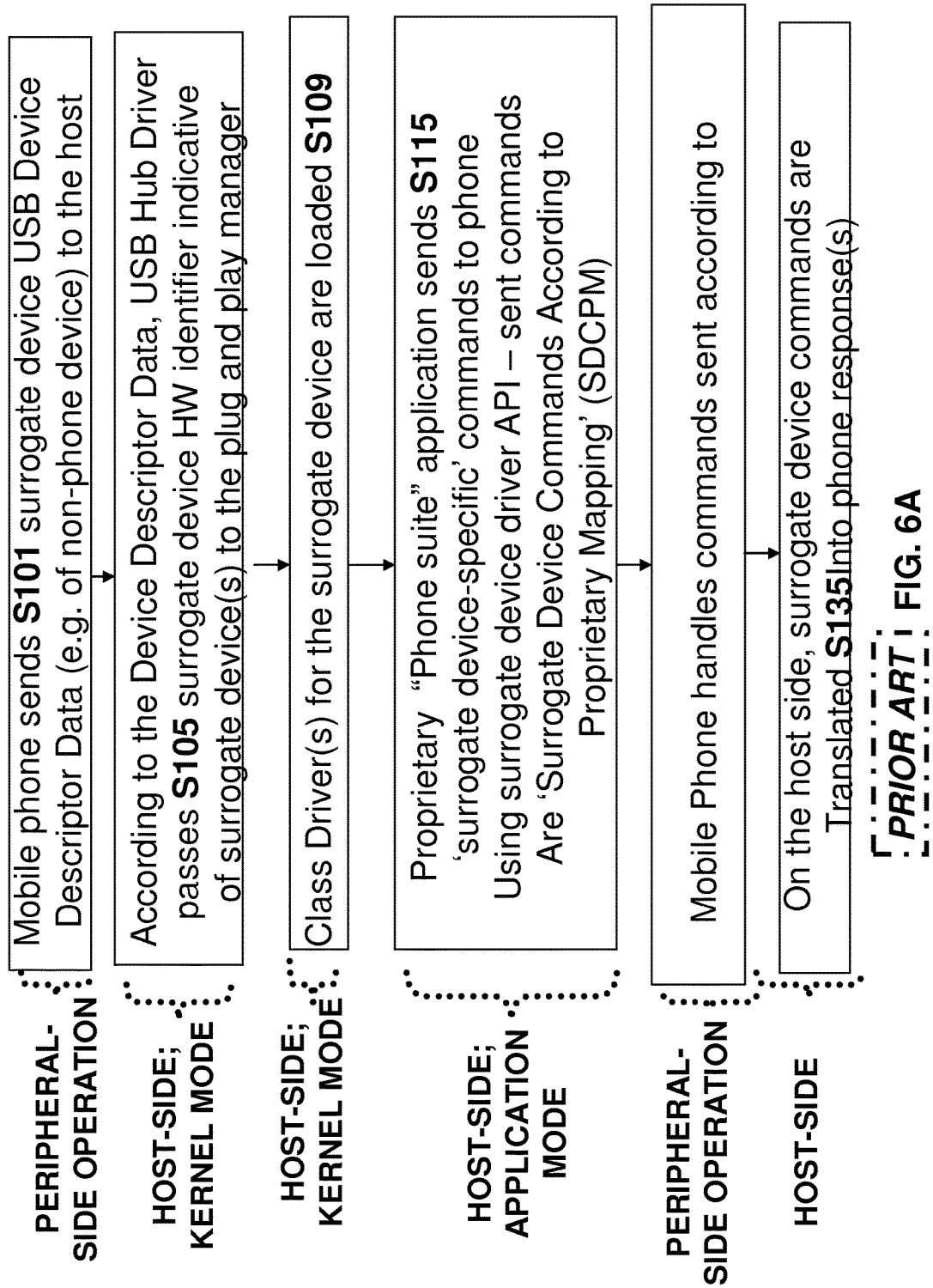
PRIOR ART  FIG. 6A

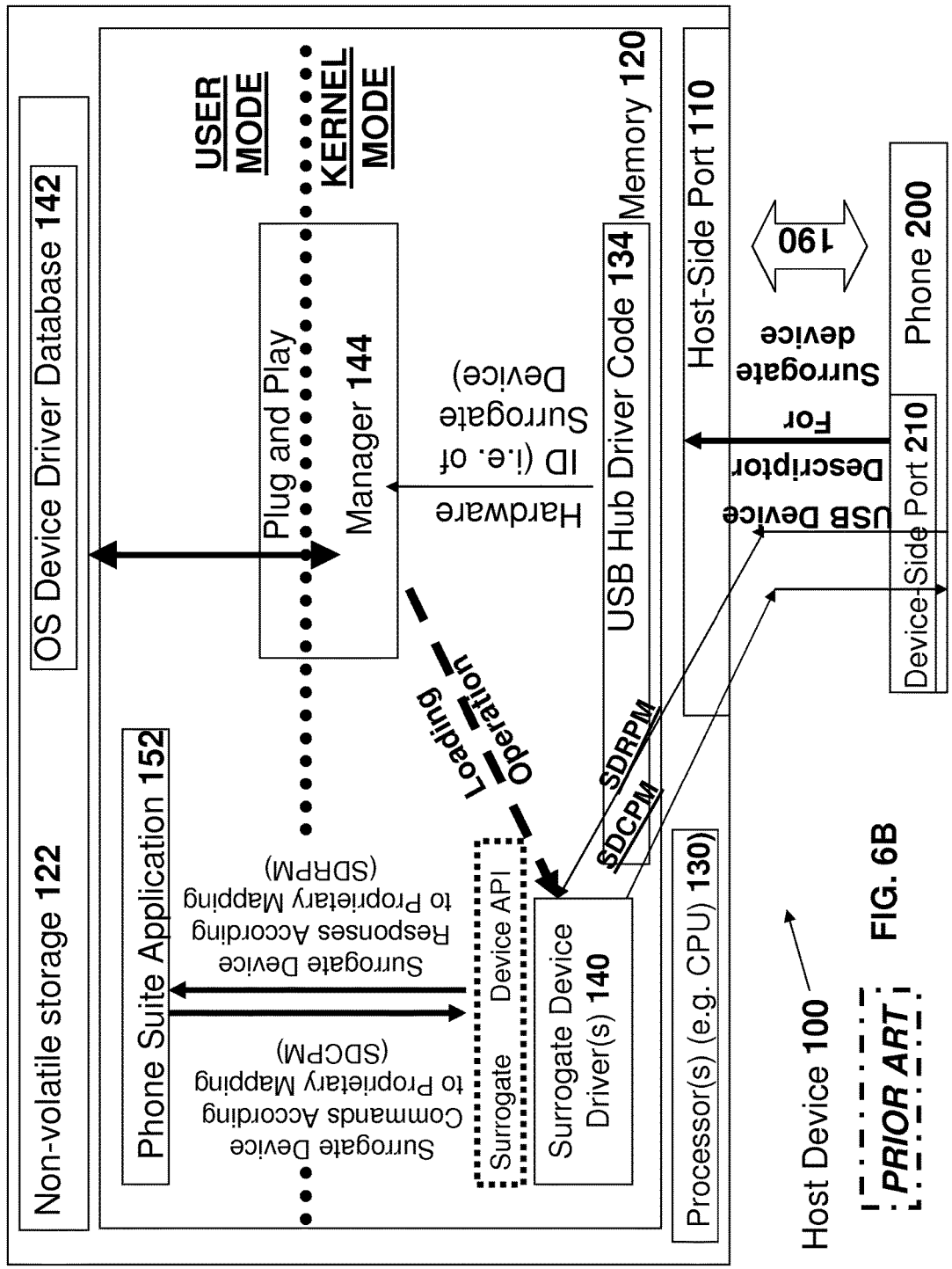
FIG. 6B  *PRIOR ART*

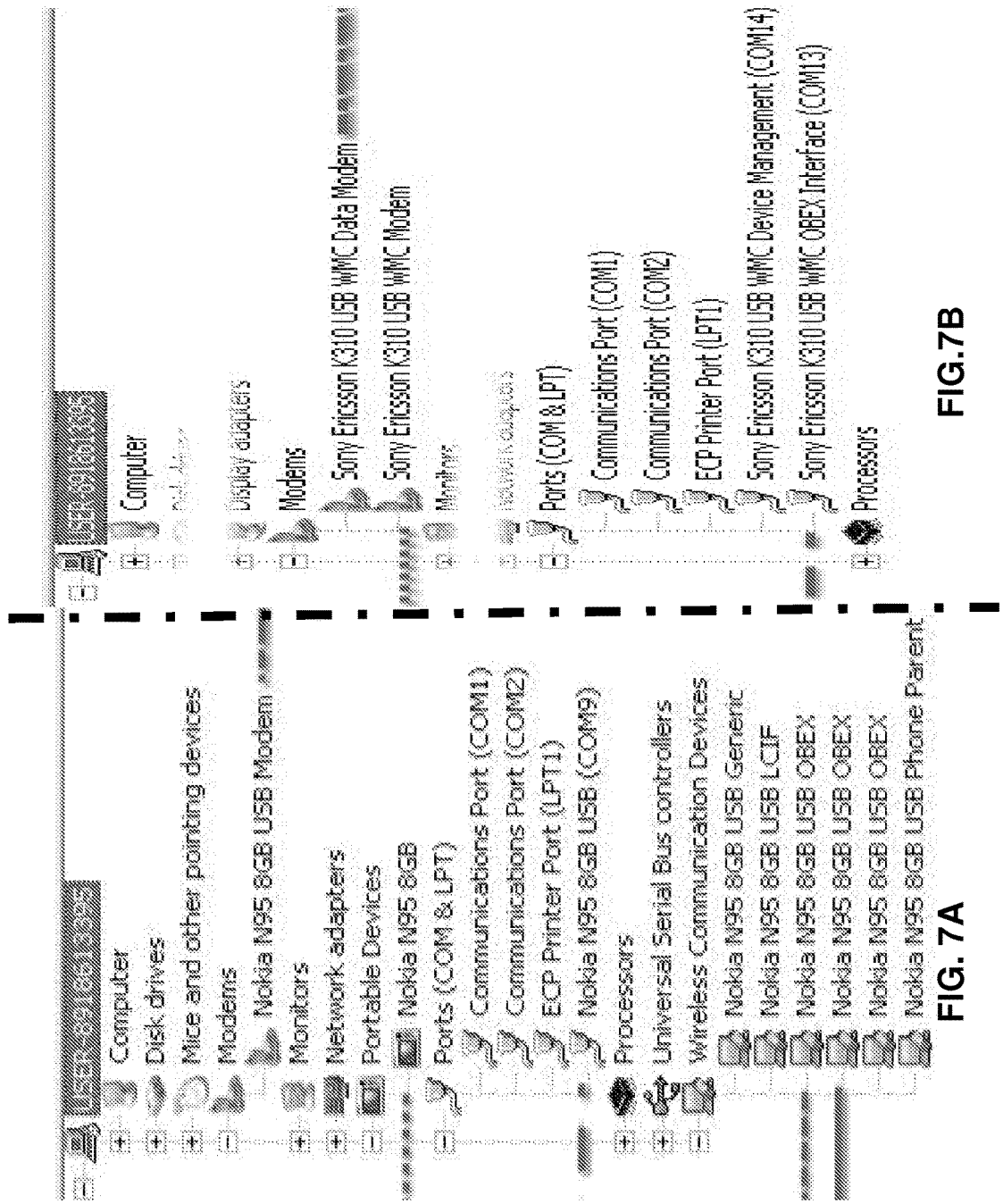

HOST DEVICE COUPLED TO A USB PERIPHERAL AND METHOD OF OPERATING THE SAME

FIELD OF THE INVENTION

Embodiments of the present invention relate to methods and apparatus for operating a host device (e.g. a 'plug-and-play' host device) coupled to a peripheral device (e.g. a mobile phone).

BACKGROUND AND RELATED ART

USB Descriptor Data

USB provides an expandable, hot-pluggable Plug and Play serial interface that ensures a standard, low-cost connection for peripheral devices such as storage devices, keyboards, joysticks, printers, scanners, modems, and digital cameras.

USB uses a set of data called "descriptors" to allow devices to be properly recognized by the host. In USB 1.x, the following five descriptors were used: 'Device descriptor,' 'Configuration Descriptor,' 'Interface Descriptor,' 'Endpoint Descriptor,' and 'String Descriptor.'

The first four of these descriptors may be arranged hierarchically as illustrated in FIG. 1A. According to the "Renesas" website (http://www2.renesas.com):

(A) the Device Descriptor "specifies information such as the supported USB version, the Device Class, Device Sub-Class, Protocol, and maximum packet size for Endpoint 0. The Device Descriptor includes "Vender ID, Product ID, Device version, number of possible configurations, and Index of String Descriptor." There is exactly one device ID per device.

(B) the Configuration Descriptor "specifies information such as the number of interfaces, and the value for selecting the configuration." The Configure Descriptor includes: "Device attributes (i.e. how the device is powered), Consumption Electricity, and Index of String Descriptor." There are one or more configuration descriptors per device. As shown in FIG. 1A, each configuration descriptor has one or more interface descriptors.

(C) the Interface Descriptor "specifies information such as the value for selecting the interface." As shown in FIG. 1B, the Interface Descriptor is a 'struct' that includes: "Number of alternative settings, Number of endpoints, Interface Class, Interface SubClass, Interface Protocol, String Descriptor Index."

(D) the Endpoint Descriptor "Specifies information such as the value for selecting the endpoint." The Endpoint Descriptor includes "Transfer type (direction of transfer), Maximum packet size available for transfer, and Interval for transfers." The Endpoint Descriptor "Exists independently for each Interface Descriptor. Depending on the interface, there may be an Interface Descriptor without Endpoint Descriptors, since Endpoint 0 is defined by a Device Descriptor and not an Endpoint Descriptor."

Sometimes, in the literature, people use the term 'Device Descriptor' to refer to additional hierarchies of USB descriptor data, below the 'Device Descriptor' level. In the present disclosure, USB 'Device Descriptor' data specifically refers to data of the USB 'Device Descriptor' hierarchy.

Plug and Play Apparatus and Techniques

Plug-and-play techniques and apparatus have been ubiquitous in the computing world for well over a decade. Operating systems that provide plug and play functionality include but are not limited to Windows® (i.e. various 'flavors' including but not limited to Windows 98, Windows CE, Windows 2000, Windows XP, Windows Vista and Windows 7), MacOS® and many distributions of Linux.

FIGS. 2A-2B respectively are a block diagram and a flow chart describing a system including a printer coupled to a host device and a method of operating the host device and printer. In response to a device coupling between printer 20 (having port 22) and host device 100 (for example, a laptop, desktop or any other 'PC' device), printer 20 sends USB Device Descriptor data to host device 100 via respective USB ports (i.e. host-side 'port' 22 which may be a 'male' USB connector and device-side 'port' 110 which may be a 'female' USB socket) (see step S21).

A piece of operating system code running on host device 100 known as the USB host controller (illustrated in FIG. 1A as 'USB host controller code 134' which resides in memory 120 and is executed by processor((s)) listens to host-side port 110 and receives the USB device descriptor. The USB hub driver (i.e. implemented as executing code) generates directly or indirectly (e.g. by invoking a function call of one or more other code module(s)) a so-called 'Hardware ID' from at least a portion of the data of the USB Device Descriptor.

This 'hardware ID' specific for the peripheral device (in FIG. 2A, specific for the printer) is: (i) generated according to content of the USB Device Descriptor and (ii) forwarded (see step S23 of FIG. 2B) from the executing USB host controller 134 code to another piece of executing operating system code known as the plug and play manager 144. Plug and play manager 144 responds to receiving the peripheral device identifier (in this case, a printer identifier) by loading device driver(s) 26 selected from a 'repository' or 'library' of device drivers that matches the hardware identifier (in this case, a printer identifier) (see step S25 of FIG. 2B).

In FIG. 2A, this repository is referred to as the 'OS Device Driver Database 142' which (i) is located on the 'host-side' of the communications link 190 between respective USB ports 22, 11, (ii) may reside in any combination of device(s) on the host side including host device 100 and/or any other device; (iii) may reside in any combination of volatile 120 and/or non-volatile 122 storage; and which (iv) typically includes some sort of indexing data structure(s) which maps between various hardware IDs and the actual data driver data object(s) (e.g. files or any other data object). The 'OS Device Driver Database 142' and/or any portion thereof may be provided as a single data structure and/or may be distributed among data structures. In one non-limiting example, portions of the entirety of the 'OS Device Driver Database 142' may be located in the OS 'Registry.'

Specifying of a Device Driver

The driver loaded in step S25 is not a generic driver determined exclusively by and/or primarily by a USB device class (e.g. a generic printer driver, a generic modem driver). Instead, a 'customer' device driver (i.e. as opposed to a 'generic' or 'standard' device driver for that device class—e.g. 'standard printer driver,' etc) that is 'specific for' the particular 'hardware ID' and that is 'specific for' the USB device descriptor data passed from the peripheral in step S23 is loaded in step S25.

There is a casual relation between (i) the content of the USB Device Descriptor passed in step S21 from the peripheral to the host which determines the Hardware ID (as well as the content of the hardware ID passed from the USB hub driver to the plug-and-play manager in step S23); and (ii) the identity of the actual device driver loaded into memory 120 in step S25. Even though the USB Device Descriptor as well as the Hardware ID do not exclusively determine the identity of the actual device driver loaded into memory 120 in step S25 (this is determined in conjunction with the content of at least a portion of the host-side-residing OS device driver database 142), the USB Device Descriptor as well as the Hardware ID certainly play a central role in determining the identity of the actual device driver.

Thus, in the present disclosure, it may be said that because the USB Device Descriptor as well as the Hardware ID play this central role in determining the identity of the actual device driver, that each 'specify' the device-specific driver loaded for the peripheral device (in FIG. 2A, this device is a printer 20—in FIG. 2B, this driver is loaded in step S25).

Steps S27 and S29 of FIG. 2B

The printer device driver(s) 26 loaded in step S25 exposes a printer API that translates device-independent printer commands (e.g. "EndPage", or "PrintWindow") to the specific printer's language. In addition, the printer API may also provide support for commands that are understood by a specific printer but are not necessarily device-independent printer commands, through API call such as "WritePrinter." In this sense printer device driver(s) 26 may 'expand' or 'extend' the generic device-independent printer API to include additional printer commands The printer API provided by printer device driver(s) 26 is available to user applications 24 (for example, word processor applications and Internet browsers or any other application) which utilize the printer API to send (see step S27 of FIG. 1B) specific printer commands (abbreviated as PCs) to the printer. The printer 20 receives these printer commands and sends (see step S29 of FIG. 1B) printer responses (i.e. 'on line' or 'out of toner') (abbreviated as PRs) to the user application 24.

FIG. 2C-2D describe a parallel case where the instead of coupling a printer device, a mass storage device 30 (having port 32) is coupled to host device. Thus, steps S31-39 are parallel to step S21-29, storage device driver 36 is parallel to printer driver 36.

Coupling of Composite Devices to PC Hosts

FIGS. 2A-2D relate to the case where a single or 'simple' device is presented to the host 100 by the peripheral via host-side port 100.

In other example, the user may couple a 'composite' device to the host device 200. The USB spec defines a 'composite device' as "A device that has multiple interfaces controlled independently of each other."

Using composite device, multiple functions are combined into a single device. For example, a 'mouse and a webcam' or a 'printer and a scanner' The example of FIGS. 3A-3B relate to the case of a 'printer and a mass-storage device.' In this example, multiple drivers are loaded for a USB peripheral single device—the 'device descriptor' passed from the composite device 40 to the host 100, and the 'hardware ID' passed from the USB hub driver 134 and the plug and play manager 144 play a role in determining which particular drivers (i.e. specific for each device of the multiple devices of the composite device) are loaded for the 'composite device' 40. For a composite USB hub, hub driver code 134 may include a 'composite bus' component. Thus, for the case of the 'composite device,' the USB device descriptor and the 'hardware ID,' each may be said to 'specify device-specific drivers.'

FIGS. 3A-3B illustrate four possible 'peripheral device profiles'/USB fingerprints of peripheral devices that may be coupled with a host device 100 via a USB port.100.

Although the details in the specific implementation of various steps may differ for the composite device case, at the level of description of FIGS. 3A-3B (see elements 40, 42; see steps S41, S43, S45, S47 and s49), in all examples the host device loads multiple device drivers. In all examples, the host can send commands to multiple 'targets' after loading the drivers—for example, in the example of FIG. 3B, the host can send mass storage device commands to (i) a 'target' interface descriptor associated with a mass storage device type and (ii) 'target' interface descriptor associated with a printer device type.

Cell Phone Commands

Mobile telephones are ubiquitous in $21^{st}$ century life, and require no introduction. FIG. 4 is a block diagram of an exemplary cellular telephone device 300 including: a display screen 310, a keyboard 304 (for example, a numerical keypad including mechanical buttons or provided in the context of 'touch-screen' functionality), cellular communication circuitry 314, volatile and/or non-volatile memory 320, one or more processors 130, a device-side port 322 and an antenna 306.

Cellular communication circuitry 314 (i.e. including any combination of hardware and/or software for communicating with the cellular network according to a cellular network protocol) is configured to handle communication with the cellular network (e.g. including but not limited to Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN)). For example, cellular communication circuitry 314 may handle voice and/or data protocols and/or messaging protocols of the cellular network.

Although cellular communication circuitry is illustrated separately from CPU 130 and memory 320 this is not a requirement and in some embodiments one or more functions of the cellular network communication circuitry 314 is implemented by the processor 130 and memory 320. It is noted that 'circuitry' refers to any combination and software and is not limited to 'pure hardware' implementation.

According to the example of FIG. 4, the following items are stored within memory 320: data storage repository 328 for storing cell-phone-specific data cellular telephones (e.g. storing received SMS messages or for storing network identifier data for identifying the cellular phone's device identifier or subscriber number, a log of cellular network operations carried out by the phone device 300, or address book information), and data management code 324 for managing data access to the cellular-telephone-specific data.

It is appreciated that FIG. 4 is a block diagram, and that memory 320 may include different types of memory such as generic storage (e.g. flash memory formatted using a file system or as object-oriented storage) as well as other types of storage (e.g. a special cell-phone chip in which a cell phone device identifier is stored). Similarly, data storage repository 328 is only illustrated in general terms and may be distributed over various locations—e.g. there is no requirement for SMS data and address book data to be stored together, SMS data may be stored in more than one format or location, etc Data management code 324 (i.e. when executed by processor(s) 130) regulates access to the cell-phone-specific data stored in cell-phone-specific data storage repository 328. For example, a set of commands or command sequences may be defined for accessing previously-received SMS messages or for accessing cellular log records (i.e.

describing previous cellular network operations) or for accessing address book entries or for accessing a cell phone identifier.

FIG. 5A is a flow-chart of a routine for handling SMS by a cellular telephone according to the prior art. In step S11, an SMS is received into the cellular telephone from the cellular network according to any pre-defined protocol defined by the cellular network. In step S15, the cell phone device 300 responds by storing the SMS (Short Message Service) storage in the data storage repository 328. As noted earlier, after the SMS is stored in the data storage repository 328 the hardware and/or software of the cell phone 300 may define a particular scheme or protocol for retrieving the SMS—for example, by a host device 100 coupled with the cell phone device. By defining a set of operations for accessing this data, code 324 and/or any dedicated hardware may regular access to this type (i.e. cell phone identifier information) of cell phone-specific data.

FIG. 5B is a flow-chart of a routine for handling a cellular network request for cellular telephone identifier information (e.g. International Mobile Equipment Identity (IMEI), Electronic Serial Number (ESN), or Mobile Equipment IDentifier (MEID)). The identifier information may be a control number of control data object used by the cellular network for cell phone activation. In step S21, the cellular phone receives a request for the phone identifier from the cellular network, and in step S25 the phone 300 responds to the request by accessing and/or reading the data from memory 320. For example, the phone may have a special chip including non-modifiable data that is also part of memory 320. The phone may be 'hardcorded' or configured by software (e.g. by operating system software) to provide this identifier data only after a specific request by the network or by a coupled host 100 via port 322. By defining a set of operations for accessing this data, code 324 and/or any dedicated hardware may regular access to this type (i.e. cell phone identifier information) of cell phone-specific data.

FIG. 5C is a flow-chart of a routine for logging cellular operations by a cellular telephone that carries out operations to interact with the cellular network according to the prior art. In step S31, the cell phone 300 carries out a cellphone operation—for example, sending or receiving an SMS or sending or receiving a voice cell phone call. In step S35, the cell phone device 300 responds to the carrying out of the operation by logging the operation to a 'cell phone log' stored in data repository 328. The hardware and/or software of the cell phone 300 may define a particular scheme or protocol for retrieving, at a later time, data of the cellular operations log or cell phone log residing in the data storage repository 328. By defining a set of operations for accessing this data, code 324 and/or any dedicated hardware may regular access to this type (i.e. cell phone identifier information) of cell phone-specific data.

FIG. 5D is a flow chart of employing data of an address book for initiating a cellular voice phone call via a cellular network. An address book entry stored in data storage repository 328 whose access is regulated by cell phone 300 (e.g. by code 324 which may define a standard series of operations for accessing the data) is specified by a user. The address book entry includes, at a minimum, a telephone number of a 'target' mapped to additional textual information about the target. When the address book entry is specified, the cell phone 400 responds by initiating a voice cell-phone call and/or by sending an SMS from phone 300 via the cellular network. By defining a set of operations for accessing this data, code 324 and/or any dedicated hardware may regulate access to this type (i.e. cell phone identifier information) of cell phone-specific data.

Communicating with a Peripheral Telephone Device from a Host Device

It is common for cell-phone vendors to provide 'phone suite' software applications for communicating with a cell phone coupled to a host computer 100—for example, running a 'plug-and-play' operating system such as Mac OS® or Windows® XP or Windows Vista® or Windows 7®.

When the cell phone device 300 is coupled to the host 100 as a peripheral 'slave' device, it is possible for the user to, for example, copy data (e.g. SMS data or phone address books entries) to his/her laptop or desktop computer and/or to operate the phone using a keyboard or other user control of the 'host device.' (e.g. laptop or desktop computer).

Upon coupling of the cell phone to the host device via the USB port, cell phone sends a USB hardware ID to the host device as in steps S21, S31, and S41. However, there is no predefined USB device class for cell phones as is the case for other peripherals (i.e. printers, modems, etc). Thus, the USB hardware ID corresponds to devices other than cellular phone devices—in the present disclosure, these non-cellular phone devices are referred to as 'surrogate devices.'

For the present disclosure, a 'surrogate device' is a device having a class or type that is different from a phone device class—exemplary surrogate devices include but are not limited to USB hubs, modems, printers, wireless devices and human interface devices (HID).

FIGS. 6A-6B describe a situation related to the case where mobile phone is coupled to a host device (e.g. a PC) executing software of 'mobile phone suite' software. The executing code of the phone suite application in memory 120 is labeled as 152 in FIG. 6A.

In step S101 of FIG. 6A, in response to a device coupling between the host 100 and the mobile phone 200 (for example, a wired or wireless USB coupling), the mobile phone 200, presents itself to the host as a surrogate device (or array of one or more surrogate devices) other than a phone by passing a "surrogate device identifier" describing an array of one or non-phone devices. This surrogate device identifier is received by host device 100 via host-side port 110 (for example, a USB port). In particular, this surrogate device identifier is received by 'USB host controller' 134 of the operating system.

In many examples, this surrogate device identifier describes a 'composite' device see the discussion above with respect to FIGS. 2-3).

As was seen for previous cases (see step S23 of FIG. 1A, step S33 of FIG. 1D, step S75 of FIG. 3B) in FIGS. 6A-6B USB Host Controller 134 automatically forwards (see step S105) any device identifier (i.e. either the simple identifier or the identifier associated with a composite surrogate device) received via host-side port 110 to plug-and-play-manager 144—thus, in the example of FIGS. 4A-4B, the surrogate device identifier is forwarded to plug-and-play-manager 144 (step S105).

In general, plug and play manager 144 then loads (in step s109) into memory 120 a set of one or more drivers that match the device identifier(s) it receiver from USB host controller 134. For the specific yet ubiquitous example where the surrogate device identifier refers to a composite device, one or more teachings of FIGS. 2-3 are employed in step S109 for example, to load/invoke multiple driver objects for a surrogate composite device.

In one example relating to step S109, if the user couples an audio device (class 01h) to the host 100 via host-side port 110, plug and play manager 144 loads appropriate audio device drivers into memory 120, and these audio device drivers execute in kernel mode. Thus, for the particular case of FIGS. 6A-6B, the plug-and-play manager 144, which is not 'aware' of the 'true identity' of mobile phone 200, loads into memory 120 the surrogate device driver(s) 140 for the one or more surrogate devices of the surrogate device array (for example, printer drivers or modem drivers or human interface device (HID) drivers or any other drivers)—this is S109 of FIG. 6A.

In FIG. 6B, the term 'surrogate device driver(s) 140' refers either to the device driver specified by the hardware ID passed from the phone 200 to the host or, for the case of phones that present themselves as composite devices, to the device driver 'indirectly' specified by a USB hardware ID.

Surrogate Device Driver(s) 140 does not provide a 'phone command interface. Instead, surrogate device driver is configured to receive and handle commands that match its device type—if 'surrogate device driver' 140 is a 'Wireless Communication Device' driver (or includes a 'Wireless Communication Device' for the case where there are a plurality of surrogate devices that are part of a composite surrogate device), then the surrogate device API exposed by surrogate device driver 140 is a 'Wireless Communication Device' command interface (i.e. for handling 'generic' and/or proprietary printer commands). If 'surrogate device driver' 140 is a modem driver, then the surrogate device API exposed by surrogate device driver 140 is a modem command interface, if 'surrogate device driver' is a mass storage driver, then the surrogate device API exposed by surrogate device driver 140 is a mass storage drive interface, as so on.

For the case of a composite surrogate device, the statements of the preceding paragraph may be true for each surrogate driver(s) of each device type.

One real-life example from known mobile phones is illustrated in FIGS. 7A-7B. FIG. 7A illustrates a 'tree description' of visible on a host device (in this case, operating the Windows® operating system) that has connected to a single Nokia® N95 phone that presents itself as a composite device comprising more than one surrogate device; FIG. 7B illustrates a 'tree description' of visible on a host device (in this case, operating the Windows® operating system) that has connected to a single Sony Ericsson® K310 phone In this case of the Nokia® phone (see FIG. 7A), when the phone device is coupled to the host device (i.e. where the phone device is a 'peripheral device'), the phone device presents itself in step 301 as a composite device including a plurality of USB interface descriptor . . . . This surrogate composite device includes a number of USB interface descriptors—including (i) a 'Nokia N95 8 GB Portable Device' of the 'Portable Device' device interface descriptor; (ii) a 'Nokia N95 Modem' Interface descriptor; (iii) a Nokia N95 8 GB USB ports of the 'port device type') and (iv) six separate wireless communications device.

In this case of the Sony-Ericsson® phone (see FIG. 7B), when the phone device is coupled to the host device (i.e. where the phone device is a 'peripheral device'), the phone device presents itself in step 301 as a composite device). This surrogate composite device includes a number of USB interface descriptors (i) two separate modem devices; and (ii) two separate port devices.

For the case of 'composite surrogate devices', multiple surrogate class drivers 140 are loaded in step S109 for the single mobile phone (see FIGS. 2-3). For the example of the Nokia® N95 and the Sony Ericsson® K310 phones, the drivers for the devices illustrated in FIGS. 7A-7B are loaded in step S109, and are collectively known as surrogate class drivers 140.

In some examples related to phones that present themselves as composite surrogate devices, having multiple devices of the same type (for example, more than one 'modem' as illustrated in FIG. 7B) may be useful to allow the host to communicate with the phone over similar multiple data channels.

In order for phone suite application 152 of FIG. 152 (i.e. which is a client of the surrogate device drivers 142) to communicate with phone 200, phone suite application 152 utilizes the device API provided by the surrogate device driver 140. Since phone suite application 152 is custom-made and hard-wired for a particular family of phones (in some implementations, a given manufacturer (e.g. Motorola) may market several families of phones—in this case, the user may be able to type in his/her particular model or may provide related information using some sort of PC-based menu interface), phone suite application 152 is able to issue surrogate device commands rather than phone command according to some sort of mapping.

In one example, many phones expand the MODEM protocol (which was originally used for AT-commands) to additional commands, which all start with the AT-commands. These commands may be used to a variety of operations on the mobile phone 200 including managing contacts, getting information on the phone, updating phone software, etc. For example. Nokia(s) has a proprietary protocol called F-BUS used with its S40 family of phones. The communication starts with the following AT command:

Host: AT&F
Phone: AT&F OK
Host: AT*nokiafbus
Phone: AT

. . . from this point, the communication is in the F-BUS binary language. The F-BUS protocol includes a command to switch back to AT-commands protocol.

The commands sent by phone suite application 152 (for example, AT commands or F-Bus commands or printer commands such as 'line feed' or 'print test page') are thus surrogate device commands—specific to a surrogate device such as a printer or a modem or any other surrogate device. They may specific either to a 'generic version of a surrogate device' or to a specific version of a surrogate device (analogous to device drivers that expand the basic command set for a particular device such as a modem or printer).

A Discussion of FIG. 8

FIG. 8 is a flow chart providing a highly simplified description of a host device executing 'phone suite software' communicating with a peripheral phone device according to the prior art.

In step S61, host receives a USB hardware identifier (e.g. corresponding to a non-phone surrogate device(s)) from the peripheral phone device. In step S65, the host 100 loads the device driver(s) (e.g. surrogate device drivers) specified by the USB hardware identifier received from the peripheral phone 300.

In step S69, the host (e.g. phone suite software 152) communicates with the peripheral phone device 300 using the phone-specific loaded device drivers.

Below is a list of various features of the 'phone suite' paradigm for communicating peripheral cell phone devices:

(i) typically, each phone is associated with a different set of drivers. The situation illustrated in FIGS. 7A-7B where phones from different vendors require different drivers of different USB classes is not the exception, but is common;

(ii) in order to communicate with a cell phone, it is required to load one and often a number of phone-specific drivers specific to the cell phone coupled to the host. After the drivers phone-specific are loaded, the host employs the phone-specific drivers to communicate with the cell phone;

(iii) different phones require different drivers and load different combinations of drivers, often having different USB classes.

(iv) Although PC phone suites from different vendors may support similar functionality (e.g. retrieve SMS, retrieve entries from the address book, add entry to the address book, etc), typically phones from different vendors implement these 'data access operations' differently, and employ different protocols for reading cell phone data from repository 328.

(v) PC phone suite software 152 is usually 'hard-coded' to support a set of phones sold by the phone vendor, and a prior includes data and/or code describing that phone vendor's "schemes" for accessing data in the storage repository 328.

SUMMARY OF EMBODIMENTS

Embodiments of the disclosed subject-matter relate to methods and apparatus for communicating with a peripheral cell phone device whereby instead of relying on the cell phone drivers directly or indirectly specified by the USB hardware identifier passed by the cellphone to the host, it is possible to (i) actively suppress the loading of a peripheral-device-specific driver into memory and (ii) to identify the cellphone from a plurality of candidates without relying on device drivers. Once the cellphone is properly identified (e.g. to determine a vendor identity, to determine phone hardware or software capabilities, to determine a protocol recognized by the peripheral phone, etc), it is possible to communicate with a cellphone according to its particular 'language' even if no information about the identity of the cellphone is provided to the host a priori (i.e. manually provided or provided by loading the cellphone-specific device driver).

In one non-limiting example, it is possible to analyze endpoint descriptor data of the peripheral cell phone, and then to compare the endpoint descriptor data to a database—for example, residing on a host side of a host-peripheral USB interface. It has been determined that for many cases, USB endpoint descriptor data by itself and/or in combination with other USB-fingerprint data (e.g. USB interface descriptor and/or USB configuration descriptor and/or USB device descriptor data) suffices, in many cases, to specify one or more of (i) a phone vendor name; (ii) a phone model name; (iii) phone hardware and/or software resources; (iv) phone protocol features and (v) one or more additional phone-specific features.

As such, instead of assuming a priori that a user has coupled to the host device a phone from a specific vendor, it is possible to provide a relatively 'universal phone host' product which configures a host to appropriately communicate with phone devices from a relatively 'large' numbers of vendors and with a relatively 'large' number of models.

Instead of requiring the user to load into host device memory phone drivers when coupling the phone to the host device, it is possible to (i) suppress this behavior; (ii) 'recognize the phone' (i.e. even from a relatively 'large' and/or 'diverse' set of candidates) without relying on device drivers. In many cases, this obviates the need for users to install vendor-specific PC phone suites on their host devices, and allows the user to simply plug in almost any phone of a relatively large 'set' of phone to his/her host device and communicate with the coupled peripheral phone device (i.e. in many cases regardless of vendors) from the host device.

In different examples, it is possible for a user, from the host, to carry out various cellphone related operations from the host device in a substantially phone-model independent and/or phone-vendor independent and/or phone-chipset-independent and/or phone-operating-system independent manner. This feature is provided despite the fact that most cellphones provide model-specific and/or vendor-specific schemes for accessing cellphone data. Exemplary cellphone related operations include but are not limited to: (i) reading, writing or deleting SMS messages; (ii) reading or modifying a cell phone log; (iii) reading cell phone identifier information (e.g. International Mobile Equipment Identity (IMEI), Electronic Serial Number (ESN), or Mobile Equipment IDentifier (MEID)); and (iv) reading or modifying address book entrees.

In one non-limiting example, it is possible to maintain a database whereby a 'key' of each entry is cellphone-model specific data (e.g. USB fingerprint data down to the 'endpoint descriptor level') and that 'data' of each entry describes information about the specific model (e.g. vendor name, model number, protocol(s) recognized, schemes for accessing SMS or address book or log or phone identifier data, phone hardware or software resources, etc). When a 'candidate phone' is coupled to the host device, data descriptive of the 'candidate phone' (e.g. 'endpoint descriptor' data or other data) is used as a key to effect a 'look up' in the host-side database. After matching this descriptive data with the entry that provides the closest match, it is possible to read, from the host-side database, information specific to the now-'identified' cellphone model.

It is then possible to display this information or related information to the user and/or to communicate with the phone in a vendor-specific or model-specific manner (e.g. according to the 'correct protocols').

Some embodiments of the disclosed subject-matter relate to techniques for suppressing and/or preventing the loading into memory of one or more specified drivers. Although this feature was explained above in the context of cell phone peripheral devices, it is now disclosed that, in some embodiments, this feature may be provided for any peripheral device (e.g. 'slave device') directly coupled with the host via a wired or wireless USB port, including but not limited to cell phone devices.

Some embodiments of the disclosed subject-matter relate to technique for 'identifying' and/or 'recognizing' a peripheral cell phone device and/or carrying out a model-specific or vendor-specific operation from the host related to the peripheral cell phone. Although this feature was explained above in the context of cell phone peripheral devices, it is now disclosed that, in some embodiments, this feature may be provided for any peripheral device (e.g. 'slave device') directly coupled with the host via a wired or wireless USB port, including but not limited to cell phone devices.

It is now disclosed a method of retrieving cell-phone related data from a peripheral cell phone device by a host device, the method comprising:

a. receiving USB endpoint descriptor data by the host device from the peripheral cell phone device that is coupled to the host device via a USB port;

b. analyzing the received USB endpoint descriptor data by the host device; and c. in a manner determined by the results of the analysis of the USB endpoint descriptor data, retrieving by the host device from the peripheral cell phone device at least one:
- A. one or more SMS message(s);
- B. a cell phone log or a portion thereof;
- C. one or more cell phone-address-book entries; and
- D. retrieving an IMEI or ESN or MEID hardware identifier.

In one example, phones from a 'first vendor' or from a 'first family of models' employ a first scheme for retrieving SMS messages (or other cell-phone data such as cell phone logs, address-books entries, or hardware identifiers), while phones from a 'second vendor' or from a 'second family of model.' In this example, it is possible to employ USB endpoint descriptor to identify the phone vendor and/or model and/or chipset and/or model family to determine if the phone is from a 'first family' or a 'second family' In non-limiting embodiments, there may be any number of families/vendors—for example, hundreds or thousands or more.

Once the vendor or family or chipset or other identifying characteristic is determined, it is possible to utilize the 'appropriate' scheme according to the results of the phone model/model type identification. Thus, if it is determined from the analysis of the USB endpoint descriptor data (and optionally additional data—e.g. 'higher levels' of the USB tree) that a 'candidate' phone is from the 'first family,' then the cell-phone related data (e.g. SMS messages, etc) is retrieved from the peripheral phone device by the host device using a retrieval 'scheme' associated with the first family of phones. Alternatively, if it is determined from the analysis of the USB endpoint descriptor data that a 'candidate' phone is from the 'second family,' then the cell-phone related data (e.g. SMS messages, etc) is retrieved from the peripheral phone device by the host device using a retrieval 'scheme' associated with the second family of phones.

It is now disclosed for the first time a method of determining peripheral device property(ies) by a host device that is coupled to the peripheral device via a USB port, the method comprising:

a. receiving USB endpoint descriptor data by the host device from the peripheral device that is coupled to the host device via a USB port;

b. analyzing the received USB endpoint descriptor data by the host device; and c. in a manner determined by the results of the analysis of the USB endpoint descriptor data, determining at least one of:
- A. a memory capacity of the peripheral device;
- B. a cellular network type(s) supported by the peripheral device;
- C. a presence or absence of an onboard keyboard on the peripheral device;
- D. an SMS repository capacity and/or an cellphone address book capacity of the peripheral device; and
- E. a SMS and/or cellular phone log and/or cell phone address book and/or cellular phone hardware identifier retrieval scheme.

In one example, a first model of phones (e.g. a Nokia® phone) provides a first memory capacity, while a second model of phones (e.g. an Apple® phone) provides a second memory capacity. In this example, it is possible to employ USB endpoint descriptor to identify the phone vendor and/or model and/or chipset and/or model family to determine if the phone (or any peripheral device—not necessarily limited to phone devices) is from a 'first family' or a 'second family' In non-limiting embodiments, there may be any number of families/vendors—for example, hundreds or thousands or more.

It is possible to store a table (or other data structure) of peripheral device features on the host side mapping peripheral device identification information with information describing capabilities of each peripheral device—e.g. 'Model X1' has 8 Gigabytes of memory, 'Model X2' has 12 Gigabytes of memory, etc. Once model-identifying information derived from the USB endpoint descriptor (and optionally additional data—e.g. 'higher levels' of the USB tree) about the vendor or family or chipset or other identifying characteristic is determined, it is possible to effect a 'look-up' of a data structure describing different capabilities of various models. In this manner, the host device can utilize the 'USB endpoint descriptor data' to determine one or more hardware or software capabilities of a peripheral device (e.g. memory capacity, network type, etc.)

It is now disclosed for the first time a method of sending a command from a host device to a composite peripheral device coupled to the host device via a USB port, the method comprising:

a. receiving USB endpoint descriptor data by the host device from the composite peripheral device that is coupled to the host device via the USB port, the composite peripheral device having a plurality of interface descriptors;

b. analyzing the received USB endpoint descriptor data by the host device; and c. according to the results of the analysis of the USB endpoint descriptor data, selecting a target interface descriptor selected from the plurality of interface descriptors; and d. routing a command sent to the peripheral device to the interface specified by the target interface descriptor.

In one example, a peripheral device presents itself to the host device as a composite device including two wireless communications devices (i.e. referred to as 'WC1' and 'WC2') and three modem devices referred to as ('M1' and 'M2' and 'M3'). In this example, any given command from the host device to the peripheral device may be routed to any one of five 'interfaces' of the USB composite peripheral device—i.e. to the USB interface associated with WC1 (first USB interface of the peripheral device), to the USB interface associated with WC2 (second USB interface of the peripheral device), to the USB interface associated with M1 (third USB interface of the peripheral device), to the USB interface associated with M2 (fourth USB interface of the peripheral device), or to the USB interface associated with M3 (fifth USB interface of the peripheral device).

In some embodiments, it is possible for a command sequence (e.g. a phone command sequence) to be implemented as a sequence of surrogate device commands. For example, on a particular model, a command to display a photo may be implemented as the following sequence: "Command 1 to WC 2," "Command 2 to WC 2," Command 3 to WC 1" and "Command 4 to M1." In this example, each of the four commands needs to be routed to a particular USB interface selected from the 5 interfaces of the composite device. Thus, the first command from the host needs to be routed to the WC2 interface (i.e. instead of the WC1, M1, M2 or M3 interface), the second command needs to be routed to the WC2 interface and so on.

In some embodiments, for a number of devices (e.g. phones or PDAs or any other peripheral devices), each device model encodes various commands according to a different 'underlying command scheme'—for example, a first cell phone model (e.g. a certain Andoid® phone model) expects to receive a 'retrieve SMS' command according to a first set of underlying commands (e.g. 'surrogate device commands' such as modem commands or wireless communications device) of a 'lower level' protocol(s), while a second phone model (e.g. a certain RIM® phone model) expects to receive a a 'retrieve SMS' command according to a second set of underlying commands. The 'translation' scheme between the 'higher level command' (e.g. retrieve SMS) and the 'lower level command' (e.g. modem commands or WC commands) may be particular to different composite devices.

In this example, it is possible to maintain on the host device a per-model (or per-model family) map (or other data structure) explaining how 'higher level' commands are translated into lower level 'device commands' to be sent to the peripheral device. For example, the vendors or even different phone models from the same vendors each maintain different schemes and each phone model (or other peripheral device) may be mapped to a different scheme-descriptor. Once the peripheral device is identified as a particular peripheral device model (e.g. phone model) in accordance with the USB endpoint data (and optionally additional data), it is possible to invoke the 'matching' translation scheme. Part of this scheme for translating commands may also describe to which interface (e.g. to M1 or WC2, etc) to 'lower level command' is to be routed when sent from the host device to the peripheral device.

Thus, in this non-limiting example, (i) each peripheral device model is associated with a different 'mapping scheme' between the higher and lower level commands; (ii) each scheme routes 'lower level' commands differently; (iii) once the particular model is identified according to USB endpoint data (and optionally additional data), it is possible to employ the 'correct' matching scheme—this matching scheme specifies how to route (i.e. to a target USB interface—.e.g. to M1 or WC2, etc) commands sent from the host device to the peripheral device; (iv) commands are thus routed according to the identified device model, and thus are routed in accordance with results of analyzing USB endpoint data (and optionally additional data).

Each peripheral device may use different protocols for encoding commands. For example, a device from 'Vendor A' (i.e. 'Model X') may encode a command for retrieving a photograph or for retrieving a cell-phone log using a text protocol (e.g. an XML or SOAP protocol) while a device from 'Vendor B' (i.e. 'Model Y') may encode a command for retrieving a photograph or for retrieving a binary protocol. Once the particular model is determined (i.e. in accordance with results of analyzing USB endpoint data and optionally additional data), it is possible to employ a 'matching scheme' for encoding commands that matches the particular model—this matching scheme may relate to protocol selection or to when to switch from a first protocol to a second protocol.

It is now disclosed for the first time a method of encoding a peripheral device command by a host device that is coupled to a peripheral device via a USB port, the method comprising:
  a. receiving USB endpoint descriptor data by the host device from a peripheral device coupled to the host device via a USB port;
  b. analyzing the received USB endpoint descriptor data by the host device;
  c. according to the results of the analysis of the USB endpoint descriptor data, effecting a binary protocol-text protocol selection that prefers a text protocol over candidate binary protocol(s) or a binary protocol over candidate text protocol(s); and
  d. encoding a command using the selected text or binary protocol.

It is now disclosed a method of retrieving cell-phone related data by a host device from a peripheral cell phone device that is coupled to the host device via a USB port, the method comprising: a. receiving USB endpoint descriptor data by the host device from the peripheral cell phone device that is coupled to the host device via the USB port; b. analyzing the received USB endpoint descriptor data by the host device; and c. in a manner determined by the results of the analysis of the USB endpoint descriptor data, retrieving by the host device from the peripheral cell phone device at least one: A. one or more SMS message(s); B. a cell phone log or a portion thereof; C. one or more cell phone-address-book entries; and D. retrieving an IMEI or ESN or MEID hardware identifier.

It is now disclosed a method of determining device property(ies) of a peripheral device by a host device that is coupled to the peripheral device via a USB port, the method comprising: a. receiving USB endpoint descriptor data by the host device from the peripheral device that is coupled to the host device via a USB port; b. analyzing the received USB endpoint descriptor data by the host device; and c. in a manner determined by the results of the analysis of the USB endpoint descriptor data, determining at least one of: A. a memory capacity of the peripheral device; B. a cellular network type(s) supported by the peripheral device; C. a presence or absence of an onboard keyboard on the peripheral device; D. an SMS repository capacity and/or an cell-phone address book capacity of the peripheral device; and E. a SMS and/or cellular phone log and/or cell phone address book and/or cellular phone hardware identifier retrieval scheme.

It is now disclosed a method of sending a command from a host device to a composite peripheral device that is coupled to the host device via a USB port, the method comprising: a. receiving USB endpoint descriptor data by the host device from the composite peripheral device that is coupled to the host device via the USB port, the composite peripheral device having a plurality of interface descriptors; b. analyzing the received USB endpoint descriptor data by the host device; and c. according to the results of the analysis of the USB endpoint descriptor data, selecting a target interface descriptor selected from the plurality of interface descriptors; and d. routing a command sent to the peripheral device to the interface specified by the target interface descriptor.

It is now disclosed a method of encoding a peripheral device command by a host device that is coupled to a peripheral device via a USB port, the method comprising: a. receiving USB endpoint descriptor data by the host device from a peripheral device coupled to the host device via a USB port; b. analyzing the received USB endpoint descriptor data by the host device; c. according to the results of the analysis of the USB endpoint descriptor data, effecting a binary protocol-text protocol selection that prefers a text protocol over candidate binary protocol(s) or a binary protocol over candidate text protocol(s); and d. encoding a command using the selected text or binary protocol.

It is now disclosed a method of encoding a peripheral device command by a host device that is coupled to a peripheral device via a USB port, the method comprising: a. receiving USB endpoint descriptor data by the host device from the peripheral device that is coupled to the host device via a USB port; b. analyzing the received USB endpoint descriptor data by the host device; and c. for a candidate protocol set that includes all members of protocol set A={PROTOCOL_1, PROTOCOL_2, PROTOCOL_5, PROTOCOL_6}, selecting a protocol from the candidate protocol set in accordance with the results of the analysis of the USB descriptor endpoint descriptor data, the selected protocol being a member of protocol set A; and d. encoding one or more commands using the selected protocol that is a member of protocol set A. wherein PROTOCOL_1 is an AT protocol, PROTOCOL_2 is a Nokia fBus Protocol, PROTOCOL_5 is a Qualcom BREW OS protocol, PROTOCOL_6 is a mediate transfer protocol (MTP) of Microscoft®.

It is now disclosed a method of encoding a peripheral device command by a host device that is coupled to a peripheral device via a USB port, the method comprising: a. receiving USB endpoint descriptor data by the host device from the peripheral device that is coupled to the host device via a USB port; b. analyzing the received USB endpoint descriptor data by the host device; and c. for a candidate protocol set that includes all members of protocol set B={PROTOCOL_1, PROTOCOL_2, PROTOCOL_3, PROTOCOL_4, PROTOCOL_5, PROTOCOL_6, PROTOCOL_8, PROTOCOL_9, PROTOCOL_10, PROTOCOL_11, PROTOCOL_12,}, selecting a protocol from the candidate protocol set in accordance with the results of the analysis of the USB descriptor endpoint descriptor data, the selected protocol being a member of protocol set B; and d. encoding one or more commands using the selected protocol that is a member of protocol set B, wherein PROTOCOL_1 is an AT protocol, PROTOCOL_2 is a Nokia fBus Protocol, PROTOCOL_3 is a OBject EXchange (OBEX) protocol, PROTOCOL_4 a block-type mass-storage protocol, PROTOCOL_5 is a Qualcom BREW OS protocol, PROTOCOL_6 is a mediate transfer protocol (MTP) of Microscoft®, PROTOCOL_8 is a Android Debug Bridge (ADB) protocol, PROTOCOL_9 is an Apple® IOS proprietary protocol, PROTOCOL_10 is a Synchronization Markup Language (SyncML) protocol, PROTOCOL_11 is a remote application programming interface (RAPI) over Remote Network Driver Interface Specification (RNDIS) protocol), PROTOCOL_12 is a SIM card protocol.

It is now disclosed a method of encoding a peripheral device command by a host device that is coupled to a peripheral device via a USB port, the method comprising: a. receiving USB endpoint descriptor data by the host device from the peripheral device that is coupled to the host device via a USB port; b. analyzing the received USB endpoint descriptor data by the host device; and c. for a candidate protocol set that includes all members of protocol set C={PROTOCOL_1, PROTOCOL_2, PROTOCOL_5, PROTOCOL_7, PROTOCOL_9,}, selecting a protocol from the candidate protocol set in accordance with the results of the analysis of the USB descriptor endpoint descriptor data, the selected protocol being a member of protocol set C; and d. encoding one or more commands using the selected protocol that is a member of protocol set C, wherein PROTOCOL_1 is an AT protocol, PROTOCOL_2 is a Nokia fBus Protocol, PROTOCOL_5 is a Qualcom BREW OS protocol, PROTOCOL_7 is a RIM OS proprietary protocol, PROTOCOL_9 is an Apple® IOS proprietary protocol.

It is now disclosed a method of encoding a peripheral device command by a host device that is coupled to a peripheral device via a USB port, the method comprising: a. receiving USB endpoint descriptor data by the host device from the peripheral device that is coupled to the host device via a USB port; b. analyzing the received USB endpoint descriptor data by the host device; and c. for a candidate protocol set that includes all members of protocol set D={PROTOCOL_1, PROTOCOL_2, PROTOCOL_3, PROTOCOL_4, PROTOCOL_5, PROTOCOL_6, PROTOCOL_7, PROTOCOL_8, PROTOCOL_9, PROTOCOL_10, PROTOCOL_11, PROTOCOL_12}, selecting a protocol from the candidate protocol set in accordance with the results of the analysis of the USB descriptor endpoint descriptor data, the selected protocol being a member of protocol set D; and d. encoding one or more commands using the selected protocol that is a member of protocol set D, wherein PROTOCOL_1 is an AT protocol, PROTOCOL_2 is a Nokia fBus Protocol, PROTOCOL_3 is a OBject EXchange (OBEX) protocol, PROTOCOL_4 is a block-type mass-storage protocol, PROTOCOL_5 is a Qualcom BREW OS protocol, PROTOCOL_6 is a mediate transfer protocol (MTP) of Microscoft®, PROTOCOL_7 is a RIM OS proprietary protocol, PROTOCOL_8 is a Android Debug Bridge (ADB) protocol, PROTOCOL_9 is an Apple® IOS proprietary protocol, PROTOCOL_10 is a Synchronization Markup Language (SyncML) protocol, PROTOCOL_11 is a remote application programming interface (RAPI) over Remote Network Driver Interface Specification (RNDIS) protocol), PROTOCOL_12 is a SIM card protocol.

It is now disclosed a protocol switch method by a host device that is coupled to a peripheral device via a USB port, the method comprising: a. receiving USB endpoint descriptor data by the host device from the peripheral device that is coupled to the host device via a USB port; b. analyzing the received USB endpoint descriptor data by the host device; and c. contingent upon results of the analyzing of the received USB endpoint descriptor data, effecting a protocol switch by the host device from a first protocol to a second protocol different from the first protocol such that: i. both the first and second protocols are members of protocol set A={PROTOCOL_1, PROTOCOL_2 PROTOCOL_5, PROTOCOL_6}; ii. the last host-encoded command before the protocol switch is encoded using the first protocol; and iii. the first host-encoded command after the protocol switch is encoded using the second protocol, wherein PROTOCOL_1 is an AT protocol, PROTOCOL_2 is a Nokia fBus Protocol, PROTOCOL_5 is a Qualcom BREW OS protocol, PROTOCOL_6 is a mediate transfer protocol (MTP) of Microscoft®.

It is now disclosed a protocol switch method by a host device that is coupled to a peripheral device via a USB port, the method comprising: a. receiving USB endpoint descriptor data by the host device from a peripheral device coupled to the host device via a USB port; b. analyzing the received USB endpoint descriptor data by the host device; and c. contingent upon results of the analyzing of the received USB endpoint descriptor data, effecting a protocol switch by the host device from a first protocol to a second protocol different from the first protocol such that: i. both the first and second protocols are members protocol set B={PROTOCOL_1, PROTOCOL_2, PROTOCOL_3, PROTOCOL_4, PROTOCOL_5, PROTOCOL_6, PROTOCOL_8, PROTOCOL_9, PROTOCOL_10, PROTOCOL_11, PROTOCOL_12}; ii. the last host-encoded command before the protocol switch is encoded using the first protocol; and iii. the first host-encoded command after the protocol switch is encoded using the second protocol, wherein PROTOCOL_1 is an AT protocol, PROTOCOL_2 is a Nokia fBus Protocol, PROTOCOL_3 is a OBject EXchange (OBEX) protocol, PROTOCOL_4 is a block-type mass-storage protocol, PROTOCOL_5 is a Qualcom BREW OS protocol, PROTOCOL_6 is a mediate transfer protocol (MTP) of Microscoft®, PROTOCOL_8 is a Android Debug Bridge (ADB) protocol, PROTOCOL_9 is an Apple® IOS proprietary protocol, PROTOCOL_10 is a Synchronization Markup Language (SyncML) protocol, PROTOCOL_11 is a remote application programming interface (RAPI) over Remote Network Driver Interface Specification (RNDIS) protocol), PROTOCOL_12 is a SIM card protocol.

It is now disclosed a protocol switch method by a host device that is coupled to a peripheral device via a USB port, the method comprising: a. receiving USB endpoint descriptor data by the host device from the peripheral device that is coupled to the host device via a USB port; b. analyzing the received USB endpoint descriptor data by the host device; and c. contingent upon results of the analyzing of the received USB endpoint descriptor data, effecting a protocol switch by the host device from a first protocol to a second protocol different from the first protocol such that: i. both the first and second protocols are members protocol set C={PROTOCOL_1, PROTOCOL_2, PROTOCOL_5, PROTOCOL_7, PROTOCOL_9}; ii. the last host-encoded command before the protocol switch is encoded using the first protocol; and iii. the first host-encoded command after the protocol switch is encoded using the second protocol, wherein PROTOCOL_1 is an AT protocol, PROTOCOL_2 is a Nokia fBus Protocol, PROTOCOL_5 is a Qualcom BREW OS protocol, PROTOCOL_7 is a RIM OS proprietary protocol, PROTOCOL_9 is an Apple® IOS proprietary protocol.

It is now disclosed a protocol switch method by a host device that is coupled to a peripheral device via a USB port, the method comprising: a. receiving USB endpoint descriptor data by the host device from the peripheral device that is coupled to the host device via a USB port; b. analyzing the received USB endpoint descriptor data by the host device; and c. contingent upon results of the analyzing of the received USB endpoint descriptor data, effecting a protocol switch by the host device from a first protocol to a second protocol different from the first protocol such that: i. both the first and second protocols are members protocol set D=as {PROTOCOL_1, PROTOCOL_2, PROTOCOL_3, PROTOCOL_4, PROTOCOL_5, PROTOCOL—6, PROTOCOL_7, PROTOCOL_8, PROTOCOL_9, PROTOCOL_10, PROTOCOL_11, PROTOCOL_12}, ii. the last host-encoded command before the protocol switch is encoded using the first protocol; and iii. the first host-encoded command after the protocol switch is encoded using the second protocol, wherein PROTOCOL_1 is an AT protocol, PROTOCOL_2 is a Nokia fBus Protocol, PROTOCOL_3 is a OBject EXchange (OBEX) protocol, PROTOCOL_4 is a block-type mass-storage protocol, PROTOCOL_5 is a Qualcom BREW OS protocol, PROTOCOL_6 is a mediate transfer protocol (MTP) of Microscoft®, PROTOCOL_7 is a RIM OS proprietary protocol, PROTOCOL_8 is a Android Debug Bridge (ADB) protocol, PROTOCOL_9 is an Apple® IOS proprietary protocol, PROTOCOL_10 is a Synchronization Markup Language (SyncML) protocol, PROTOCOL_11 is a remote application programming interface (RAPI) over Remote Network Driver Interface Specification (RNDIS) protocol), PROTOCOL_12 is a SIM card protocol.

It is now disclosed a protocol switch method by a host device that is coupled to a peripheral device via a USB port, the method comprising: a. receiving USB endpoint descriptor data by the host device from the peripheral device that is coupled to the host device via a USB port; b. analyzing the received USB endpoint descriptor data by the host device; and c. contingent upon results of the analyzing of the received USB endpoint descriptor data, effecting a protocol switch by the host device from a first protocol that is one of a binary protocol and a text protocol to a second protocol that is different from the first protocol and that is the other from a text protocol and a binary protocol such that: A. the last host-encoded command before the protocol switch is encoded using the first protocol; and B. the first host-encoded command after the protocol switch is encoded using the second protocol.

In some embodiments, steps (b) and (c) are carried out in accordance with the combination of the USB endpoint descriptor data and data of higher levels in the USB descriptor hierarchy.

In some embodiments, steps (b) and (c) are carried out in accordance with the USB endpoint descriptor data without influence by data of higher levels in the USB descriptor hierarchy. In some embodiments, the analysis of step (b) includes analyzing the bEndpointAddress field and wherein step (c) is carried out in a manner that is contingent upon the results of the analyzing of the bEndpointAddress field.

In some embodiments, the analysis of step (b) includes analyzing the bmAttributes field and wherein step (c) is carried out in a manner that is contingent upon the results of the analyzing of the bmAttributes field.

In some embodiments, the analysis of step (b) includes analyzing the wMaxPacketSize field and wherein step (c) is carried out in a manner that is contingent upon the results of the analyzing of the wMaxPacketSize field.

In some embodiments, the analysis of step (b) includes analyzing the bInterval field and wherein step (c) is carried out in a manner that is contingent upon results of the analyzing of the bInterval field.

It is now disclosed a method of operating a host device on which operating system (OS) software is executing, the method comprising: contingent upon the host device being in a first mode, responding to a coupling between a peripheral device and a host device so that the peripheral device passes hardware identifier information to the host device directly or indirectly specifying device driver(s) by preventing the hardware identifier information from reaching an executing plug-and-play-manager of the OS executing on the host side, wherein the method is carried out on a host device that provides mutually-exclusive first and second modes, and wherein the method is carried out contingently on the host device being in the first mode and not in the second mode.

In some embodiments, the method further comprises: responding into a user log-in event or user attempted-log-in event by transitioning the host device mode from one of the first and second modes to the other of the first and second modes.

In some embodiments, the method further comprises: in accordance with content of user input received from a user into the host device, transitioning the host device mode from one of the first and second modes to the other of the first and second modes.

It is now disclosed a method of operating a host device on which operating system (OS) software is executing, the method comprising: a. responding, by soliciting user input, to a coupling between a peripheral device and a host device so that the peripheral device passes to the host device hardware identifier information that directly or indirectly specifying device driver(s); b. in response to the user input soliciting, receiving the user input into the host device from the user; c. in accordance with the contents of the user input, operating the host device in a first mode or in a second mode, the first and second modes being mutually exclusive; d. only if the host device is operating in the first mode, preventing the device-driver-specifying hardware identifier information from reaching an executing plug-and-play-manager of the OS executing on the host side, thereby preventing the loading of the device driver(s) specified by the hardware identifier; and e. otherwise, refraining from the preventing so that the OS executing on the host device or component(s) thereof forwards the hardware identifier to the plug-and-play-manager of the OS.

It is now disclosed a method of operating a host device on which operating system (OS) is executing, the host device configured to receive input via a plurality of USB ports divided into first and second non-empty complementary disjoint subsets, the method comprising: in response to a coupling, via one of the USB ports, between a peripheral device and a host device so that the peripheral device passes to the host device, via the one of the USB ports, hardware identifier information that directly or indirectly specifying device driver(s); if the coupling is via a USB port that is a member of the first subset, preventing the device-driver-specifying hardware identifier information from reaching an executing plug-and-play-manager of the OS executing on the host side, thereby preventing the loading of the device driver(s) specified by the hardware identifier; and otherwise, refraining from the preventing so that the OS executing on the host device or component(s) thereof forwards the hardware identifier to the plug-and-play-manager of the OS.

In some embodiments, at least one of the USB ports are built-in ports of the host device.

In some embodiments, at least one of the USB ports is an auxiliary external port.

It is now disclosed a host device apparatus configured to carry out any method of any previous claim.

It is now disclosed a method of retrieving cell-phone related data from a peripheral device by a host device on which operating system (OS) software executes, the method comprising: a. in response to a coupling between the peripheral device and the host device via a USB port so that passes hardware identifier information to the host device directly or indirectly specifying device driver(s), executing code to prevent the executing OS software from loading the specified device driver(s) on the host device; b. analyzing peripheral-device-descriptive data received from the peripheral device by the host device via the USB port; and c. in a manner determined by the results of the analysis of the peripheral-device-descriptive data, determining at least one of: A. a memory capacity of the peripheral device; B. a cellular network type(s) supported by the peripheral device; C. a presence or absence of an onboard keyboard on the peripheral device; D. an SMS repository capacity and/or an cellphone address book capacity of the peripheral device; and E. a SMS and/or cellular phone log and/or cell phone address book and/or cellular phone hardware identifier retrieval scheme.

It is now disclosed a method of retrieving cell-phone related data from a composite peripheral device by a host device on which operating system (OS) software executes, the method comprising: a. in response to a coupling between the composite peripheral device having a plurality of USB interface descriptors and the host device via a USB port so that passes hardware identifier information to the host device directly or indirectly specifying device driver(s), executing code to prevent the executing OS software from loading the specified device driver(s) on the host device; b. analyzing peripheral-device-descriptive data received from the peripheral device by the host device via the USB port; and c. according to the results of the analysis of the peripheral-device-descriptive data, selecting a target interface descriptor selected from the plurality of interface descriptors; and d. routing a command sent to the peripheral device to the interface specified by the target interface descriptor.

It is now disclosed a method of retrieving cell-phone related data from a peripheral device by a host device on which operating system (OS) software executes, the method comprising: a. in response to a coupling between the peripheral device and the host device via a USB port so that passes hardware identifier information to the host device directly or indirectly specifying device driver(s), executing code to prevent the executing OS software from loading the specified device driver(s) on the host device; b. analyzing peripheral-device-descriptive data received from the peripheral device by the host device via the USB port; and c. according to the results of the analysis of the peripheral-device-descriptive data, effecting a binary protocol-text protocol selection that prefers a text protocol over candidate binary protocol(s) or a binary protocol over candidate text protocol(s); and d. encoding a command using the selected text or binary protocol.

In some embodiments, the host device communicates with the peripheral device by means of a substitute driver that is different from a driver specified directly or indirectly by the hardware identifier information passed from the peripheral device to the host device.

It is now disclosed a host device apparatus configured to carry out any method of any previous claim.

It is now disclosed a system comprising a host device apparatus configured to carry out any method of any previous claim and the peripheral device coupled to the host device apparatus.

It is now disclosed a host device comprising: a) a USB interface operative for inter-device coupling with a peripheral cell phone device; and b) a electronic circuitry configured to: i. receive, via the USB interface and from the peripheral cell phone device that is coupled to the host device via the USB port, USB endpoint descriptor data; ii. analyzing the received USB endpoint descriptor data; and iii. in a manner determined by the results of the analysis of the USB endpoint descriptor data, retrieve via the USB interface, from the peripheral cell phone device, at least one: A. one or more SMS message(s); B. a cell phone log or a portion thereof; C. one or more cell phone-address-book entries; and D. retrieving an IMEI or ESN or MEID hardware identifier.

It is now disclosed a host device comprising: a) a USB interface operative for inter-device coupling with a peripheral device; and b) a electronic circuitry configured to: i. receive, via the USB interface and from the peripheral cell phone device that is coupled to the host device via the USB port, USB endpoint descriptor data; ii. analyze the received USB endpoint descriptor; and iii. in a manner determined by the results of the analysis of the USB endpoint descriptor data, determine at least one of: A. a memory capacity of the peripheral device; B. a cellular network type(s) supported by the peripheral device; C. a presence or absence of an onboard keyboard on the peripheral device; D. an SMS repository capacity and/or an cellphone address book capacity of the peripheral device; and E. a SMS and/or cellular phone log and/or cell phone address book and/or cellular phone hardware identifier retrieval scheme.

It is now disclosed host device comprising: a) a USB interface operative for inter-device coupling with a peripheral device; and b) a electronic circuitry configured to: i. receive, via the USB interface and from the peripheral cell phone device that is coupled to the host device via the USB port, USB endpoint descriptor data; ii. analyze the received USB endpoint descriptor; and iii. according to the results of the analysis of the USB endpoint descriptor data, selecting a target interface descriptor selected from the plurality of interface descriptors; and iv. routing a command sent to the peripheral device to the interface specified by the target interface descriptor.

It is now disclosed a host device comprising: a) a USB interface operative for inter-device coupling with a peripheral device; and b) a electronic circuitry configured to: i. receive, via the USB interface and from the peripheral cell phone device that is coupled to the host device via the USB port, USB endpoint descriptor data; ii. analyze the received USB endpoint descriptor; and iii. according to the results of the analysis of the USB endpoint descriptor data, effect a binary protocol-text protocol selection that prefers a text protocol over candidate binary protocol(s) or a binary protocol over candidate text protocol(s); and iv. encode a command using the selected text or binary protocol.

It is now disclosed a host device comprising: a) a USB interface operative for inter-device coupling with a peripheral device; and b) a electronic circuitry configured to: i. receive, via the USB interface and from the peripheral cell phone device that is coupled to the host device via the USB port, USB endpoint descriptor data; ii. analyze the received USB endpoint descriptor; and iii. for a candidate protocol set that includes all members of protocol set A={PROTOCOL_1, PROTOCOL_2, PROTOCOL_5, PROTOCOL_6,}, select a protocol from the candidate protocol set in accordance with the results of the analysis of the USB descriptor endpoint descriptor data, the selected protocol being a member of protocol set A; and iv. encode one or more commands using the selected protocol that is a member of protocol set A. wherein PROTOCOL_1 is an AT protocol, PROTOCOL_2 is a Nokia fBus Protocol, PROTOCOL_5 is a Qualcom BREW OS protocol, PROTOCOL_6 is a mediate transfer protocol (MTP) of Microscoft®.

It is now disclosed a host device comprising: a) a USB interface operative for inter-device coupling with a peripheral device; and b) a electronic circuitry configured to: i. receive, via the USB interface and from the peripheral cell phone device that is coupled to the host device via the USB port, USB endpoint descriptor data; ii. analyze the received USB endpoint descriptor; and iii. for a candidate protocol set that includes all members of protocol set B={ PROTOCOL_1, PROTOCOL_2, PROTOCOL_3, PROTOCOL_4, PROTOCOL_5, PROTOCOL_6, PROTOCOL_8, PROTOCOL_9, PROTOCOL_10, PROTOCOL_11, PROTOCOL_12}, select a protocol from the candidate protocol set in accordance with the results of the analysis of the USB descriptor endpoint descriptor data, the selected protocol being a member of protocol set B; and d. encode one or more commands using the selected protocol that is a member of protocol set B, wherein PROTOCOL_1 is an AT protocol, PROTOCOL_2 is a Nokia fBus Protocol, PROTOCOL_3 is a OBject EXchange (OBEX) protocol, PROTOCOL_4 is a block-type mass-storage protocol, PROTOCOL_5 is a Qualcom BREW OS protocol, PROTOCOL_6 is a mediate transfer protocol (MTP) of Microscoft®, PROTOCOL_8 is a Android Debug Bridge (ADB) protocol, PROTOCOL_9 is an Apple® IOS proprietary protocol, PROTOCOL_10 is a Synchronization Markup Language (SyncML) protocol, PROTOCOL_11 is a remote application programming interface (RAPI) over Remote Network Driver Interface Specification (RNDIS) protocol), PROTOCOL_12 is a SIM card protocol.

It is now disclosed a host device comprising: a) a USB interface operative for inter-device coupling with a peripheral device; and b) a electronic circuitry configured to: i. receive, via the USB interface and from the peripheral cell phone device that is coupled to the host device via the USB port, USB endpoint descriptor data; ii. analyze the received USB endpoint descriptor; and iii. for a candidate protocol set that includes all members of protocol set C={PROTOCOL_1, PROTOCOL_2, PROTOCOL_5, PROTOCOL_7, PROTOCOL_9,}, select a protocol from the candidate protocol set in accordance with the results of the analysis of the USB descriptor endpoint descriptor data, the selected protocol being a member of protocol set C; and iv. encoding one or more commands using the selected protocol that is a member of protocol set C, wherein PROTOCOL_1 is an AT protocol, PROTOCOL_2 is a Nokia fBus Protocol, PROTOCOL_5 is a Qualcom BREW OS protocol, PROTOCOL_7 is a RIM OS proprietary protocol, PROTOCOL_9 is an Apple® IOS proprietary protocol.

It is now disclosed a host device comprising: a) a USB interface operative for inter-device coupling with a peripheral device; and b) a electronic circuitry configured to: i. receive, via the USB interface and from the peripheral cell phone device that is coupled to the host device via the USB port, USB endpoint descriptor data; ii. analyze the received USB endpoint descriptor; and iii. for a candidate protocol set that includes all members of protocol set D={PROTOCOL_1, PROTOCOL_2, PROTOCOL_3, PROTOCOL_4, PROTOCOL_5, PROTOCOL_6, PROTOCOL_7, PROTOCOL_8, PROTOCOL_9, PROTOCOL_10, PROTOCOL_11, PROTOCOL_12,}, select a protocol from the candidate protocol set in accordance with the results of the analysis of the USB descriptor endpoint descriptor data, the selected protocol being a member of protocol set D; and iv. encode one or more commands using the selected protocol that is a member of protocol set D, wherein PROTOCOL_1 is an AT protocol, PROTOCOL_2 is a Nokia fBus Protocol, PROTOCOL_3 is a OBject EXchange (OBEX) protocol, PROTOCOL_4 is a block-type mass-storage protocol, PROTOCOL_5 is a Qualcom BREW OS protocol, PROTOCOL_6 is a mediate transfer protocol (MTP) of Microscoft®, PROTOCOL_7 is a RIM OS proprietary protocol, PROTOCOL_8 is a Android Debug Bridge (ADB) protocol, PROTOCOL_9 is an Apple® IOS proprietary protocol, PROTOCOL_10 is a Synchronization Markup Language (SyncML) protocol, PROTOCOL_11 is a remote application programming interface (RAPI) over Remote Network Driver Interface Specification (RNDIS) protocol), PROTOCOL_12 is a SIM card protocol.

It is now disclosed a host device comprising: a) a USB interface operative for inter-device coupling with a peripheral device; and b) a electronic circuitry configured to: i. receive, via the USB interface and from the peripheral cell phone device that is coupled to the host device via the USB port, USB endpoint descriptor data; ii. analyze the received USB endpoint descriptor; and iii. contingent upon results of the analyzing of the received USB endpoint descriptor data, effect a protocol switch by the host device from a first protocol to a second protocol different from the first protocol such that: i. both the first and second protocols are members of protocol set A={PROTOCOL_1, PROTOCOL_2, PROTOCOL_5, PROTOCOL_6,}; ii. the last host-encoded command before the protocol switch is encoded using the first protocol; and iii. the first host-encoded command after the protocol switch is encoded using the second protocol, wherein PROTOCOL_1 is an AT protocol, PROTOCOL_2 is a Nokia fBus Protocol, PROTOCOL_5 is a Qualcom BREW OS protocol, PROTOCOL_6 is a mediate transfer protocol (MTP) of Microscoft®.

It is now disclosed a host device comprising: a) a USB interface operative for inter-device coupling with a peripheral device; and b) a electronic circuitry configured to: i. receive, via the USB interface and from the peripheral cell phone device that is coupled to the host device via the USB port, USB endpoint descriptor data; ii. analyze the received USB endpoint descriptor; and iii. contingent upon results of the analyzing of the received USB endpoint descriptor data, effect a protocol switch by the host device from a first protocol to a second protocol different from the first protocol such that: i. both the first and second protocols are members of protocol set B={PROTOCOL_1, PROTOCOL_2, PROTOCOL_3, PROTOCOL_4, PROTOCOL_5, PROTOCOL_6, PROTOCOL_8, PROTOCOL_9, PROTOCOL_10, PROTOCOL_11, PROTOCOL_12,}; ii. the last host-encoded command before the protocol switch is encoded using the first protocol; and iii. the first host-encoded command after the protocol switch is encoded using the second protocol, wherein PROTOCOL_1 is an AT protocol, PROTOCOL_2 is a Nokia fBus Protocol, PROTOCOL_ is a OBject EXchange (OBEX) protocol, PROTOCOL_4 is a block-type mass-storage protocol, PROTOCOL_5 is a Qualcom BREW OS protocol, PROTOCOL_6 is a mediate transfer protocol (MTP) of Microscoft®, PROTOCOL_8 is a Android Debug Bridge (ADB) protocol, PROTOCOL_9 is an Apple® IOS proprietary protocol, PROTOCOL_10 is a Synchronization Markup Language (SyncML) protocol, PROTOCOL_11 is a remote application programming interface (RAPI) over Remote Network Driver Interface Specification (RNDIS) protocol), PROTOCOL_12 is a SIM card protocol.

It is now disclosed a host device comprising: a) a USB interface operative for inter-device coupling with a peripheral device; and b) a electronic circuitry configured to: i. receive, via the USB interface and from the peripheral cell phone device that is coupled to the host device via the USB port, USB endpoint descriptor data; ii. analyze the received USB endpoint descriptor; and iii. contingent upon results of the analyzing of the received USB endpoint descriptor data, effect a protocol switch by the host device from a first protocol to a second protocol different from the first protocol such that: i. both the first and second protocols are members of protocol set C={PROTOCOL_1, PROTOCOL_2, PROTOCOL_5, PROTOCOL_7, PROTOCOL_9,}; ii. the last host-encoded command before the protocol switch is encoded using the first protocol; and iii. the first host-encoded command after the protocol switch is encoded using the second protocol, wherein PROTOCOL_1 is an AT protocol, PROTOCOL_2 is a Nokia fBus Protocol, PROTOCOL_5 is a Qualcom BREW OS protocol, PROTOCOL_7 is a RIM OS proprietary protocol, PROTOCOL_9 is an Apple® IOS proprietary protocol.

It is now disclosed a host device comprising: a) a USB interface operative for inter-device coupling with a peripheral device; and b) a electronic circuitry configured to: i. receive, via the USB interface and from the peripheral cell phone device that is coupled to the host device via the USB port, USB endpoint descriptor data; ii. analyze the received USB endpoint descriptor; and iii. contingent upon results of the analyzing of the received USB endpoint descriptor data, effect a protocol switch by the host device from a first protocol to a second protocol different from the first protocol such that: i. both the first and second protocols are members of protocol set D=as {PROTOCOL_1, PROTOCOL_2, PROTOCOL_3, PROTOCOL_4, PROTOCOL_5, PROTOCOL_6, PROTOCOL_7, PROTOCOL_8, PROTOCOL_9, PROTOCOL_10, PROTOCOL_11, PROTOCOL_12,}, ii. the last host-encoded command before the protocol switch is encoded using the first protocol; and iii. the first host-encoded command after the protocol switch is encoded using the second protocol, wherein PROTOCOL_1 is an AT protocol, PROTOCOL_2 is a Nokia fBus Protocol, PROTOCOL_3 is a OBject EXchange (OBEX) protocol, PROTOCOL_4 is a block-type mass-storage protocol, PROTOCOL_15 is a Qualcom BREW OS protocol, PROTOCOL_6 is a mediate transfer protocol (MTP) of Microscoft®, PROTOCOL_7 is a RIM OS proprietary protocol, PROTOCOL_8 is a Android Debug Bridge (ADB) protocol, PROTOCOL_9 is an Apple® IOS proprietary protocol, PROTOCOL_10 is a Synchronization Markup Language (SyncML) protocol, PROTOCOL_11 is a remote application programming interface (RAPI) over Remote Network Driver Interface Specification (RNDIS) protocol), PROTOCOL_12 is a SIM card protocol.

It is now disclosed a host device comprising: a) a USB interface operative for inter-device coupling with a peripheral device; and b) a electronic circuitry configured to: i. receive, via the USB interface and from the peripheral cell phone device that is coupled to the host device via the USB port, USB endpoint descriptor data; ii. analyze the received USB endpoint descriptor; and iii. contingent upon results of the analyzing of the received USB endpoint descriptor data, effect a protocol switch by the host device from a first protocol that is one of a binary protocol and a text protocol to a second protocol that is different from the first protocol and that is the other from a text protocol and a binary protocol such that: A. the last host-encoded command before the protocol switch is encoded using the first protocol; and B. the first host-encoded command after the protocol switch is encoded using the second protocol.

In some embodiments, the electronic circuitry is configured to carry out the steps (ii) and (iii) in accordance with the combination of the USB endpoint descriptor data and data of higher levels in the USB descriptor hierarchy.

In some embodiments, steps (b) and (c) are carried out in accordance with the USB endpoint descriptor data without influence by data of higher levels in the USB descriptor hierarchy.

In some embodiments, the analysis of step (b) includes analyzing the bEndpointAddress field and wherein step (c) is carried out in a manner that is contingent upon the results of the analyzing of the bEndpointAddress field.

In some embodiments, the analysis of step (b) includes analyzing the bmAttributes field and wherein step (c) is carried out in a manner that is contingent upon the results of the analyzing of the bmAttributes field.

In some embodiments, the analysis of step (b) includes analyzing the wMaxPacketSize field and wherein step (c) is carried out in a manner that is contingent upon the results of the analyzing of the wMaxPacketSize field.

In some embodiments, the analysis of step (b) includes analyzing the bInterval field and wherein step (c) is carried out in a manner that is contingent upon results of the analyzing of the bInterval field.

It is now disclosed a host device comprising: a) a USB interface operative for inter-device coupling with a peripheral device; and b) electronic circuitry configured to execute operating system (OS) software code, the electronic circuitry having mutually-exclusive first and second modes so that the host device has mutually-exclusive first and second modes, the electronic circuitry being further configured to carry out the following while the operating system (OS) software code executes: contingent upon the host device being in a first mode, responding to a coupling between the peripheral device and the host device so that the peripheral device passes hardware identifier information to the host device directly or indirectly specifying device driver(s) by preventing the hardware identifier information from reaching an executing plug-and-play-manager of the OS executing on the host side, wherein the method is carried out contingently the host device being in the first mode and not in the second mode.

In some embodiments, the electronic circuitry is further operative to carry out the following: responding into a user log-in event or user attempted-log-in event by transitioning the electronic circuitry mode from one of the first and second modes to the other of the first and second modes.

In some embodiments, the electronic circuitry is further operative to carry out the following: In accordance with content of user input received from a user into the host device, transitioning the host device mode from one of the first and second modes to the other of the first and second modes.

It is now disclosed a host device comprising: a) a USB interface operative for inter-device coupling with a peripheral device; and b) electronic circuitry configured to execute operating system (OS) software code, the electronic circuitry having mutually-exclusive first and second modes so that the host device has mutually-exclusive first and second modes, the electronic circuitry being further configured to carry out the following while the operating system (OS) software code executes: i. in response to the user input soliciting, receive the user input into the host device from the user; ii. in accordance with the contents of the user input, operate the host device in a first mode or in a second mode, the first and second modes being mutually exclusive; iii. only if the host device is operating in the first mode, prevent the device-driver-specifying hardware identifier information from reaching an executing plug-and-play-manager of the OS executing on the host side, thereby preventing the loading of the device driver(s) specified by the hardware identifier; and iv. otherwise, refrain from the preventing so that the OS executing on the host device or component(s) thereof forwards the hardware identifier to the plug-and-play-manager of the OS.

It is now disclosed a host device comprising: a) a plurality of USB ports divided into first and second non-empty complementary disjoint subsets; and b) electronic circuitry configured to execute operating system (OS) software code, the electronic circuitry being further configured to carry out the following while the operating system (OS) software code executes: in response to a coupling, via one of the USB ports, between a peripheral device and a host device so that the peripheral device passes to the host device, via the one of the USB ports, hardware identifier information that directly or indirectly specifying device driver(s); A) if the coupling is via a USB port that is a member of the first subset, preventing the device-driver-specifying hardware identifier information from reaching an executing plug-and-play-manager of the OS executing on the host side, thereby preventing the loading of the device driver(s) specified by the hardware identifier; and B) otherwise, refraining from the preventing so that the OS executing on the host device or component(s) thereof forwards the hardware identifier to the plug-and-play-manager of the OS.

In some embodiments, at least one of the USB ports are built-in ports of the host device. In some embodiments, at least one of the USB ports is an auxiliary external port.

It is now disclosed a method of encoding a peripheral device command by a host device that is coupled to a peripheral device via a USB port, the method comprising: a. receiving USB endpoint descriptor data by the host device from the peripheral device that is coupled to the host device via a USB port; b. analyzing the received USB endpoint descriptor data by the host device; and c. for a candidate protocol set E that includes any two or more members of protocol set X={PROTOCOL_1, PROTOCOL_2, PROTOCOL_3, PROTOCOL_4, PROTOCOL_5, PROTOCOL_6, PROTOCOL_7, PROTOCOL_8, PROTOCOL_9, PROTOCOL_10, PROTOCOL_11, PROTOCOL_12, PROTOCOL_13, PROTOCOL_14}selecting a protocol from the candidate protocol set in accordance with the results of the analysis of the USB descriptor endpoint descriptor data, the selected protocol being a member of protocol set E and d. encoding one or more commands using the selected protocol that is a member of protocol set E. wherein PROTOCOL_1 is an AT protocol, PROTOCOL_2 is a Nokia fBus Protocol, PROTOCOL_3 is a OBject EXchange (OBEX) protocol, PROTOCOL_4 is a block-type mass-storage protocol, PROTOCOL_5 is a Qualcom BREW OS protocol, PROTOCOL_6 is a mediate transfer protocol (MTP) of Microscoft®, PROTOCOL_7 is a RIM OS proprietary protocol, PROTOCOL_8 is a Android Debug Bridge (ADB) protocol, PROTOCOL_9 is an Apple® IOS proprietary protocol, PROTOCOL_10 is a Synchronization Markup Language (SyncML) protocol, PROTOCOL_11 is a remote application programming interface (RAPI) over Remote Network Driver Interface Specification (RNDIS) protocol), PROTOCOL_12 is a SIM card protocol. PROTOCOL_13 is an android fastboot protocol and PROTOCOL_14 is an LG binqary object exchange proprietary protocol.

It is now disclosed a protocol switch method by a host device that is coupled to a peripheral device via a USB port, the method comprising: a. receiving USB endpoint descriptor data by the host device from the peripheral device that is coupled to the host device via a USB port; b. analyzing the received USB endpoint descriptor data by the host device; and c. contingent upon results of the analyzing of the received USB endpoint descriptor data, effecting a protocol switch by the host device from a first protocol to a second protocol different from the first protocol such that: i. both the first and second protocols are members of protocol set X={PROTOCOL_1, PROTOCOL_2, PROTOCOL_3, PROTOCOL_4, PROTOCOL_5, PROTOCOL_6, PROTOCOL_7, PROTOCOL_8, PROTOCOL_9, PROTOCOL_10, PROTOCOL_11, PROTOCOL_12, PROTOCOL_13, PROTOCOL_14}' ii. the last host-encoded command before the protocol switch is encoded using the first protocol; and iii. the first host-encoded command after the protocol switch is encoded using the second protocol, wherein PROTOCOL_1 is an AT protocol, PROTOCOL_2 is a Nokia fBus Protocol, PROTOCOL_3 is a OBject EXchange (OBEX) protocol, PROTOCOL_4 is a block-type mass-storage protocol, PROTOCOL_5 is a Qualcom BREW OS protocol, PROTOCOL_6 is a mediate transfer protocol (MTP) of Microscoft®, PROTOCOL_7 is a RIM OS proprietary protocol, PROTOCOL_8 is a Android Debug Bridge (ADB) protocol, PROTOCOL_9 is an Apple® IOS proprietary protocol, PROTOCOL_10 is a Synchronization Markup Language (SyncML) protocol, PROTOCOL_11 is a remote application programming interface (RAPI) over Remote Network Driver Interface Specification (RNDIS)

protocol), PROTOCOL_12 is a SIM card protocol. PROTOCOL_13 is an android fastboot protocol and PROTOCOL_14 is an LG binary object exchange proprietary protocol.

It is now disclosed a host device comprising: a) a USB interface operative for inter-device coupling with a peripheral device; and b) a electronic circuitry configured to: i. receive, via the USB interface and from the peripheral cell phone device that is coupled to the host device via the USB port, USB endpoint descriptor data; ii. analyze the received USB endpoint descriptor; and iii. for a candidate protocol set E that includes any two or more members of protocol set X={PROTOCOL_1, PROTOCOL_2, PROTOCOL_3, PROTOCOL_4, PROTOCOL_5, PROTOCOL_6, PROTOCOL_7, PROTOCOL_8, PROTOCOL_9, PROTOCOL_10, PROTOCOL_11, PROTOCOL_12, PROTOCOL_13, PROTOCOL_14}, select a protocol from the candidate protocol set in accordance with the results of the analysis of the USB descriptor endpoint descriptor data, the selected protocol being a member of protocol set E; and iv. encode one or more commands using the selected protocol that is a member of protocol set E, wherein PROTOCOL_1 is an AT protocol, PROTOCOL_2 is a Nokia fBus Protocol, PROTOCOL_3 is a OBject EXchange (OBEX) protocol, PROTOCOL_4 is a block-type mass-storage protocol, PROTOCOL_5 is a Qualcom BREW OS protocol, PROTOCOL_6 is a mediate transfer protocol (MTP) of Microscoft®, PROTOCOL_7 is a RIM OS proprietary protocol, PROTOCOL_8 is a Android Debug Bridge (ADB) protocol, PROTOCOL_9 is an Apple® IOS proprietary protocol, PROTOCOL_10 is a Synchronization Markup Language (SyncML) protocol, PROTOCOL_11 is a remote application programming interface (RAPI) over Remote Network Driver Interface Specification (RNDIS) protocol), PROTOCOL_12 is a SIM card protocol. PROTOCOL_13 is an android fastboot protocol and PROTOCOL_14 is an LG binary object exchange proprietary protocol.

It is now disclosed a host device comprising: a) a USB interface operative for inter-device coupling with a peripheral device; and b) a electronic circuitry configured to: i. receive, via the USB interface and from the peripheral cell phone device that is coupled to the host device via the USB port, USB endpoint descriptor data; ii. analyze the received USB endpoint descriptor; and iii. contingent upon results of the analyzing of the received USB endpoint descriptor data, effect a protocol switch by the host device from a first protocol to a second protocol different from the first protocol such that: i. both the first and second protocols are members of protocol set X={PROTOCOL_1, PROTOCOL_2, PROTOCOL_3, PROTOCOL_4, PROTOCOL_5, PROTOCOL_6, PROTOCOL_7, PROTOCOL_8, PROTOCOL_9, PROTOCOL_10, PROTOCOL_11, PROTOCOL_12, PROTOCOL_13, PROTOCOL_14} ii. the last host-encoded command before the protocol switch is encoded using the first protocol; and iii. the first host-encoded command after the protocol switch is encoded using the second protocol, wherein PROTOCOL_1 is an AT protocol, PROTOCOL_2 is a Nokia fBus Protocol, PROTOCOL_3 is a OBject EXchange (OBEX) protocol, PROTOCOL_4 is a block-type mass-storage protocol, PROTOCOL_5 is a Qualcom BREW OS protocol, PROTOCOL_6 is a mediate transfer protocol (MTP) of Microscoft®, PROTOCOL_7 is a RIM OS proprietary protocol, PROTOCOL_8 is a Android Debug Bridge (ADB) protocol, PROTOCOL_9 is an Apple® IOS proprietary protocol, PROTOCOL_10 is a Synchronization Markup Language (SyncML) protocol, PROTOCOL_11 is a remote application programming interface (RAPI) over Remote Network Driver Interface Specification (RNDIS) protocol), PROTOCOL_12 is a SIM card protocol. PROTOCOL_13 is an android fastboot protocol and PROTOCOL_14 is an LG binary object exchange proprietary protocol.

It is now disclosed a host device apparatus configured to carry out any disclosed method.

In some embodiments, the electronic circuitry includes any combination of one or more microprocessor(s) and computer memory.

In some embodiments, the computer memory includes volatile and/or non-volatile memory.

In some embodiments, the electronic circuitry includes any combination digital circuitry, software and firmware.

In some embodiments, computer readable medium comprising storage media having stored thereon computer readable program code for performing any disclosed method.

BRIEF DESCRIPTION OF THE DRAWINGS

FIG. 1A illustrates a hierarchical structure of USB descriptor data (prior art).

FIGS. 1B-1C describes various fields of USB endpoint descriptor data (prior art).

FIGS. 2A, 2C, 3A and 6B illustrate various prior art systems including a host device and a peripheral device (prior art).

FIGS. 2B, 2D, 3B, 6A and 8 illustrate various prior art routines for operating a host device and/or a peripheral device (prior art).

FIGS. 5A-5D illustrate various prior art cellular telephone routines (prior art).

FIG. 7 relates to a composite device presented by a peripheral device telephones to a host device (prior art).

DETAILED DESCRIPTION OF EMBODIMENTS

Figure 2B:
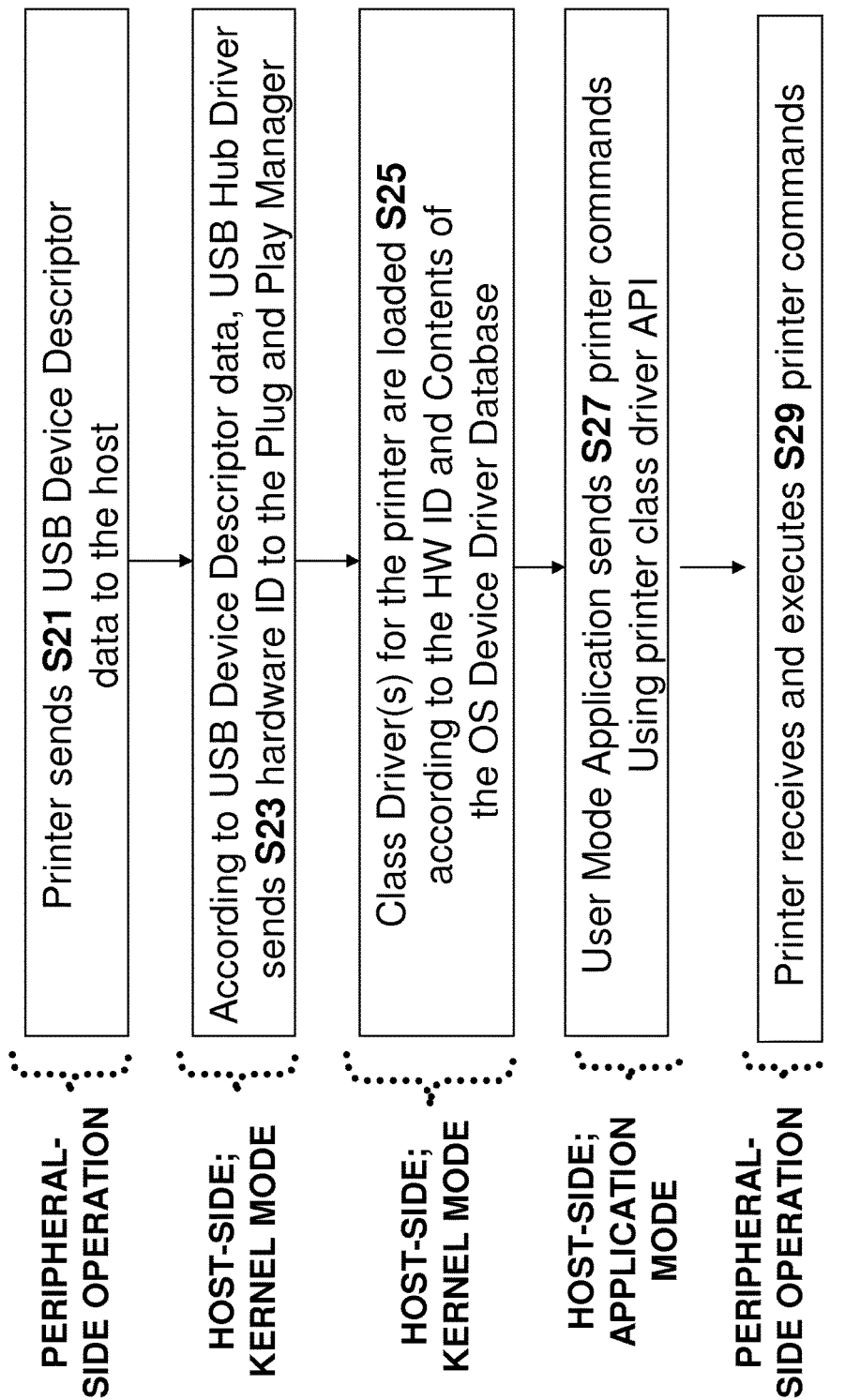

The claims below will be better understood by referring to the present detailed description of example embodiments with reference to the figures. The description, embodiments and figures are not to be taken as limiting the scope of the claims. It should be understood that not every feature of the presently disclosed methods, apparatuses, and computer readable media having stored thereon is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to'), rather than the mandatory sense (i.e. meaning "must").

Embodiments of the present invention relate to method, apparatus, and system whereby a client application executing on the host device can appropriately communicate with any mobile phone of a 'large list' of candidate phones including peripheral-protocol dissimilar methods even in situations there is little or no manually-provided 'guidance' about the particular phone model from the user (e.g. where the user would type in the phone model or the name of the vendor).

In the present disclosure 'electronic circuitry' is intended broadly to describe any combination of hardware, software and/or firmware.

Electronic circuitry may include may include any executable code module (i.e. stored on a computer-readable medium) and/or firmware and/or hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used including but not limited to reduced instruction set computer (RISC) architecture and/or complex instruction set computer (CISC) architecture. Electronic circuitry may be located in a single location or distributed among a plurality of locations where various circuitry elements may be in wired or wireless electronic communication with each other.

When a given phone is coupled as a peripheral 200 to the host 100 device, instead of loading into memory the various device surrogate drivers into memory (see 140 of FIG. 4B) specified by the USB hardware ID passed from the peripheral phone to the host, and instead of relying on these surrogate device drivers to send commands to the peripheral phone 200, it is possible to load into memory a single device driver that can be used with any phone of the 'large list' of candidate phones.

Techniques are disclosed herein whereby a host computer device may automatically identify a vendor and/or model and/or chipset of a peripheral phone without relying on a priori information about the phone. In some embodiments, it has been found that USB endpoint data (see FIGS. 1A-1C) of the peripheral phone device is a useful indicator of a phone model. This USB endpoint data may be used 'by itself' or in combination with other data of the USB 'fingerprint' (see FIG. 1A).

In general, even for a large 'candidate set' of hundreds of thousands of phone models, it has been found that the USB endpoint data (e.g. together with other data of the USB fingerprint), in many situations, is unique for particular phone models, or at least for 'families of' phone models.

Various vendors may implement common peripheral device functionality and/or cell phone functionality in different manners. For example, the scheme for retrieving SMS data from a Nokia® phone may differ than that of a Sony-Ericsson® or RIM® or Apple IPhone® or Android Phone®.

Nevertheless, once a phone model (or at least 'family' of models) has been automatically identified, it is possible for the host device to provide different functionality whose implementation is phone-model dependent according to the results of the 'phone model identifying.'

In various embodiments, it is possible for the host device to carry out one or more of the following in a manner that is 'contingent' upon the results of analyzing peripheral-device specific data (e.g. USB endpoint data).

Figure 10:
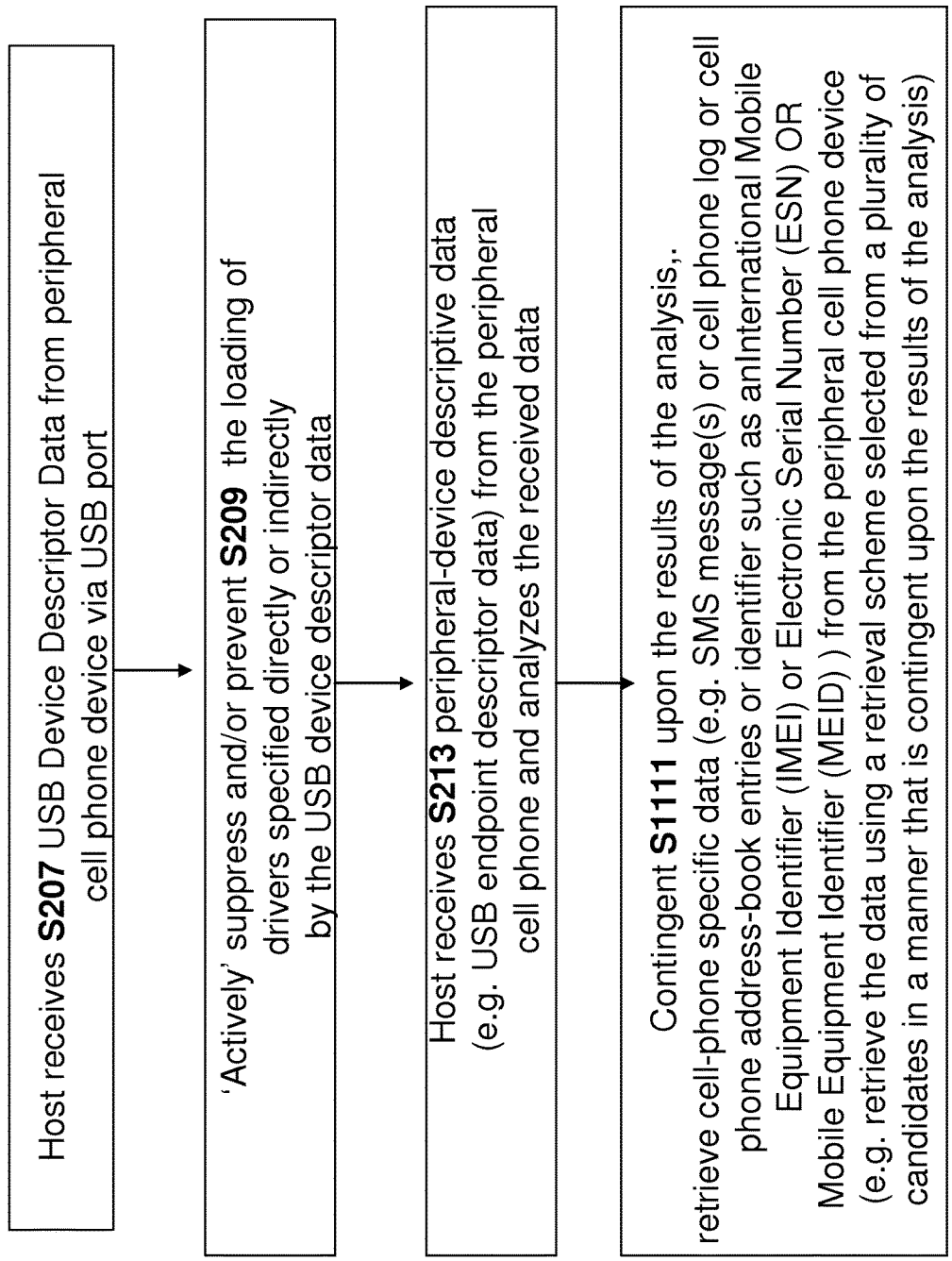

(i) retrieving cell-phone specific data (see FIG. 10);
(ii) determining phone resources (see FIG. 11);
(iii) routing and/or addressing a command(s) to a 'target' USB interface descriptor (e.g. in FIG. 7A, a command may be 'routed' to a modem or wireless communication device OR may be 'routed' to a particular communication device) (see FIG. 12);
(iv) determining a protocol in which to encode a command on the host device (e.g. different phone vendors may utilize different protocols for common functionality—once the model or model family is determined, it is possible to use the 'appropriate' or 'matching' protocol which matches the model identity) (see FIG. 13).

Figure 14:
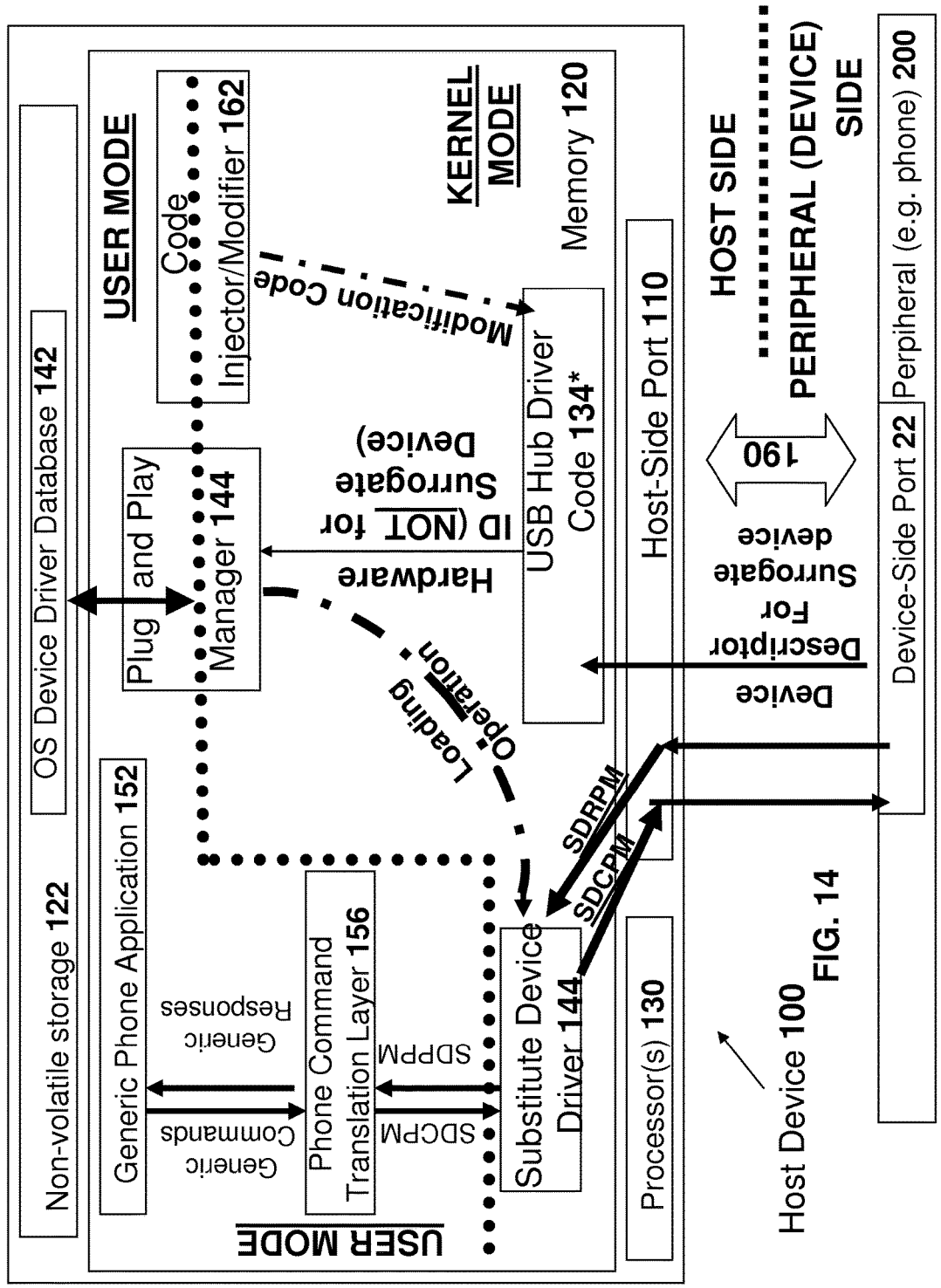
FIGS. 14, 18, 19 and 24-25 illustrate various systems including host device and/or a peripheral device according to some embodiments.
Figure 15:
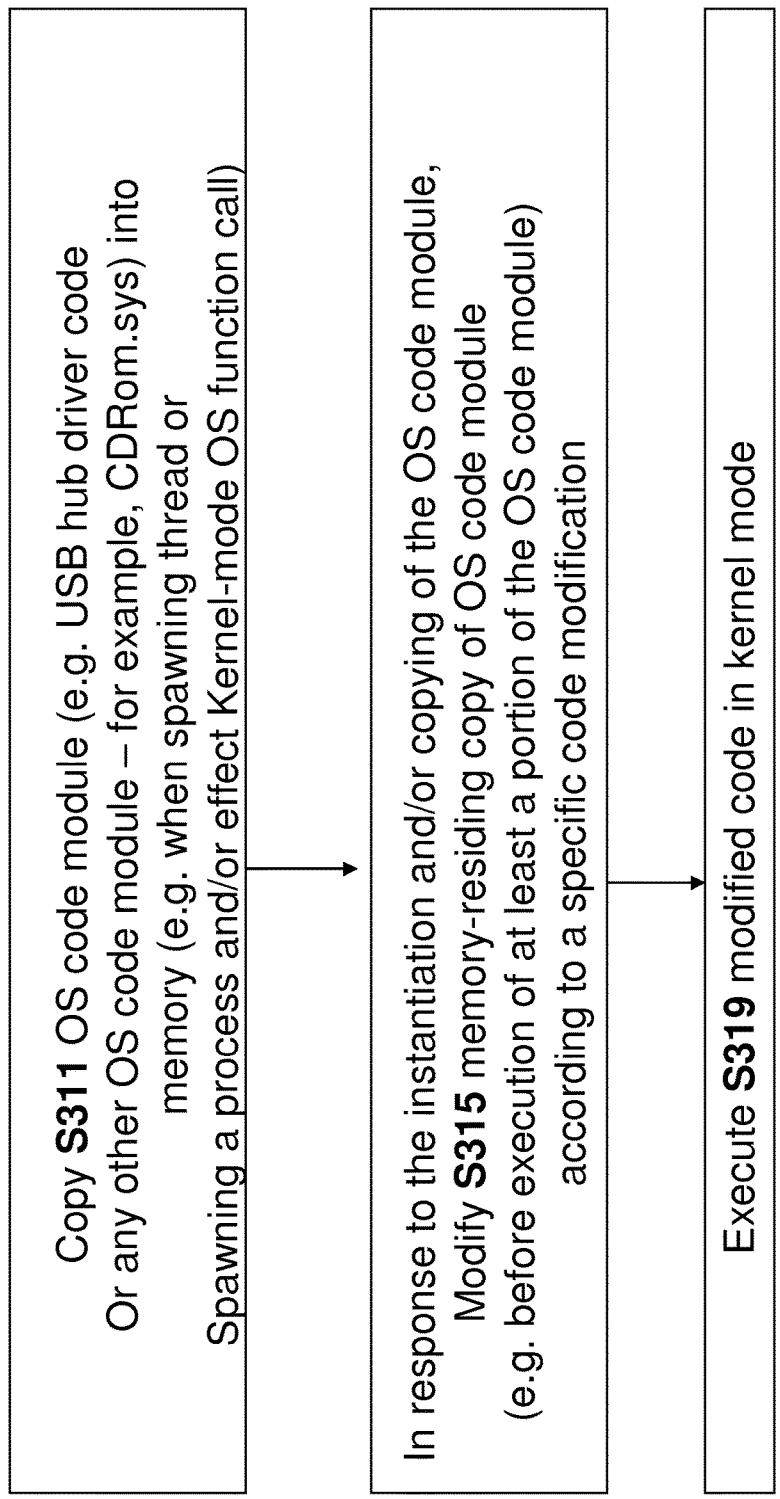
Figure 16:
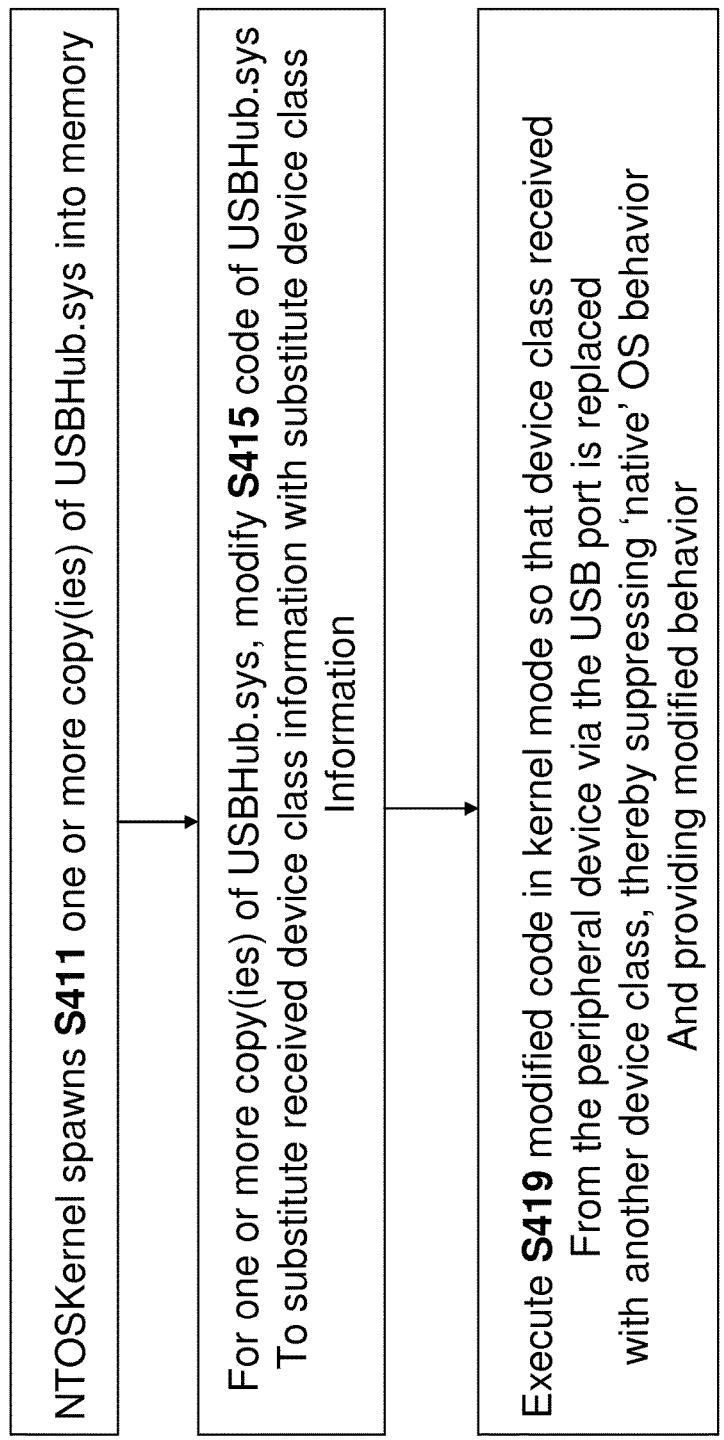
Figure 17:
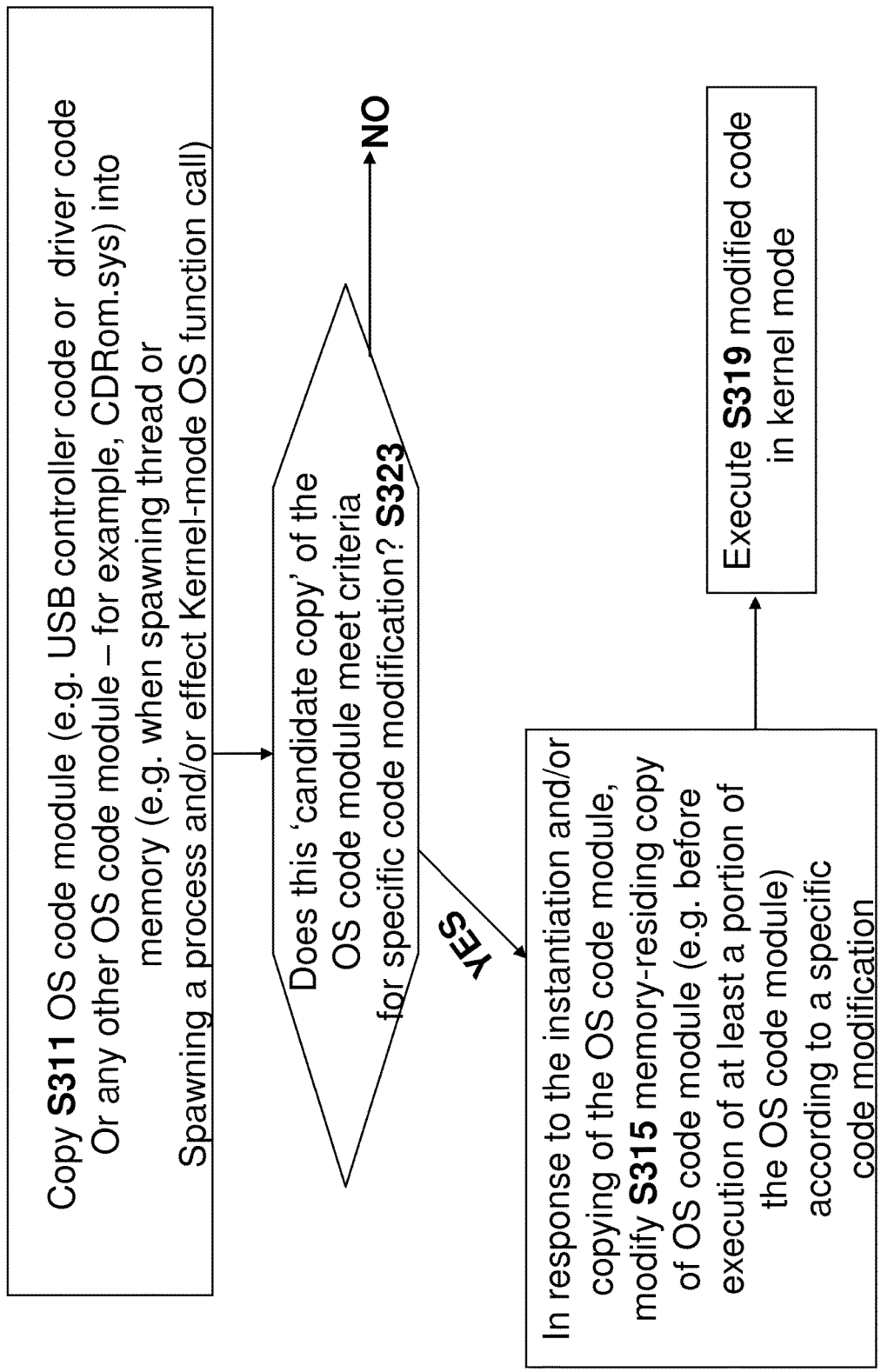
Figure 18:
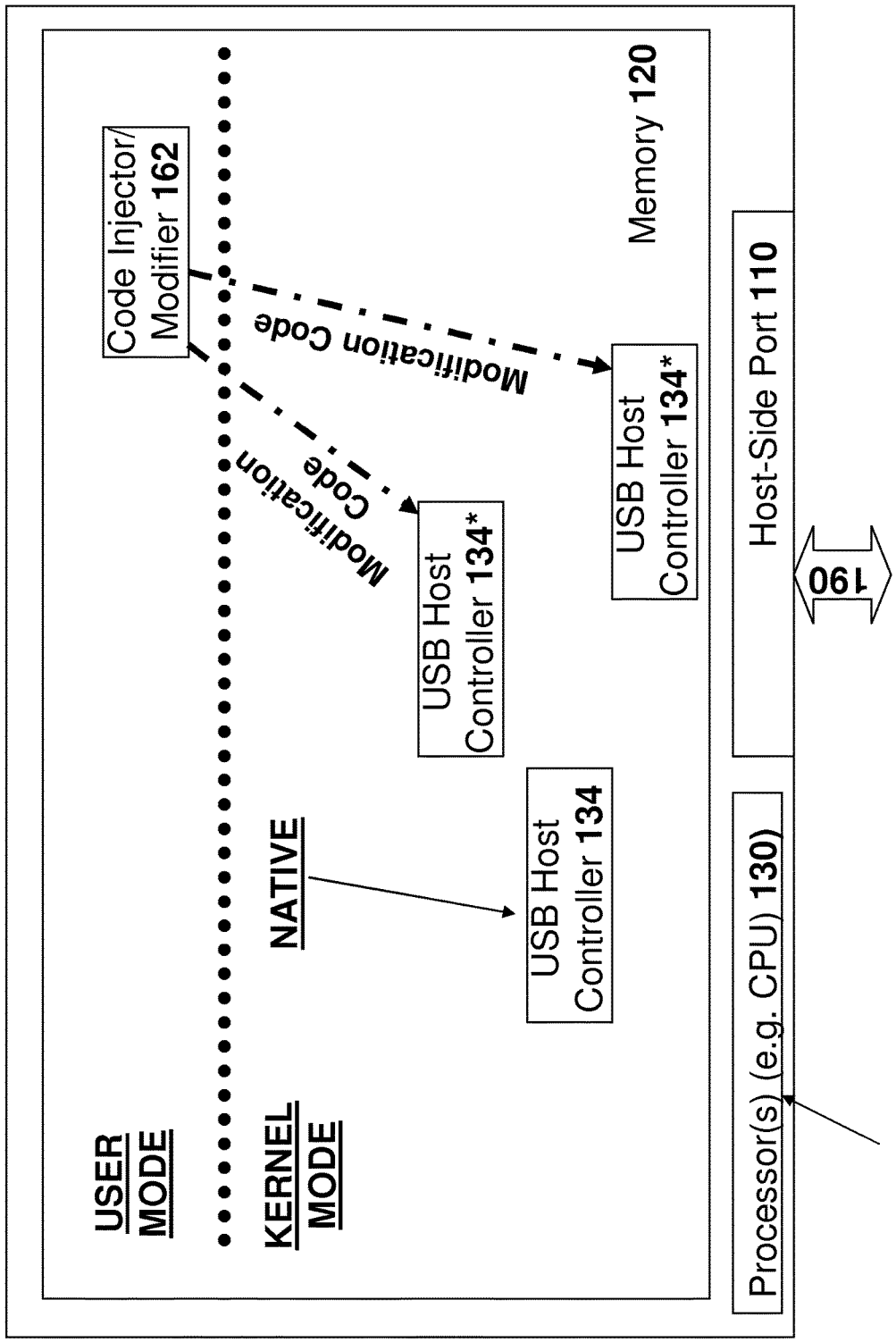

A 'vendor agnostic' phone software interface is provided which accepts 'generic phone commands' that are not required to be proprietary to any phone vendor or model. FIG. 9 is a flow chart of a routine whereby a host device 100 communicates with a phone device 200 that is coupled (e.g. via a wired or wireless USB port) to the host device. Although FIG. 9 relates to the particular cases of phone devices 200, some teachings relate to host devices coupled to peripheral devices other than phone devices or to host device that are not necessarily coupled to any peripheral device. FIG. 14 is a block diagram of a system configured to carry out the routine of FIG. 9.

As will be explained below, in some embodiments relating to the routine of FIG. 9, when a phone is coupled to a host device (e.g. as a 'peripheral device') (i) certain 'native' host-side operating system behavior that would normally be observed when a mobile phone presents a surrogate hardware identifier (e.g. associated with a surrogate composite device scheme—see FIGS. 5A-5B) is now suppressed (see, for example, FIG. 3B—step S71 and/or S81 and/or step S63 or at least a portion thereof). Although this functionality is not limited to the specific case where the peripheral device is a mobile phone, it is now disclosed that this functionality is particularly useful for the case where the peripheral device is a mobile phone that presents surrogate device identifier(s) to host 100.

For the case where the peripheral device is a mobile phone that presents surrogate device identifier(s) to host 100, suppression of the native OS eliminates the passing of certain 'surrogate-device' specific information to the plug and play manager 144 and/or eliminates the loading of surrogate device drivers specific to the device interface presented.

In some embodiments, despite that fact that the loading of one or more surrogate device drivers is suppressed, it is still possible for the host device 100 to send to a peripheral phone (i.e. that functions as described in FIGS. 6A-6B) 'understandable' commands via respective ports 110, 120 according to a surrogate device protocol and/or wrapped in the language of the surrogate device according Each phone model (or family if phones or phone vendor or chip family) tends to be associated with a different respective 'surrogate command language.' Some embodiments provide a method and apparatus for determining a mobile phone 'type' whereby the host device, without having or using a-priori information about the type of mobile phone coupled with host 100, is able to automatically, without being supplied with and/or without relying on manually-input information about the type of mobile phone 200 coupled as a peripheral device to host 100. In the examples of FIGS. 4-7 where phone suite application 152 was required to handle specific types of mobile phones and/or could rely on manually-provided information about the coupled phone (e.g. because the 'mobile phone suite' 152 only supports a very small sub-set of the set of all possible mobile phones). In some embodiments, there is no such requirement, and it is possible to 'automatically' identify a phone model or family of models.

Thus, in one use non-limiting case, when the user couples a Nokia N95 phone to the host device 100, the Nokia N95 phone may behave in a manner similar (or identical to) to what was described in the Background Art section; when the user couples a Sony Ericsson K310 phone to host device 100, the Sony Ericsson K310 phone may behave in a manner similar (or identical to) to what was described in the Background Art section.

However, instead of relying on the a priori information about a particular phone model (this is the case with many phone suite applications 152 which may also receive manually-provide information about phone models), it is possible for the host to (i) automatically identify (for example, in accordance with USB fingerprint data which describes a surrogate device scheme for the phone) the phone; and (ii) communicate according to the appropriate phone command-surrogate device command translation scheme (e.g. selected in step S215).

Figure 4:
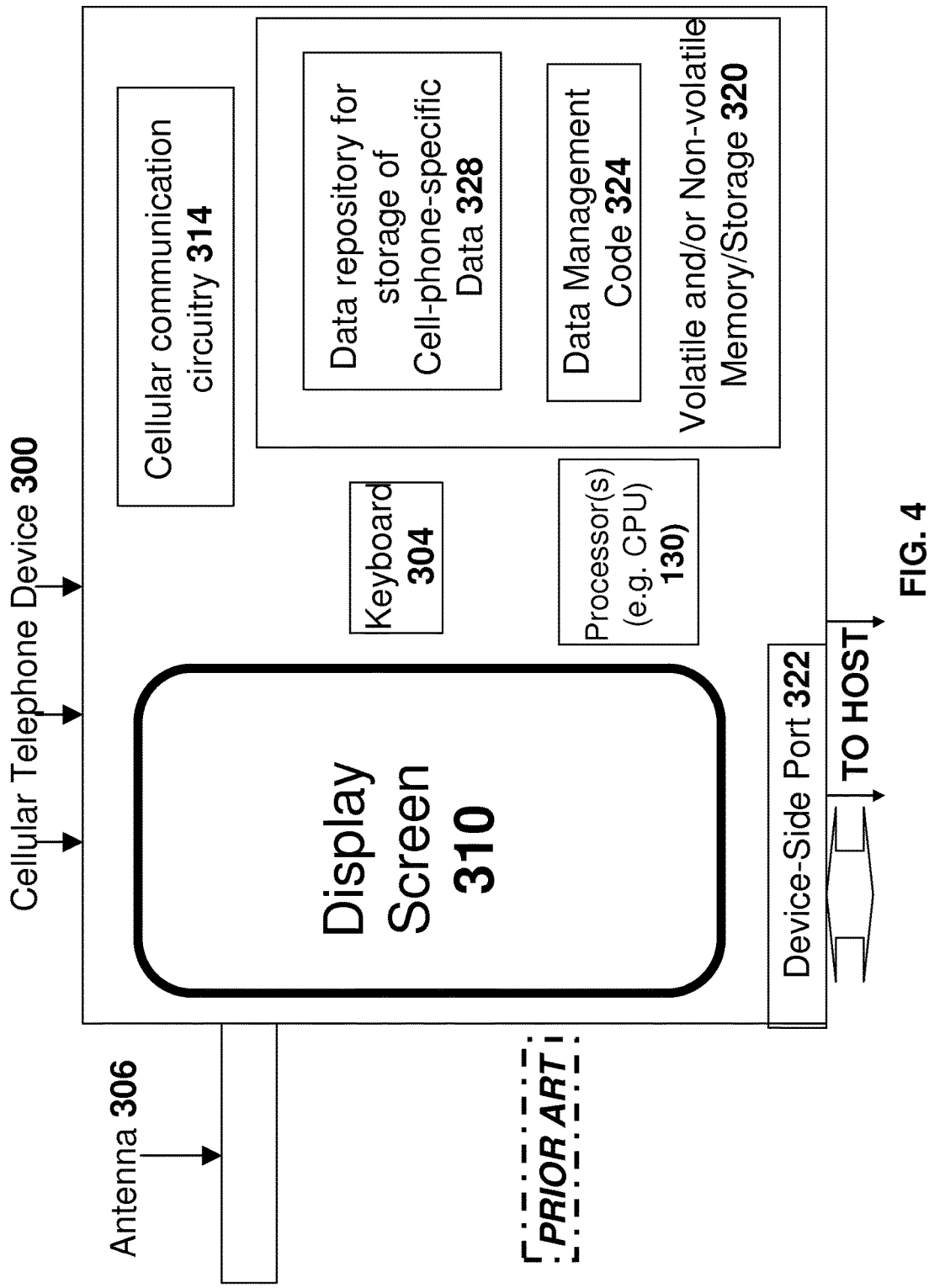
FIG. 4 illustrates a prior art cellular telephone device (prior art).

Furthermore, in contrast to the routine of FIG. 4 where there is a requirement to load, into memory 120 of the host device 100, actual 'surrogate device drivers', according to embodiments of the present invention, it is possible for the host to communicate with the phone without relying on the surrogate device drivers and without relying on manually-supplied information from the user about the type of the phone or model or vendor.

In some embodiments, it is possible to load a single driver (e.g. multiple instances of a single driver) for multiple phone vendors, and to communicate with multiple phones (even if they are simultaneously coupled to the host) via the single device driver.

Definitions

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage In some embodiments, host 100 and peripheral device 200 communicate with each other using a 'master-slave' communication protocol that has a 'host side' (used by host 100) and a 'peripheral side' (used by device 200). One example of such a protocol is the USB protocol. According to these embodiments, peripheral device 200 is the "slave" during the communication session when commands are sent from host 100 to device 200(for example, in step S217 of FIG. 8).

In one example, device 200 and host 100 are configured so that device 200 is always a "slave" to host 100 when coupled—the "dedicated" case. Alternatively, device 200 is only the "slave" during a particular session, Peripheral storage devices communicate with their hosts using a 'master-slave' communications protocol that has a 'host side' and a 'peripheral side.' Examples of "master-slave" protocols include but are not limited to Universal Serial Bus (USB) protocols, MultiMediaCard (MMC) protocols, and Secure Digital (SD) protocols.

When a 'host' and a 'peripheral storage device' are 'coupled': (i) they are in communication with each other via a 'point-to-point' data link (either a 'wired connection' or a short-range wireless link without any requirement for an intermediate routing device) so that data may flow via the 'point-to-point' data link between the host and peripheral; and (ii) they are configured to communicate using a 'master-slave' protocol—i.e. the host is configured to communicate with the peripheral storage device in the 'host' or master role defined by the protocol and the peripheral storage device is configured to communicate with the host in the 'slave' or peripheral role defined by the protocol.

Reference is made, once again, to FIGS. 9A-9B, which are flow charts of routines of operating host device 100 to interact with peripheral phone device 200 to send commands to the peripheral phone device 200. FIG. 14 is a block diagram of a system configured to carry out the routine of FIG. 9.

Step S201 of FIG. 9 is the same as step S201 of FIG. 4A.

In step S205, the native operating system behavior of step S55 and/or step S71 and/or step S81 is suppressed. In step S205, 'native OS behavior' of the executing OS is suppressed. According to this 'native OS behavior,' executing USB hub driver code 134 serves as a conduit for HW identifier information which flows from the peripheral device 200 to to plug-and-play manager 144). According to the routine of FIGS. 9A-9B, even if this HW identifier information is received by executing USB hub driver code 134, this HW identifier information is intercepted and withheld from plug-and-play manager 144.

In one non-limiting example describing how this suppression of the 'native OS behavior' may be implemented, it is possible to modify, within memory 120, at least one instance of operating system USB driver code 134 in order to suppress behavior described in FIG. 3B. This modification of the operating system USB driver code 134 to inject one or units (e.g. lines) of 'non-native' code other than the OS code and/or modify or delete one or more units code is referred to as 'kernel mode code modification.' This kernel mode code modification can take place at any time (there is no limitation)—for example, upon start up of host device 100 or in response to any event associated with the instantiation or loading into memory of USB driver code 134. For example, it is possible to install on host device a service which 'listens' for loading events where USB driver code 134 is loaded or instantiated or about to be executed. In response to this event, it is possible to modify the native OS code for a specific instance loaded into memory 120. In one example, code injector/modifier 162 which operates in user or kernel mode may, in response to the 'USB driver code 134 loading or execution or instantiation event, modify for a particular instance(s) of USB driver code 134, the code within memory 120.

Modification of an instance of code of a native OS driver is not the whole technique that may be used. Alternatively or additionally, in another example related to the 'suppressing' of certain native OS code behavior of one or more steps of FIG. 3B that leads to the receipt by plug-and-play manager of peripheral device-specific (e.g. surrogate device data) data, it is possible to write a replacement driver for the USB controller or hub. This replacement driver, (i) receives data from the hardware of the host-sided port 100 and (ii) passes this hardware-received data to the native OS USB host controller 134. This 'intercepting' proxy driver (not illustrated in the figures) may provide certain data interception features so that not only does plug-and-play driver not directly receive certain peripheral-device-specific data (e.g. hardware ID data and/or a list of supported peripheral device interfaces supported by peripheral 200)

In step S205, the host-side USB port hardware 100 receives the surrogate device identifier(s). Instead of USB host controller 134 passing this surrogate device data to plug and play manager 144 (see step S105 of FIG. 4A), this information is intercepted—e.g. by a proxy driver or modified OS code of USB hub driver 134.

The intercepted information is replaced, in step S209, with a 'substitute HW identifier and/or substitute list of one or more supported device interfaces.

This different device identifier will be referred to as a 'substitute device identifier.' This 'substitute device identifier' is different from the device identifier received via communications link 190 into the host-side USB port 110 hardware—in the case of the mobile phones, this 'substitute device identifier' is different from the surrogate device identifiers discussed in the background section.

In one non-limiting example, the 'substitute device driver' is a simple generic 'data pipe' device driver. In one non-limiting example, this 'substitute device driver' may be utilized by multiple phones simultaneously coupled to host 100.

Figure 9A:
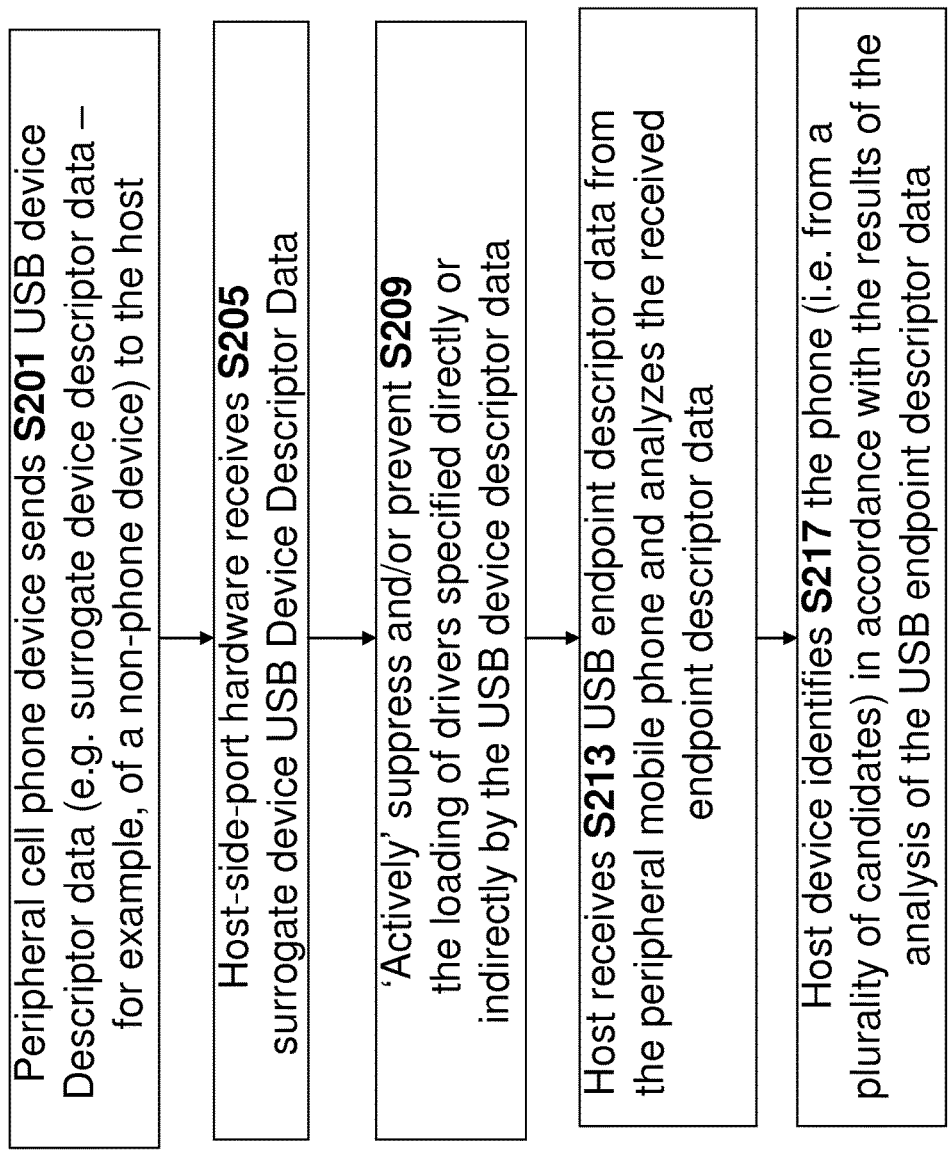
FIGS. 9-13, 15-17, 20-23, and 26-27 illustrate various routines for operating a host device and/or a peripheral device according to some embodiments.
Figure 9B:
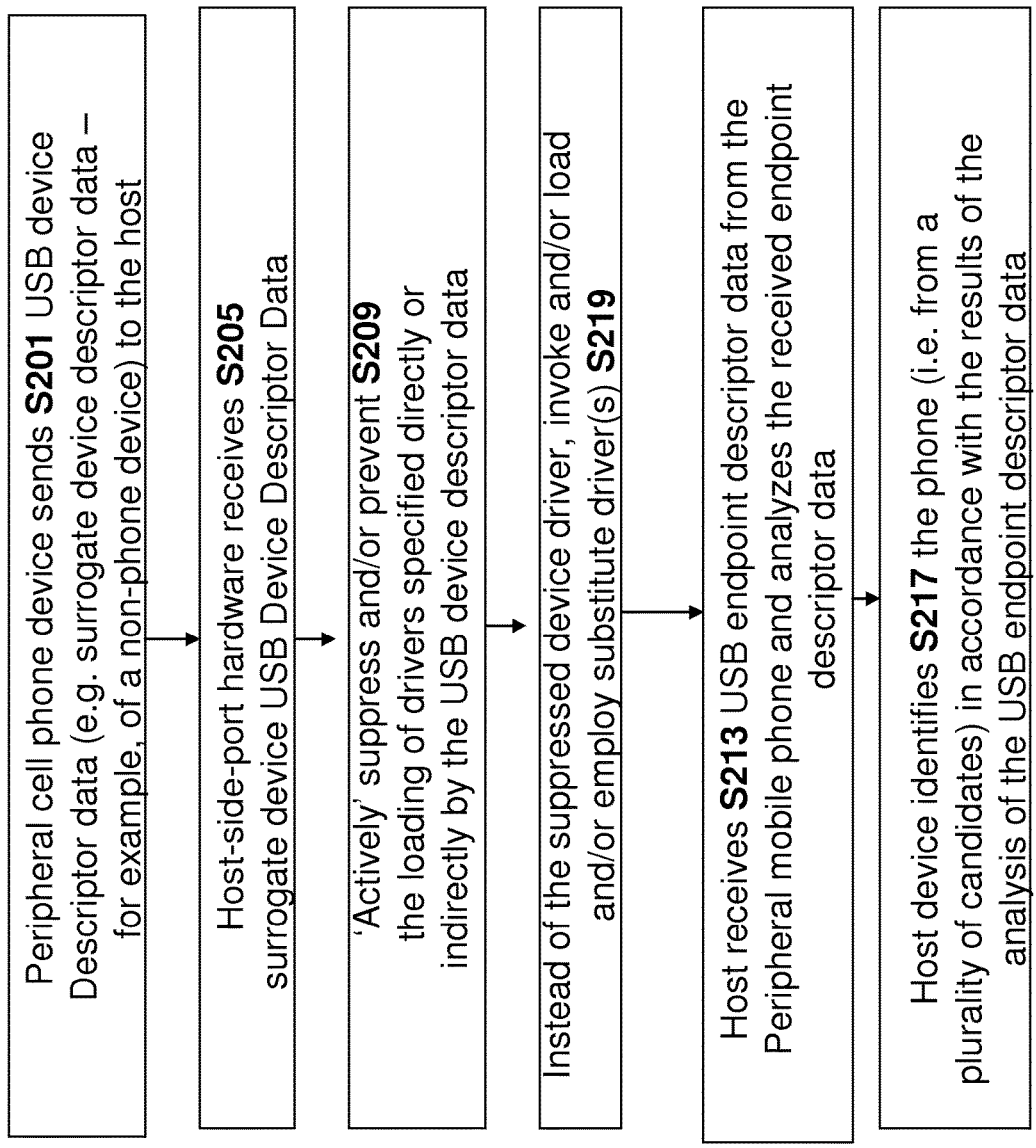

Thus, FIGS. 9A-9B the OS-native flow of device identifier data from the USB peripheral device 200 via communications link 190 and host-side port 110 to plug and play manager 144 is intercepted by a modified version of USB Host Controller 134 (or 134*) This data flow is referred to as the 'natural flow of data' because it describes how data flow would occur with 'uncontaminated' pure OS code—i.e. if the memory-residing copy of USB Host Controller 134 were to remain in its unmodified form.

In step S209, substitute class driver(s) are loaded in memory 120. In one non-limiting example, this substitute class driver(s) is a simple data pipe driver. In contrast to step S109 of FIG. 2A, whereby each 'surrogate device scheme' presented in step S101 was associated with a different set of device drivers loaded into memory (for example, coupling the Nokia phone of FIG. 7A induced loading in step S109 of a first set of device drivers specified in FIG. 7A while coupling the Ericsson Sony phone of FIG. 7b induced loading in step S109 of a second set of device drivers specified in FIG. 7B), in step S209, it is possible that the same driver (or set of drivers) are loaded into memory for different phones having different surrogate device schemes.

In step S213, software executing on host device 100 is able to determine (or assess) information about the specifics of phone 200—for example, phone manufacturer (i.e. Nokia® vs. Apple®, etc) and/or phone family identifier and/or phone model and/or phone chipset type to 'identify' (i.e. at least in part) phone 200. For example, it is possible to utilize surrogate device data received in step S101 or acquired in any other manner at any time—for example, by probing a USB fingerprint e.g. including USB endpoint data.

It is possible, for each of a plurality of phone models and/or vendors and/or chipsets, to maintain on the host side of communications link 190 a data structure that maps between various phone-model specific information to phone models—i.e. the phone-specific information for the Nokia N95 would be different from the phone model-specific information of the Ericsson® phone which would be different from an Apple® I-Phone®. This phone-model specific information may include information about retrieving data or encoding commands or 'sniffing' the peripheral cell phone device for its resources (e.g. memory capacity or other resources).

In step S217, the host may identify the phone—e.g. manufacturer/vendor identity, chipset identity, model number, etc. In some embodiments, some or all of this 'phone identity information' may be displayed to a user—for example, on a display screen.

Experiments carried out by the present inventor have indicated that the 'USB endpoint data' has a useful degree of 'predictive power' for determining a model number and/or vendor ID and/or chipset family ID of a peripheral device (e.g. cell phone device). For example, it is possible to maintain on the host side a map (or other data structure) between (i) USB endpoint data (e.g. the lowest level of the hierarchy of FIG. 1A and/or multiple levels of the hierarchy of FIG. 1 including the 'endpoint level') or portions or combinations of portions thereof (e.g. see any element of FIG. 1B) and/or any other peripheral-device-descriptive data and (ii) identifier data—e.g. a name of a peripheral device vendor, model number and/or chipset family ID.

A Discussion of FIGS. 10-14

FIGS. 10-13 are flow charts describing several routines for operating a host device. In step S207, the host device may receive, for example, hardware identifier or other USB device descriptor data describing which device drivers for the host device to load. In step S209, the native OS behavior of loading the specified drivers is 'actively suppressed'—for example, by intercepting the hardware identifier and not forwarding the HW identifier to the plug-and-play manager or in any other manner.

In step S213, the host receives peripheral-derive-descriptive data (e.g. USB endpoint descriptor data and/or other levels of the USB data hierarchy of FIG. 1A or any other data describing the peripheral device) from the peripheral device. This peripheral-derive-descriptive data is also analyzed in step S213.

In some embodiments, the analyzes could indicate to the host device the vendor ID and/or phone ID and/or chip ID of the peripheral device (e.g. cell phone device). Once this information is known, it is possible to look up properties of the peripheral device in a host-side data structure that maps data identifier information (e.g. vendor, model, chipset, etc) with peripheral device capabilities information.

Figure 12:
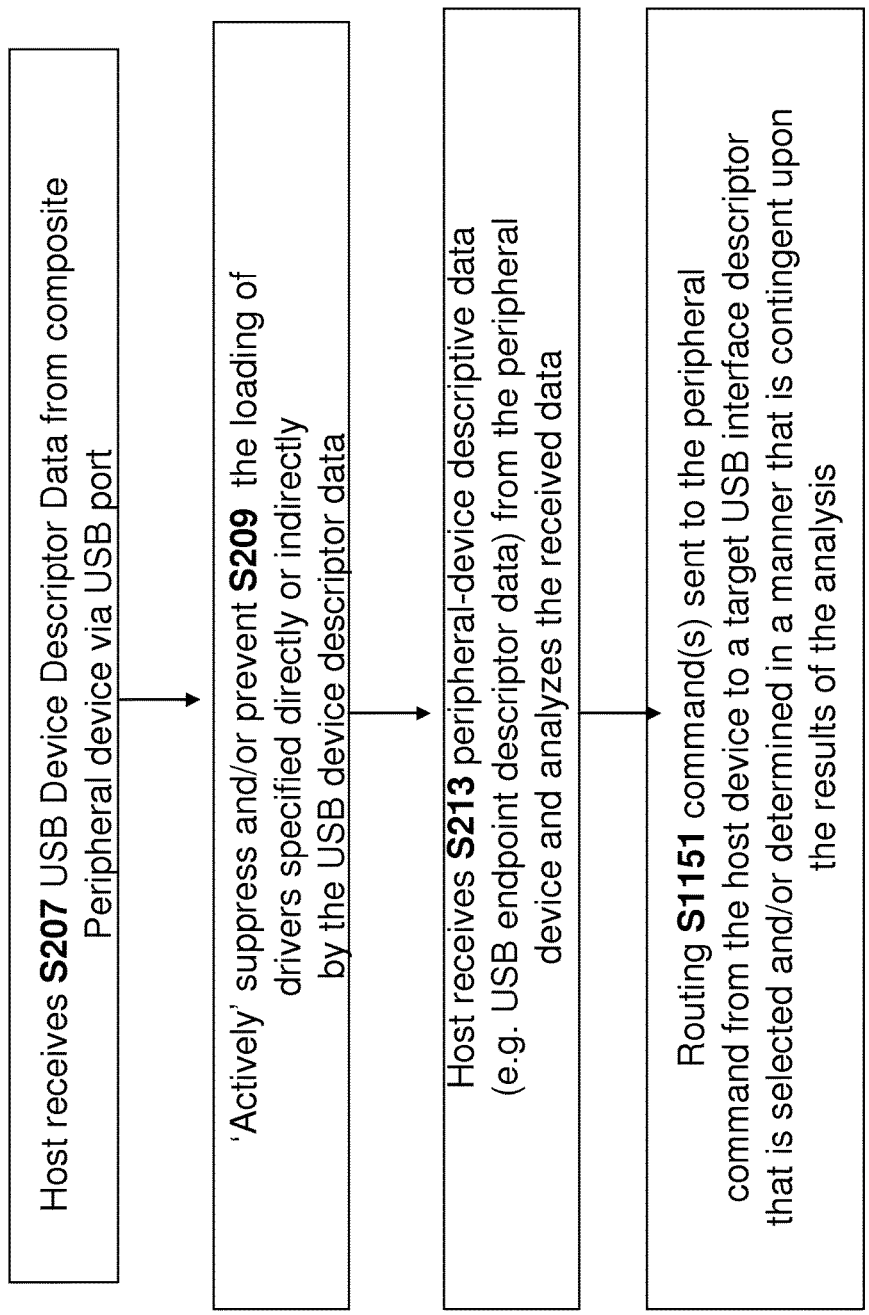
Figure 13:
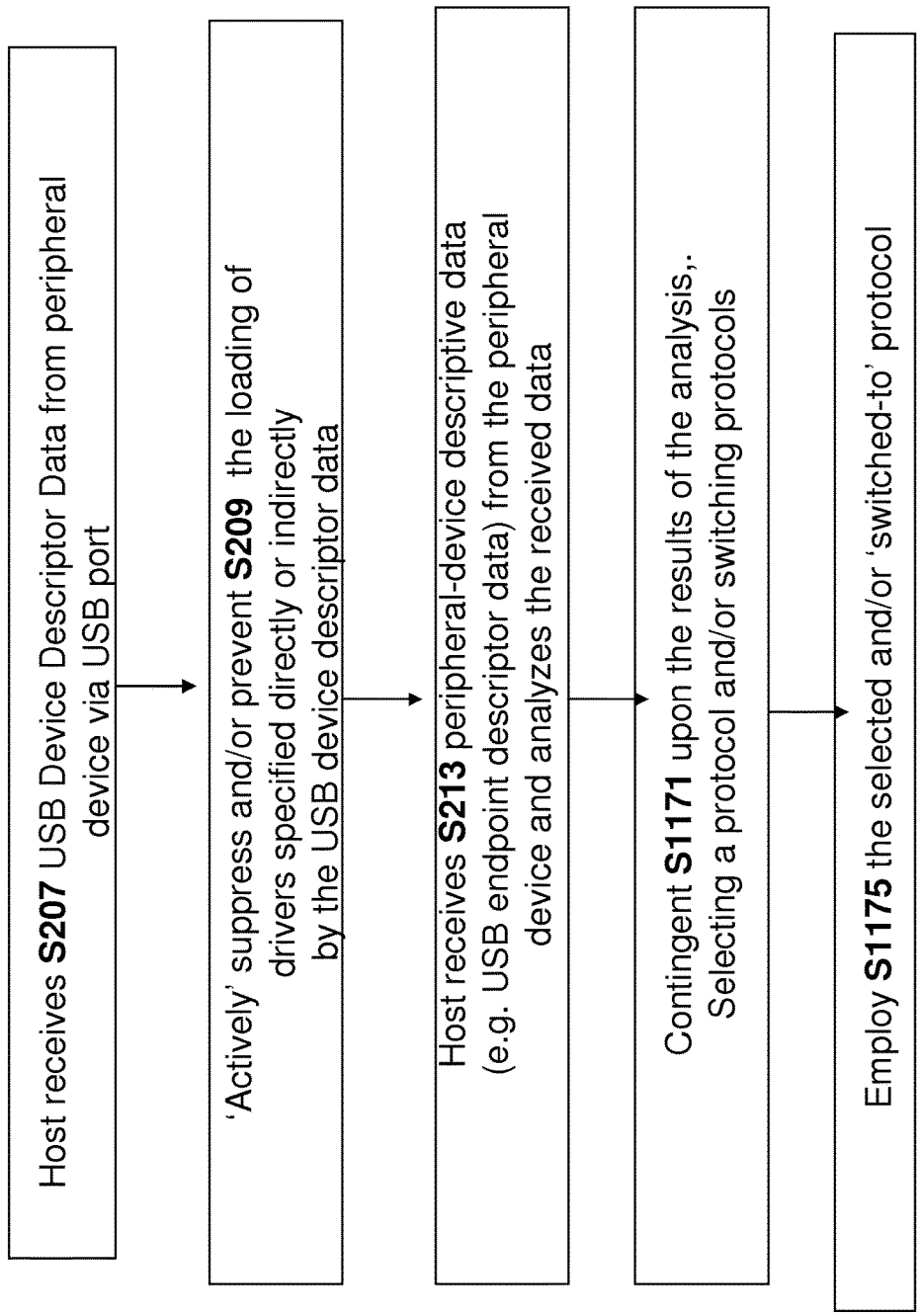

Once the host device has access to a description of the peripheral device capabilities, the host device can (i) appropriately retrieve information from the peripheral device (see step S1111 of FIG. 10) and/or (ii) assess the hardware and/or software resources or capabilities of the peripheral device (see step S1311 of FIG. 11) and/or (iii) route commands to the correct USB interface descriptor (see step S1151 of FIG. 12) and/or (iv) communicate with the peripheral device using the correct protocol (see steps S1171-S1175 of FIG. 13).

In the example of FIG. 10, the host can send proper instructions (e.g. 'platform-specific instructions') to a cell phone peripheral device for retrieving cell-phone specific data, despite the fact that these instructions could normally vary between phone vendors or model identifiers. For example, the commands for opening an address book, or reading a log may differ between phone models.

Figure 11:
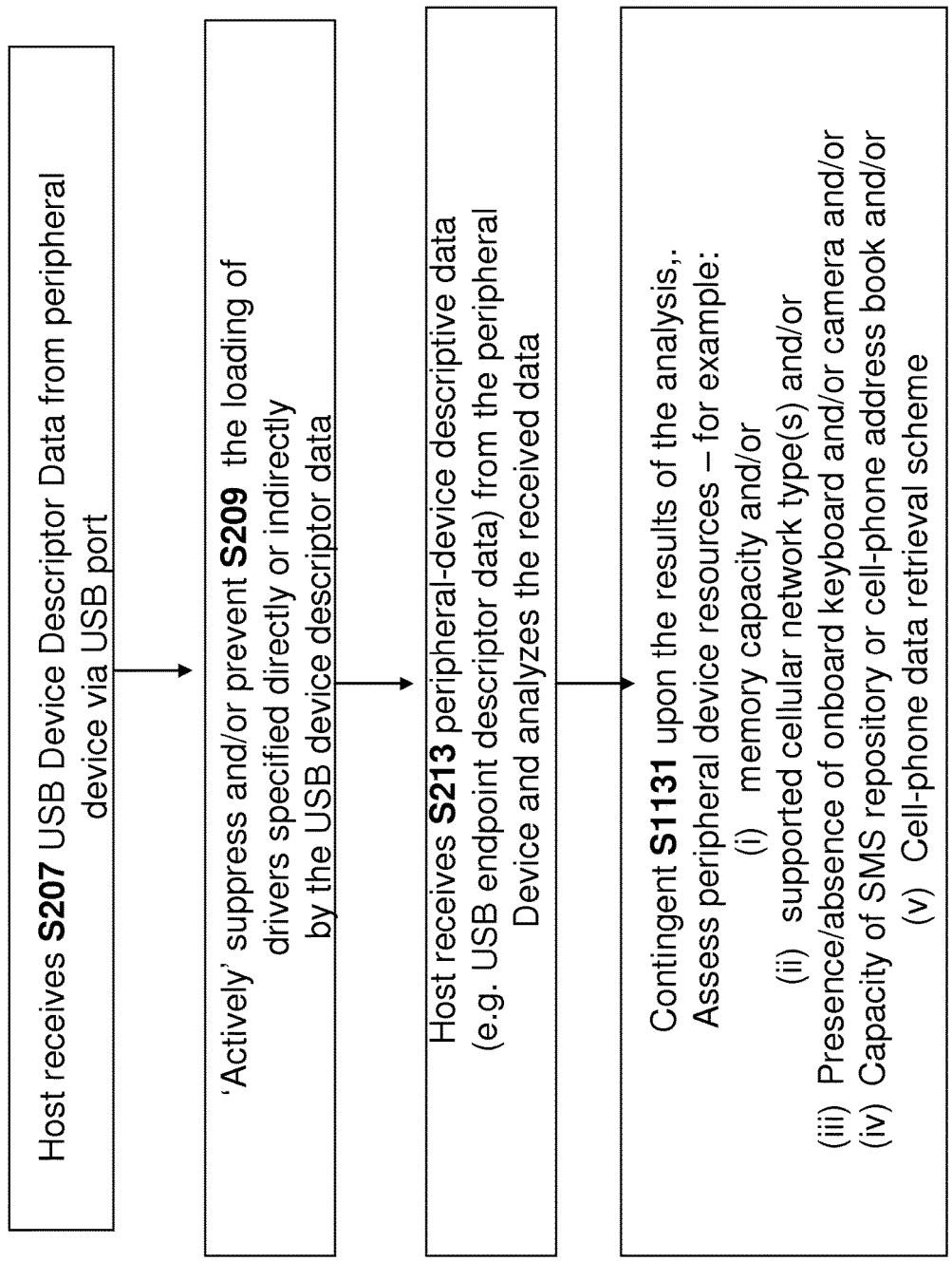

In the example of FIG. 11, the host device can access information about the hardware and/or software resources or capabilities of the peripheral device—for example, by looking up this information in a data structure relating peripheral device model (e.g. phone model number, table model number, printer model number) to hardware and/or software resources or capabilities of the peripheral device.

The example of FIG. 12 relates to composite peripheral devices. In one example, a composite peripheral device may include two or more interfaces of differing USB device class—e.g. a modem USB interface and a mass storage device USB interface. In another example, a composite peripheral device may include multiple interfaces of the same USB device class—.e.g more than one mass storage device. In some embodiments, in order to send a command (or command sequence to the peripheral device), certain command or command(s) may need to be routed to a particular 'target interface'—e.g. not to the modem but to the mass storage device OR not to 'mass storage device A' but to 'mass storage device B.'

In general, each peripheral (e.g. phone) vendor and/or each model and/or each chipset family may use a different scheme for mapping 'higher level commands' with lower level commands. Each lower level commands may be 'targeted' to a particular USB interface descriptor—e.g. to a particular wireless communication device when more than one is present, or to a certain USB class. In some embodiments, it is possible to maintain, on the host side, a map (or other data structure) between (i) peripheral device model and/or vendor and/or chipset family and (ii) a description of a an 'encoding scheme' whereby 'higher level commands' are encoded according to a 'lower-level protocol' (e.g. a modem protocol or a mass storage device protocol). Part of this 'command encoding scheme' includes information about how to target particular commands—e.g. to a particular interface descriptor selected from a plurality of possible 'candidate' descriptors of a USB composite device.

In some embodiments, it is possible to 'look up' information describing this encoding scheme according to device and/or vendor and/or chipset ID. The device and/or vendor and/or chipset ID may be determined in an 'earlier' step of the routine of FIG. 12—e.g. by analyzing USB endpoint data or other 'peripheral device descriptive data.' in commands that are encoded by the host device and sent to the peripheral device include but are not limited to: AT protocol(s), Nokia fBus Protocol(s), OBject EXchange (OBEX) protocol(s), block-type mass-storage protocol(s), Qualcom BREW OS protocol(s), a mediate transfer protocol (MTP) of Microscoft®, RIM® OS proprietary protocol(s), a Android Debug Bridge (ADB) protocol(s), Apple® IOS proprietary protocol(s), Synchronization Markup Language (SyncML) protocol(s), remote application programming interface (RAPI) over Remote Network Driver Interface Specification (RNDIS) protocol), SIM card protocol.

Once a vendor and/or model and/or chipset family ID is 'known,' it is possible to select the 'correct protocol' according to the ID information, and to then, in accordance with this information, encode one or more commands by the host device.

Command sequences may include commands of different protocols, and this information may also be used for 'switching protocols.'

Table of Commonly Used Protocols

| # | Protocol(s) Name | Description |
|---|---|---|
| 1 | AT command | Textual modem protocol, extended over the years with numerous domain-commands, e.g. CDMA related commands, GSM related commands. |
| 2 | Nokia FBus | Binary protocol for Nokia phones |
| 3 | OBEX | A binary object exchange protocol. |
| 4 | Block-type mass storage protocol | USB MSD standard sector-based protocol (SCSI over USB) In LG devices, it is possible to change the phone's state from mass-storage to modem |
| 5 | Qualcomm BREW | Binary protocols for devices using Qualcomm's chipset. |
| 6 | MTP | Media transfer protocol, defined by Microsoft. |
| 7 | RIM proprietary | RIM proprietary binary protocol for Blackberry devices. Works with OS4, OS5, OS6. |
| 8 | Android adb | Android Debug Bridge, a proprietary Google protocol for Android devices. |
| 9 | Apple proprietary protocols | Apple proprietary protocols, varying from low-level packet exchange to files exchange and PIM sync. |
| 10 | SyncML | Data synchronization protocol. It is also possible to to access configuration database and configure phone (Symbian). |
| 11 | RAPI over RNDIS | Microsoft proprietary Remote Procedure Call protocol and Ethernet-over-USB protocol. Used by ActiveSync. |
| 12 | SIM Card | Standard object exchange protocol with the SIM card. |
| 13 | Android Fastboot | A protocol used to update the flash file system in Android devices over USB, and diagnose the device. |
| 14 | LG proprietary protocol | A binary object exchange protocol for LG devices. |

The term 'routing' includes associating a command with 'addressing information' indicating to the peripheral device a particular 'target' device of a plurality of the 'candidate devices' of the composite device is 'supposed to' execute a command. The routing does not require actually sending the command to the peripheral device (though it may include this). Once a command is 'routed' to a target, there is an association within computer memory (i.e. volatile and/or non-volatile memory) of the 'host' between (i) the command; and (ii) a 'target device' (i.e. USB interface descriptor) of the composite devices to which the command is addressed.

In the example of FIG. 13, it is possible to encode a command sequence of command(s) according to the results of the analysis.

In one particular example, the 'command encoding scheme' also relates to a particular protocol or protocol combination for the 'low level commands.' For example, the 'low level command protocol(s)' used by a Nokia Phone® may be different from the 'low level command protocol(s)' used by a Apple® phone. Protocols that should may be used Discussion of FIGS. 15-27

Figure 8:
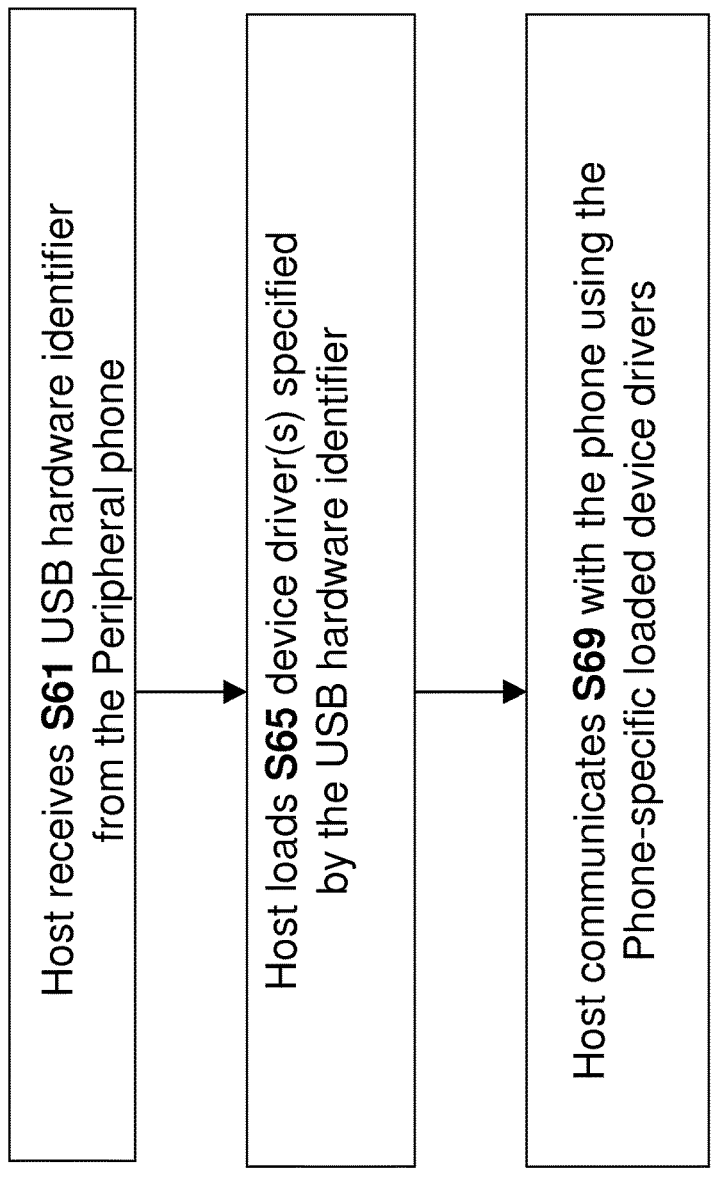

FIGS. 15-20 relate to specific examples related to the suppressing of the native OS behavior in step S203-S205 of FIG. 8. For example, the suppressing may be a general suppressing or may be contingent upon one or more additional factors such as input via a user interface (see FIG. 17) and/or other criteria (e.g. a time of the day, an identity of a code module which invoke USB hub driver, or any other factor). In some embodiments, for a first instance of USB hub driver code 134 within memory 120, the native behavior of FIG. 3B is not suppressed, and for a second instance, the native behavior is suppressed as described with reference to step S203.

It is now disclosed a host device comprising: a) a peripheral device port configured for coupling with a peripheral device; and b) electronic circuitry configured, to automatically classify the mobile phone so as to specify a surrogate device command:phone command mapping scheme specific for the coupled mobile phone, wherein the electronic circuitry of the host device is operative to: i) to distinguish between a plurality of USB interface-identical-endpoint-different phones without carrying out any application-level queries, the USB interface-identical-endpoint-different phones having USB fingerprint data that is identical at the interface descriptor level but different at the endpoint descriptor level; and/or ii) to distinguish between a plurality of USB fingerprint identical phones by carrying out at most one application-level query, the USB fingerprint identical phones having USB fingerprint data that is identical at both the interface descriptor level as well as at the endpoint descriptor level.

A Discussion of FIGS. 22-27

Figure 22:
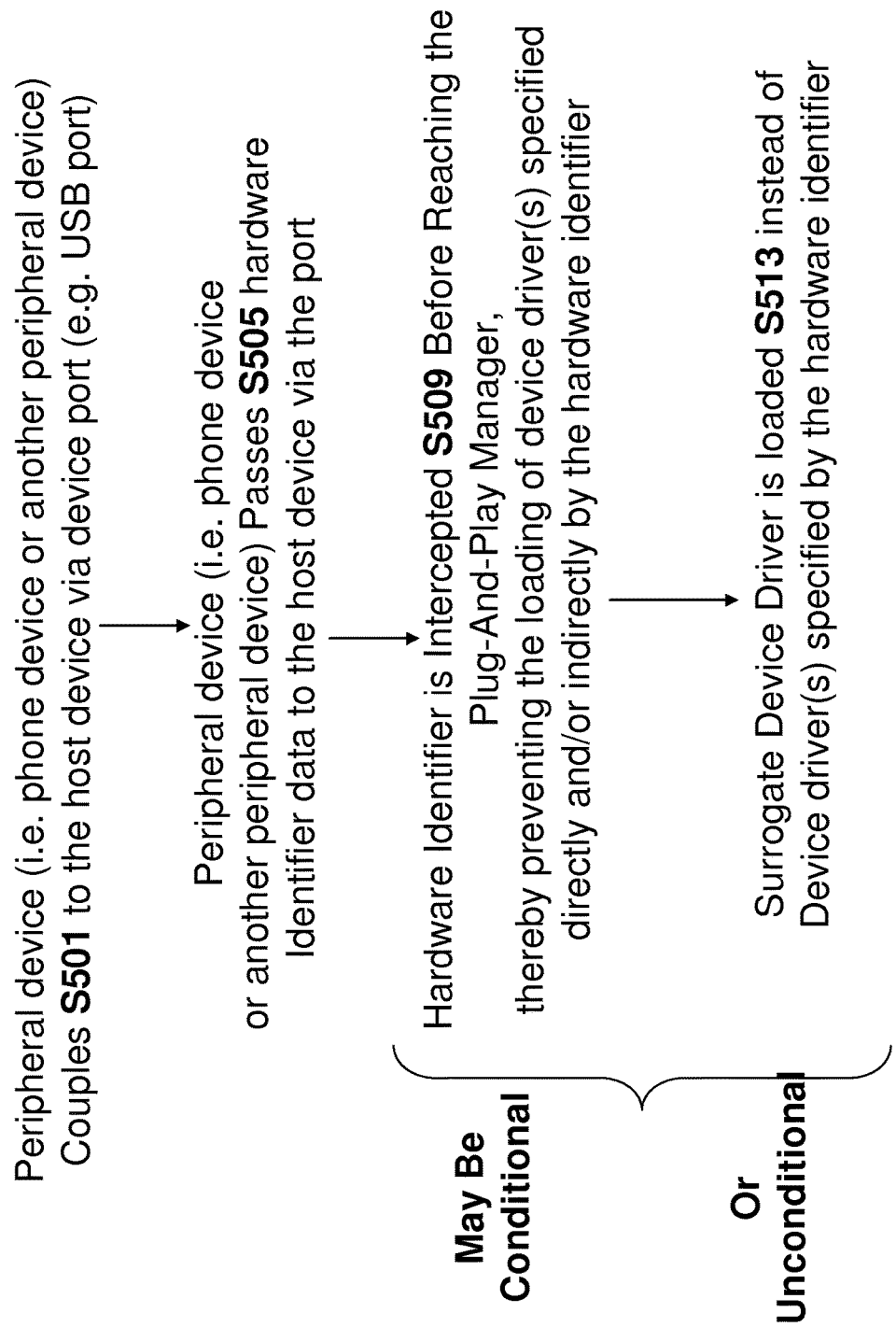

FIG. 22 is a routine for operating a host device 100 coupled to any peripheral device (including but not limited to a phone device) in accordance with some embodiments. In step S501, the peripheral device couples to the host device (e.g. via a USB port). In step S505, the peripheral device passes HW identifier data (e.g. USB class data or vendor ID or other HW identifier data) to host device 100 via ports 210, 220 (see step S21 of FIG. 1B, see step S31 of FIG. 1D, see step S101 of FIG. 4A, see step S201 of FIG. 8).

In the event that 'normal OS' behavior prevails, host device 100 allows the data passed in step S505 to reach plug-and-play-manager 144 (for example executing USB hub driver code 134 relays the HW identifier data of step S505 to plug and play manager 144) and/or host device 100 responds to the data passing of step S505 by loading drivers specified directly or indirectly by the specified HW data. (see FIGS. 1B, 1D and 4A).

Figure 19:
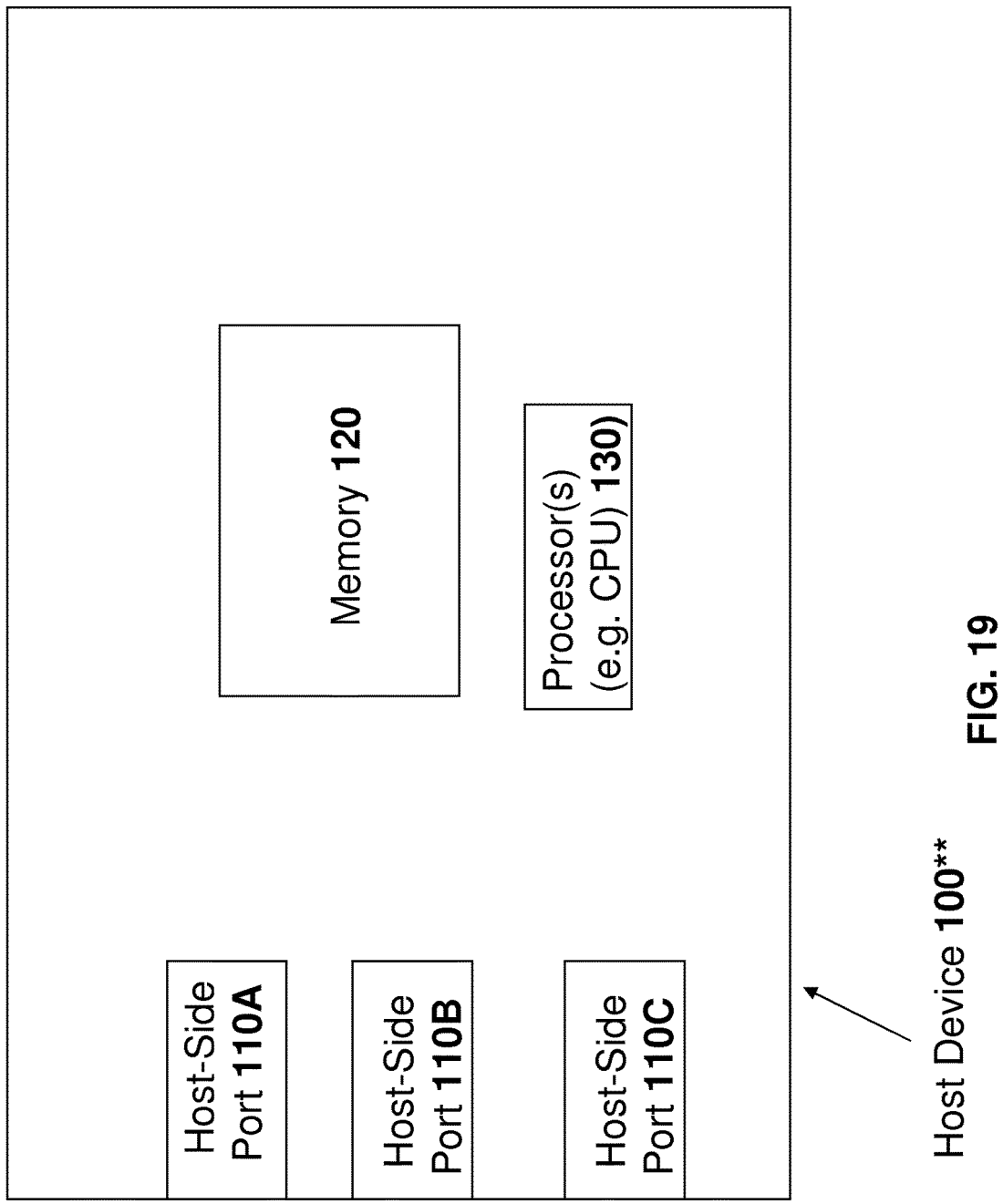
Figure 20:
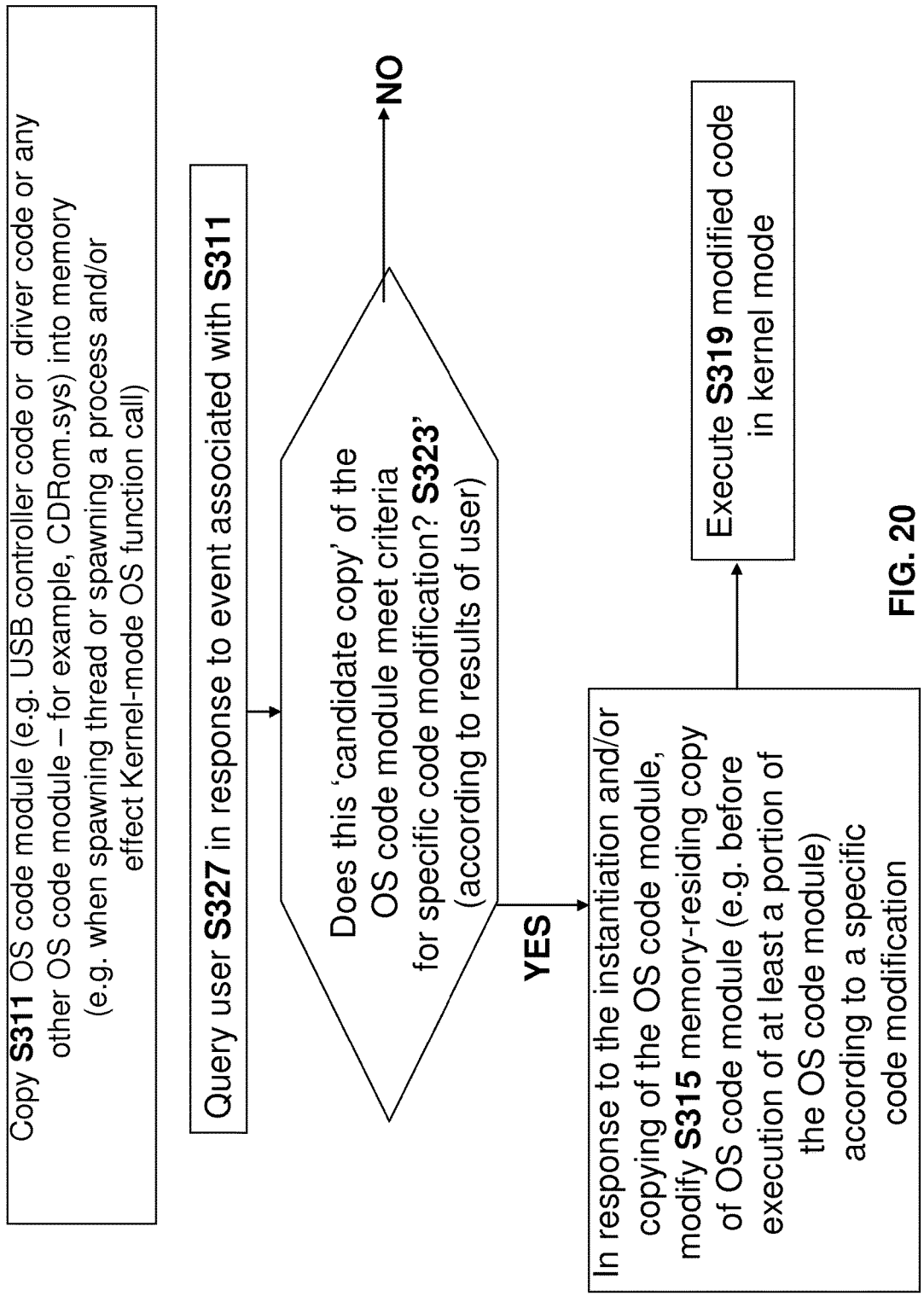
Figure 21:
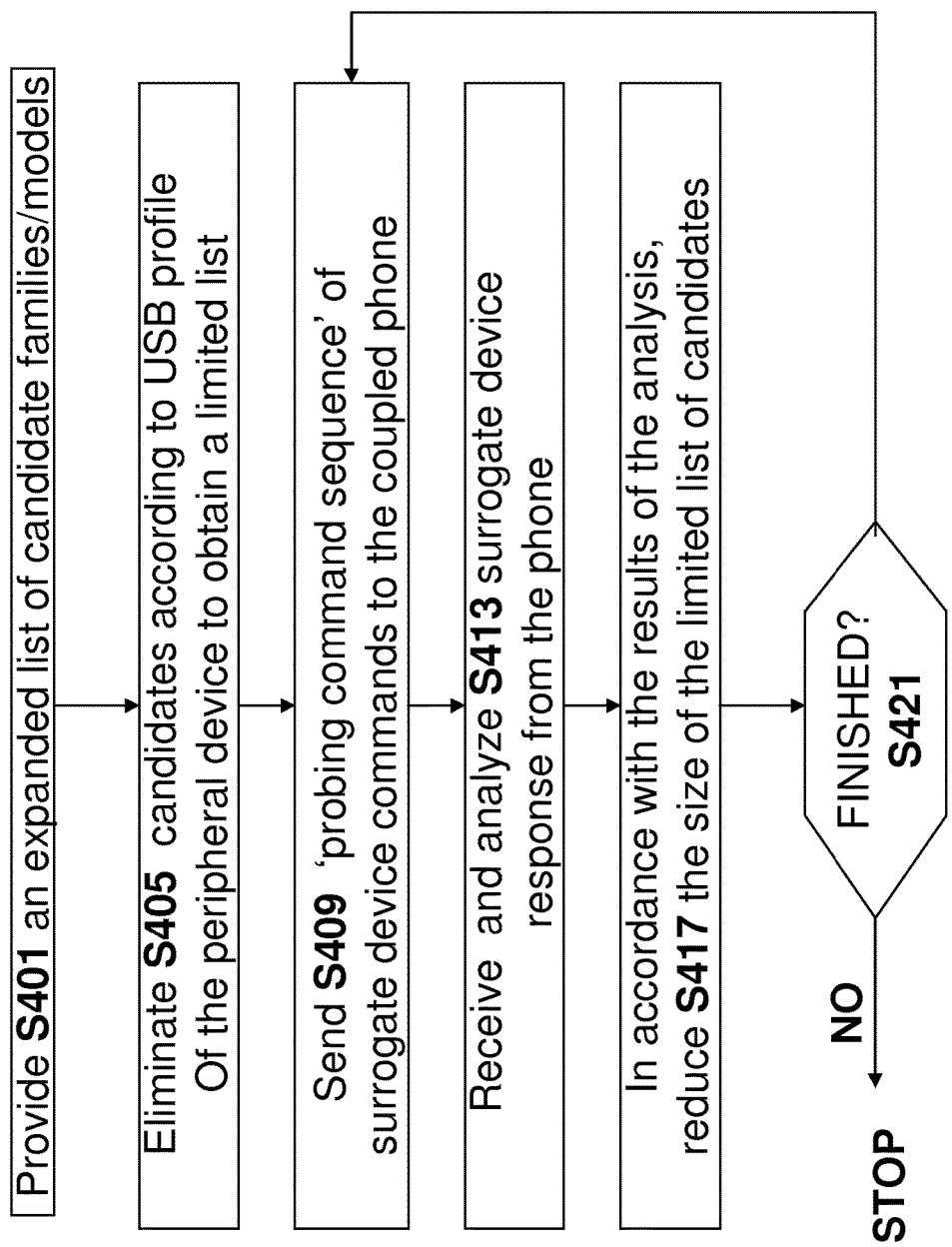

In FIG. 19, however, host device 100 provides a different behavior. In FIG. 19, the HW identifier received in step S505 is NOT passed to plug and play manager 144 (e.g. USB hub driver code 134 intercepts the HW identifier data en route to the plug and play manager—e.g. a 'surrogate device identifier is passed instead of the HW identifier data). This prevents the loading of the device drivers specified by the HW identifier.

In step S513, a surrogate device driver is invoked and/or loaded instead of the device driver(s) specified directly or indirectly by the HW identifier received in step S505.

One example of step S509-S513 is illustrated in FIG. 8, for one specific case relating to mobile phone devices coupled as peripherals.

In some embodiments, the routine of FIG. 22 is carried out by non-OS code executing on the host device.

In some embodiments, the 'behavior' of steps S509-S513 is not 'absolute' but, instead is 'conditional.'

In one example, (i) every hour during the first half of the hour (i.e. between 0:00-0:30, between 1:00-1:30, between 2:00-2:30, etc), host device 100 implements steps S509-S513 of FIG. 19 so that the HW identifier is blocked from reaching plug-and-play-manager 144 while (i) every hour during the second half of the hour (i.e. between 0:31-0:59, between 1:31-1:59, between 2:31-2:59, etc), host device 100 does not carry out step s509-S513, and instead provides 'native behavior' whereby the HW identifier reaches the plug and play manager 144 (step S525 of FIG. 20) and/or device driver(s) specified by the HW device identifier received by host device 100 from peripheral device 200 in step S505 of FIG. 19 are loaded on the host side (step S529).

In another example: on certain occasions, it is desired to upgrade the firmware of the attached phone. It is possible to rely on vendor's application and drivers to run on host to perform this action. It is possible to therefore temporarily expose the true hardware identity, allowing the vendor's drivers to load, and its firmware software to function properly. Then we replace the identity with our own "fake".

Thus, in some embodiments, steps S509 and/or S513 are 'contingent' upon some condition being met—when the condition is met, steps S509 and/or S513 are carried out. Otherwise, the 'native OS' behavior may be observed in steps S525 and/or S529.

One example relating to 'contingent' suppressing of the 'native OS' code (i.e. by carrying out steps S509 and/or S513 is illustrated in FIG. 21A. When peripheral device 200 is connected to host 100 'directly,' the 'blocking condition' of step S521 is met and the 'YES' option leaving S521 is adopted. However, it is possible to provide a 'mediating device 298' (e.g. either externally or within the housing of the housing of the host device) such that when a peripheral 200 coupled to the host 100 via the mediating device 298, the blocking condition is NOT met and it is possible to 'override' the behavior of steps S509 and/or S513 (e.g. thus the 'NO' option leaving S521 is adopted).

Figure 24A:
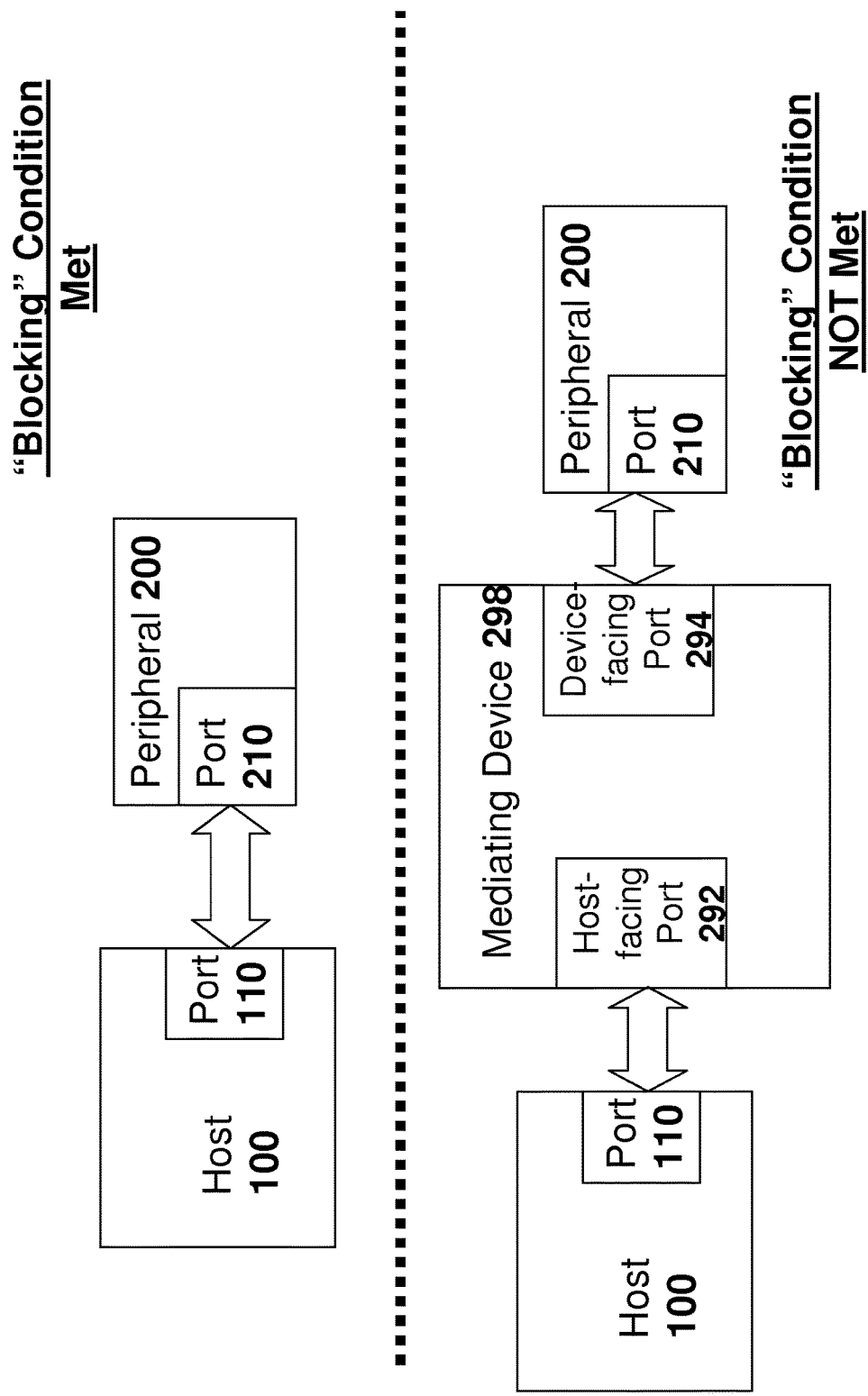
Figure 24B:
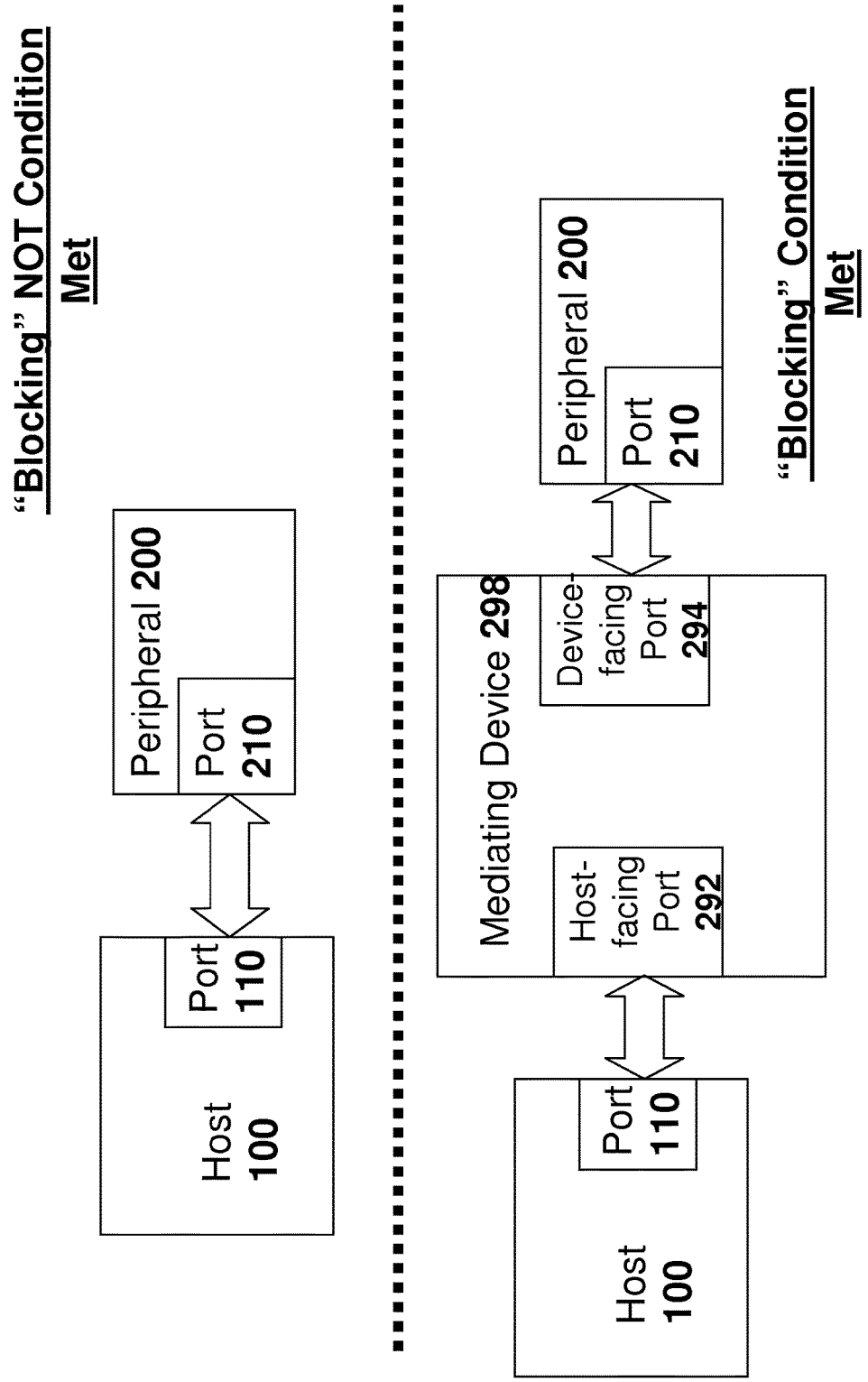
Figure 24C:
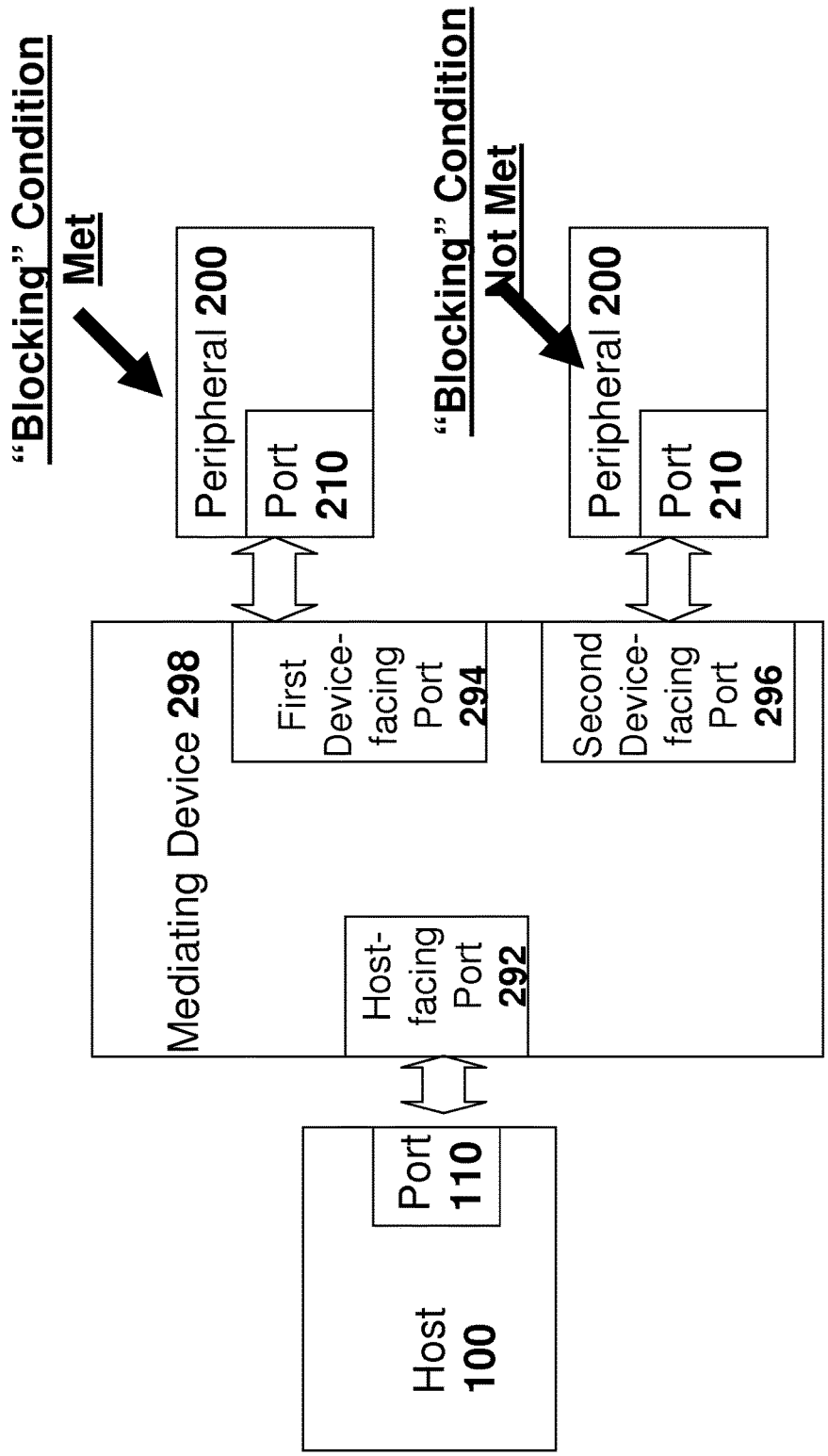

FIGS. 24A-C illustrate other configurations. In FIG. 24B, when the peripheral 200 (i.e. phone or another peripheral) is coupled to the host NOT via mediating device 298), the host together with port 110 behaves according to the 'YES' option leaving S521 providing a 'default' to override the 'native OS' behavior and to suppress the passing of the hardware ID (i.e. provided by the peripheral device 200—i.e. phone device or any other device—to the host device) to plug-and-play manager 144. Alternatively, when the peripheral 200 (i.e. phone or another peripheral) is coupled to the host via mediating device 298, then the host 100 together with port 110 behaves according to the 'NO' option leaving S521 to provide 'native OS' behavior.

Figure 25:
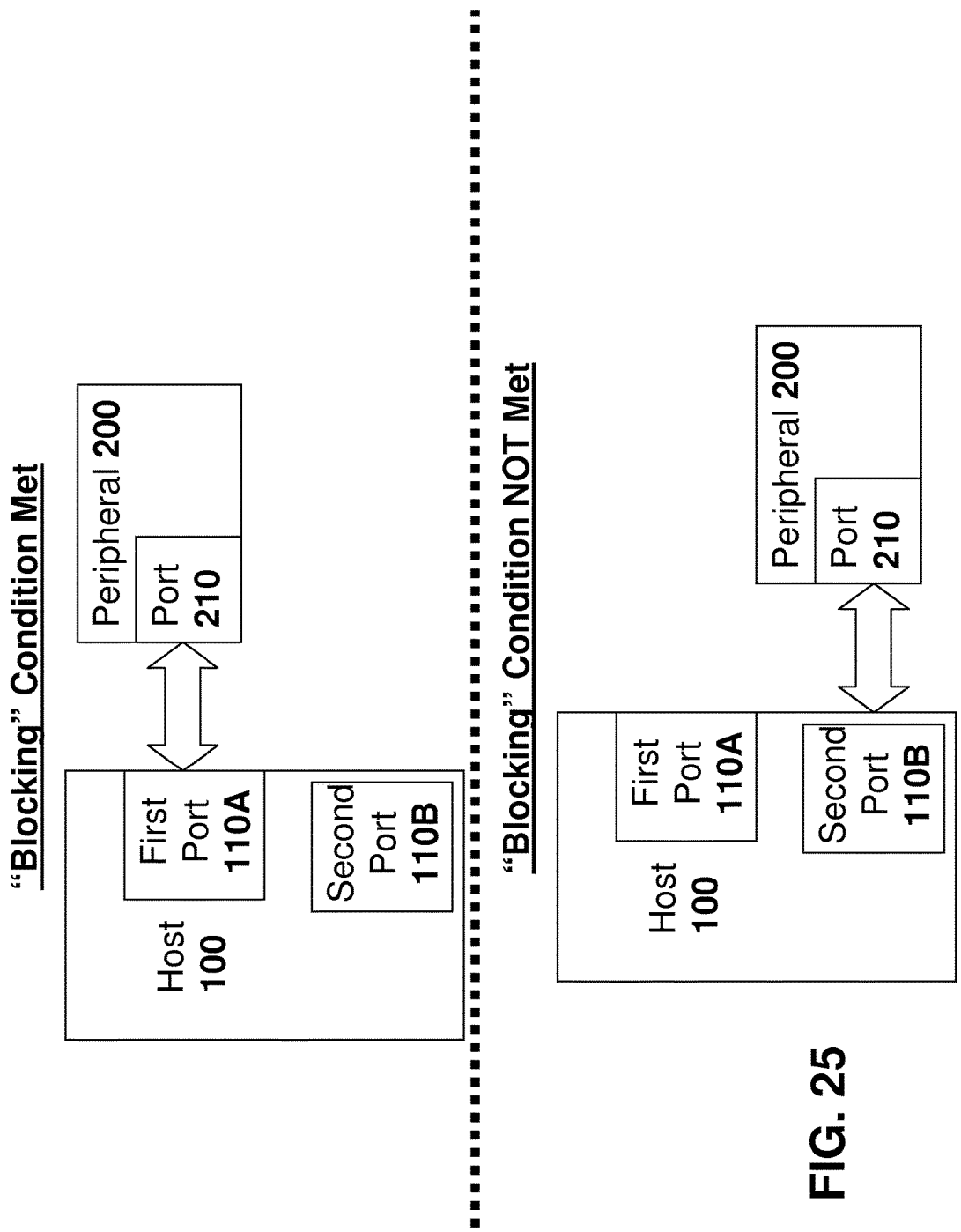
Figure 26A:
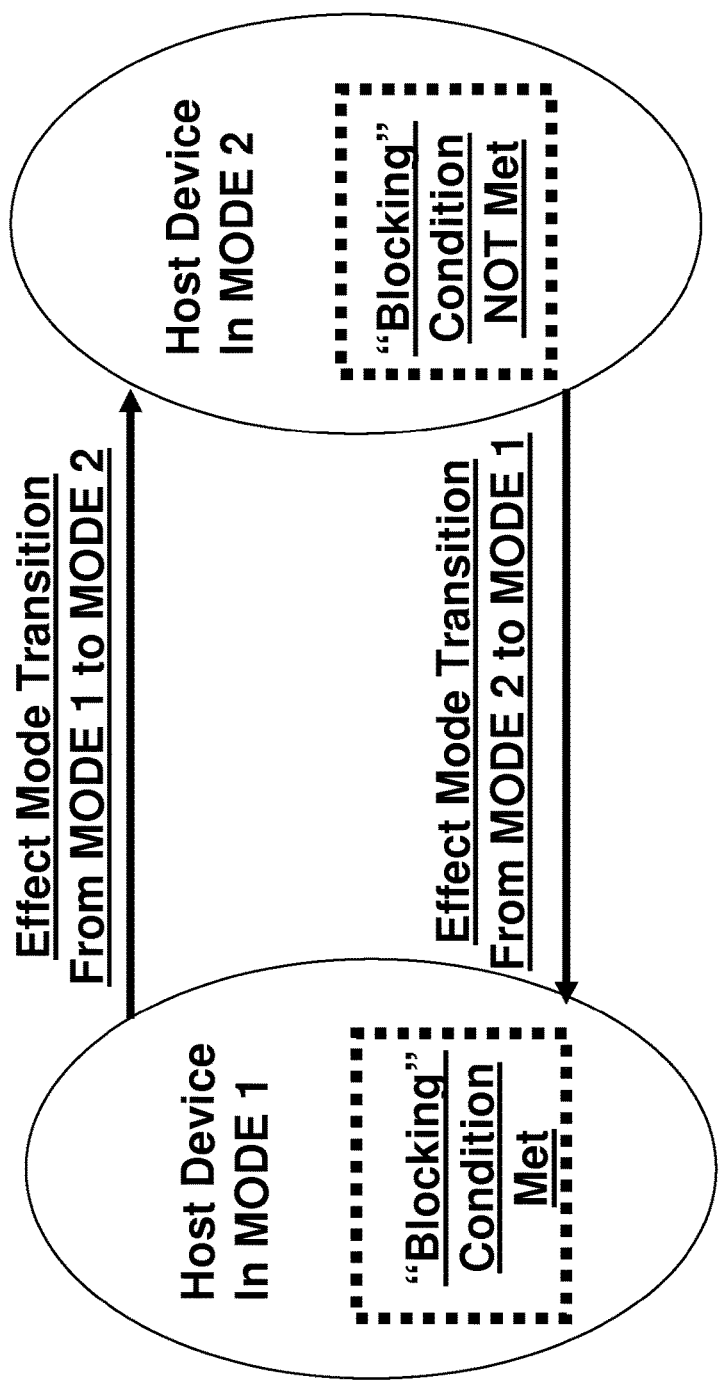
Figure 26B:
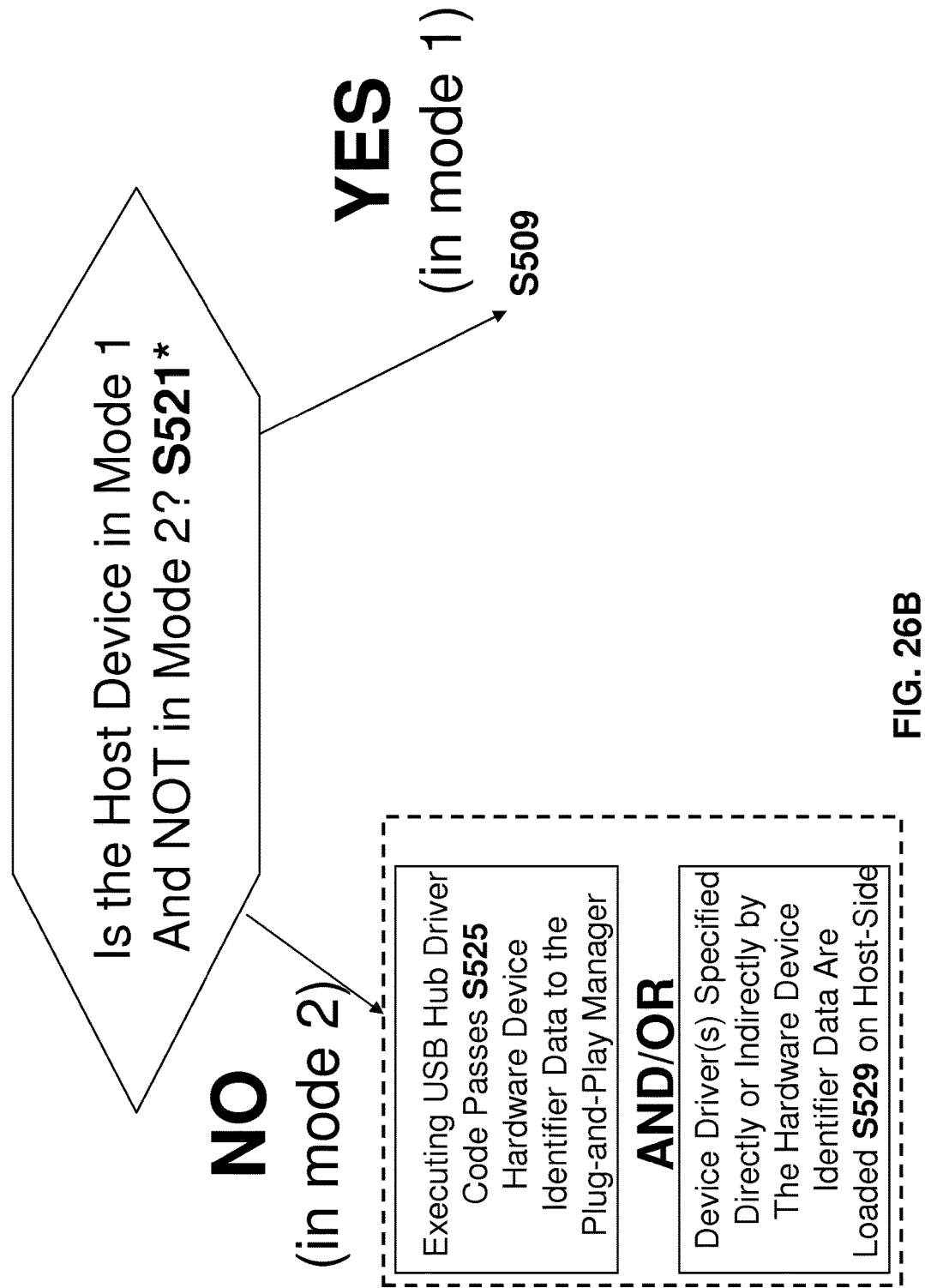

In FIG. 25, host device 100 has a plurality of ports. When the peripheral device 200 (i.e. phone or another peripheral) is coupled to the host via the first port 110A (e.g. USB port), the host 100 together with port 110A behaves according to the 'YES' option leaving S521 providing a 'default' to override the 'native OS' behavior and to suppress the passing of the hardware ID (i.e. provided by the peripheral device 200—i.e. phone device or any other device—to the host device) to plug-and-play manager 144. Alternatively, when the peripheral 200 (i.e. phone or another peripheral) is coupled to the host via the second host-side port 110B, then the host 100 together with port 110B behaves according to the 'NO' option leaving S521 to provide 'native OS' behavior.

In one example, a father and his young children share a single desktop or laptop computer 110 (e.g. or any other host)—during work hours, the father uses the computer for work purposes while during other the young children use the computer for 'leisure' purposes. In this example, the father's job requires him to copy content between mobile phones often—in this case, there may be a mechanical lock on the first port 110A, while the second port 110B will be freely-accessible to his children. During work hours, the father unlocks the first port 110A and uses the port to enjoy 'phone-related' functionality when the flow to the plug-and-play manager 144 is suppressed (e.g. see S509 and/or S513). During the 'off-hours,' the children can freely connect peripheral devices via the second port 110B and enjoy the 'benefits' of native OS behavior.

In another example (see FIG. 26A), the host device may provide two modes. In one non-limiting example, in the 'first half' of every hour, the host device may be in host device mode 1, while in the second half of every hour, host device 100 may be in host device mode 2.

Figure 23:
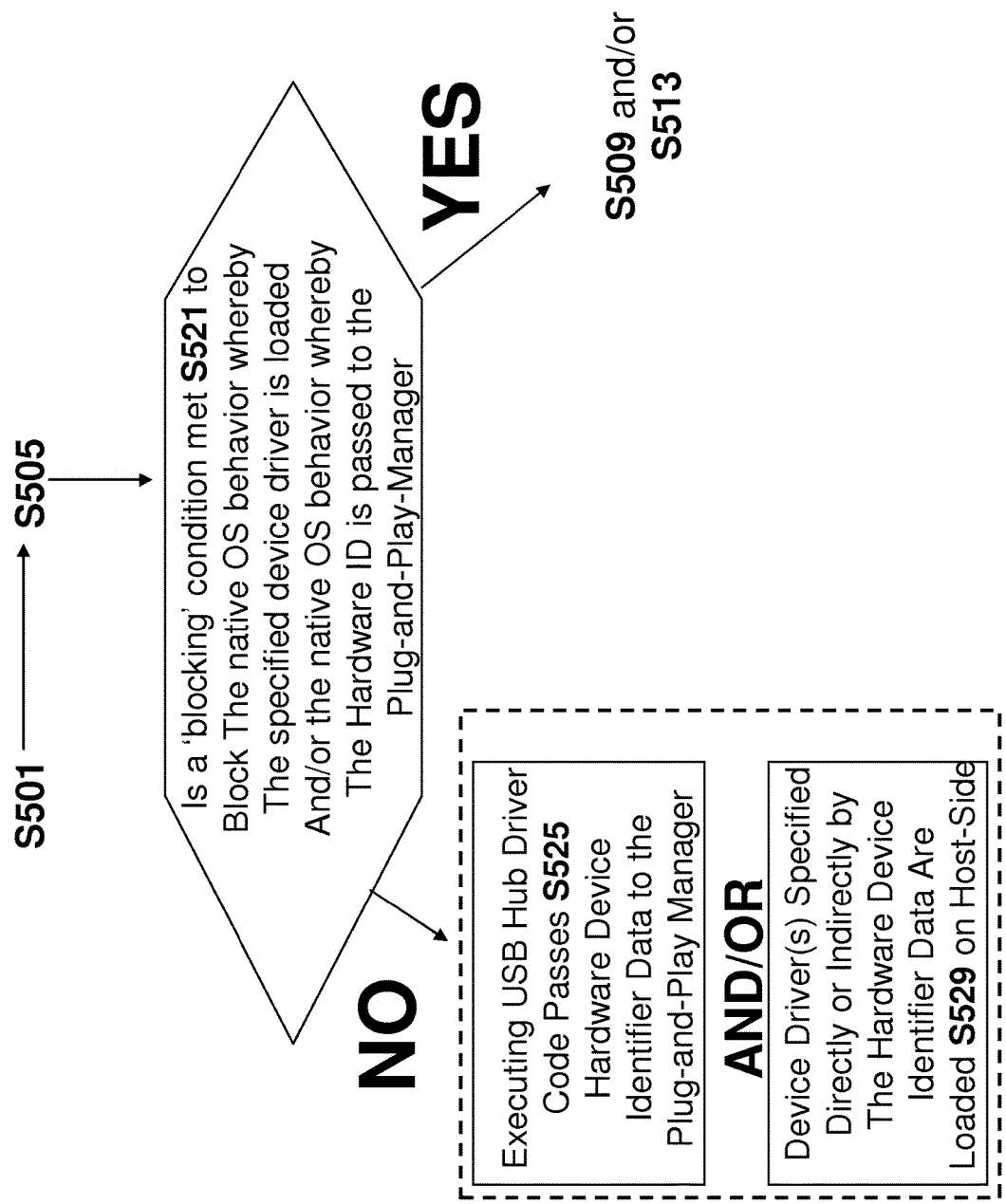

In another example, if a user named 'Joe Smith' is logged into host device 100, the device is in 'mode 1' where the 'native OS behavior' is suppressed—otherwise, the device is in 'mode 2.' In one non-limiting use case, Joe Smith may be a 'special' user who has a need for the OS-overriding behavior (for example, Joe Smith has a business copying content between multiple phones) while for other users (for example, Joe Smith's children who may use the machine for more 'conventional' purposes) the 'native OS' behavior prevails (i.e. in MODE 2 of FIG. 23).

Figure 27:
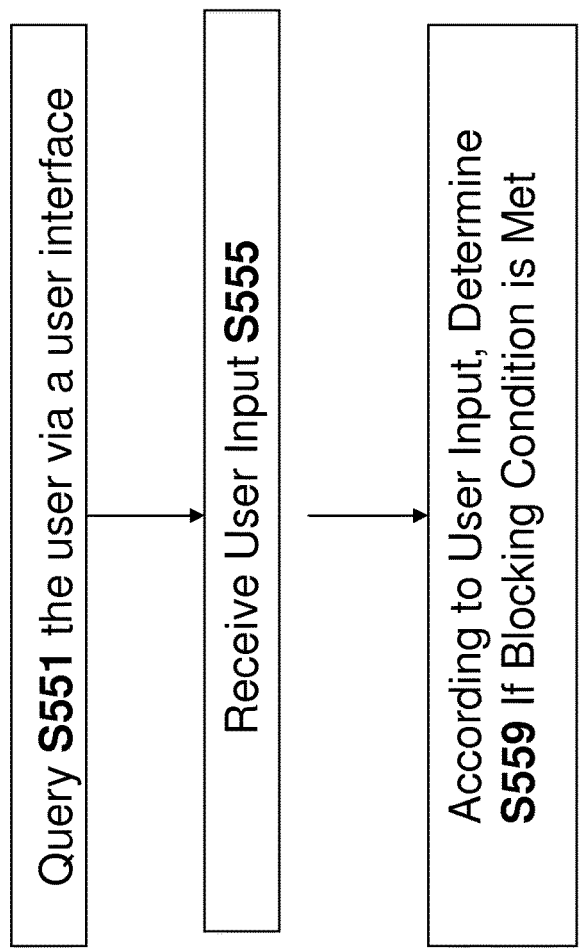

In the example of FIG. 27, it is possible, in response to the coupling of step S501, to query the user (e.g. visually or orally—e.g. to present an 'input box' or any other user interface element for receiving user input) to ascertain if the user wants to override 'native OS' behavior and carry out step S509, or to allow the host to provide 'native OS' functionality of steps S525 and/or S529.

This is shown in FIG. 27. For example, the user input S555 may be received via keyboard or mouse or touchscreen or any other way known in the art.

It is now disclosed a method of operating a host device on which operating system (OS) software is executing, the method comprising the steps of: contingent upon the host device being in a first mode, responding to a coupling between a peripheral device and a host device so that the peripheral device passes hardware identifier information to the host device directly or indirectly specifying device driver(s) by preventing the hardware identifier information from reaching an executing plug-and-play-manager of the OS executing on the host side, wherein the method is carried out on a host device that mutually-exclusive provides first and second modes, and wherein the method is carried out contingently on the host device being in the first mode and not in the second mode.

In some embodiments, the method further comprises: responding into a user log-in event or user attempted-log-in event by transitioning the host device mode from one of the first and second modes to the other of the first and second modes.

In some embodiments, the method further comprises: in accordance with content of user input received from a user into the host device, transitioning the host device mode from one of the first and second modes to the other of the first and second modes.

It is now disclosed a method of operating a host device on which operating system (OS) software is executing, the method comprising: a) responding to a coupling between a peripheral device and a host device so that the peripheral device passes hardware identifier information to the host device directly or indirectly specifying device driver(s) by soliciting user input; b) receiving user input into the host device from the user; c) in accordance with the contents of the user input, operating the host device in a first mode or in a second mode; and d) only if the host device is operating in the first mode, preventing the hardware identifier information from reaching an executing plug-and-play-manager of the OS executing on the host side.

Another embodiment relates to a "partial" mode. If the coupled peripheral device is a composite device, namely exposing more than one interface, we can selectively expose any combination of interfaces to the PnP Manager. We can change it dynamically. We have control over the other interfaces. Example: in many environments blocking mass storage devices is desirable, to avoid virus infection or to prevent data theft. Up to now, it required inhibiting the USB port completely. But we can selectively block the interface. Let's assume a phone exposes a Modem interface and a Mass Storage interface. We hide the Mass Storage interface, but keep the modem interface working.

CONCLUSION

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A method of retrieving cell-phone related data by a host device from a peripheral cell phone device that is coupled to the host device via a USB (Universal Serial Bus) port, the method comprising: a. receiving USB endpoint descriptor data by the host device from the peripheral cell phone device that is coupled to the host device via the USB port; b. analyzing the received USB endpoint descriptor data by the host device; and c. in a manner determined by the results of the analysis of the USB endpoint descriptor data, retrieving by the host device from the peripheral cell phone device at least one of:
    A. one or more SMS (Short Message Service) messages;
    B. a cell phone log or a portion thereof; C. one or more cell phone-address-book entries; and D. an IMEI (International Mobile Station Equipment) or ESN (Electronic Serial Number) or MEID (Mobile Equipment Identifier) hardware identifier, wherein: i. the method further comprises maintaining, on the host side, a description of a mapping between USB endpoint data and cell-phone identifier data, the cellphone identifier data specifying at least one of a vendor name, a model number or a chipset family ID associated with the peripheral cell phone device; and ii. the analyzing of the received USB endpoint descriptor data by the host device is performed according to the description of the mapping.

2. The method of claim 1 wherein steps (b) and (c) are carried out in accordance with the combination of the USB endpoint descriptor data and data of higher levels in the USB descriptor hierarchy.

3. The method of claim 1 wherein steps (b) and (c) are carried out in accordance with the USB endpoint descriptor data without influence by data of higher levels in the USB descriptor hierarchy.

4. The method of claim 1 wherein the one or more SMS messages are retrieved by the host device from the peripheral cell phone in a manner determined by the results of the analysis of the USB endpoint descriptor data.

5. The method of claim 1 wherein the cell phone log or the portion thereof are retrieved by the host device from the peripheral cell phone in a manner determined by the results of the analysis of the USB endpoint descriptor data.

6. The method of claim 1 wherein the one or more cell phone-address-book entries are retrieved by the host device from the peripheral cell phone in a manner determined by the results of the analysis of the USB endpoint descriptor data.

7. The method of claim 1 wherein the retrieving an IMEI or ESN or MEID hardware identifier is retrieved by the host device from the peripheral cell phone in a manner determined by the results of the analysis of the USB endpoint descriptor data.

8. The method of claim 1 wherein the analysis includes comparing the USB endpoint descriptor data to contents of a database so as to specify at least one of (i) a phone vendor name; (ii) a phone model name; (iii) phone hardware and/or software resources; and (iv) phone protocol features.

9. The method of claim 8 wherein the host device retrieves from the peripheral cell phone device, in a manner determined by the results of the analysis of the USB endpoint descriptor data and via the USB interface, at least one:
   A. one or more SMS messages;
   B. a cell phone log or a portion thereof;
   C. one or more cell phone-address-book entries; and
   D. an ESN or MEID hardware identifier.

10. The method of claim 1 further comprising: before the retrieving by the host device and while OS software continues to execute on the host device, the host device prevents the loading of drivers specified directly or indirectly by hardware identifier data received by the host from the peripheral phone device.

11. The method of claim 10 wherein i. the method further comprises maintaining, on the host side, a description of a mapping between USB endpoint data and cell-phone identifier data, the cellphone identifier data specifying at least one of a vendor name, a model number or a chipset family ID associated with the peripheral cell phone device; and ii. the analyzing of the received USB endpoint descriptor data by the host device is performed according to the description of the mapping.

12. The method of claim 1 wherein: i. upon coupling between the peripheral cell-phone device and the host, the host device receives device identifier data from the peripheral device via the USB port; ii. the method further comprises preventing the loading, into host-device memory, of drivers specified directly or indirectly by the device identifier data by: A. intercepting, on the host side, the device identifier data en route to a plug-and-play manager executing on the host, thereby preventing receipt by the plug-and-play manager of the device identifier data received from the peripheral cell-phone device; and B. replacing the device identifier data with substitute hardware identifier data different from the intercepted device identifier.

13. The method of claim 12 wherein instead of the drivers specified directly or indirectly by the device identifier data received from the peripheral cell-phone device, the host device:
   i. loads one or more substitute drivers; and
   ii. communicates with the peripheral cell-phone device using the loaded one one or more substitute drivers.

14. The method of claim 12 wherein the intercepting is performed on the host device by a proxy driver or by modified OS code executing on the host device.

15. A host device comprising: a) a USB (Universal Serial Bus) interface operative for inter-device coupling with a peripheral cell phone device; and b) electronic circuitry configured to: i. receive, via the USB interface and from the peripheral cell phone device that is coupled to the host device via the USB port, USB endpoint descriptor data; ii. analyze the received USB endpoint descriptor data; and
   iii. in a manner determined by the results of the analysis of the USB endpoint descriptor data, retrieve via the USB interface, from the peripheral cell phone device, at least one of:
   A. one or more SMS (Short Message Service) messages;
   B. a cell phone log or a portion thereof;
   C. one or more cell phone-address-book entries; and
   D. an IMEI (International Mobile Station Equipment) or ESN (Electronic Serial Number) or MEID (Mobile Equipment Identifier) hardware identifier, wherein the electronic circuitry is further configured to: i. maintain, on the host side, a description of a mapping between USB endpoint data and cell-phone identifier data, the cell-phone identifier data specifying at least one of a vendor name, a model number or a chipset family ID associated with the peripheral cell phone device; and ii. perform the analyzing of the received USB endpoint descriptor data by the host device according to the description of the mapping.

16. The host device of claim 15 wherein the electronic circuitry is configured to carry out the steps (ii) and (iii) in accordance with the combination of the USB endpoint descriptor data and data of higher levels in the USB descriptor hierarchy.

17. The host device of claim 15 wherein the electronic circuitry is configured to carry out the steps (ii) and (iii) in accordance with the USB endpoint descriptor data without influence by data of higher levels in the USB descriptor hierarchy.

18. The host device of claim 15 wherein electronic circuitry is configured so that the one or more SMS messages are retrieved by the host device from the peripheral cell phone in a manner determined by the results of the analysis of the USB endpoint descriptor data.

19. The host device of claim 15 wherein electronic circuitry is configured that the cell phone log or the portion thereof are retrieved by the host device from the peripheral cell phone in a manner determined by the results of the analysis of the USB endpoint descriptor data.

20. The host device of claim 15 wherein the electronic circuitry is further configured to perform the analysis by comparing the USB endpoint descriptor data to contents of a database so as to specify at least one of (i) a phone vendor name; (ii) a phone model name; (iii) phone hardware and/or software resources; and (iv) phone protocol features.

21. The host device of claim 15 wherein the electronic circuitry is further configured to respond to a coupling between the peripheral cell-phone device and the host device via the USB port so that the peripheral cell phone device passes hardware identifier information to the host device directly or indirectly specifying device drivers by executing code so as to prevent the executing OS software from loading the specified device drivers on the host device.

22. The host device of claim 21 wherein the electronic circuitry is configured to retrieve from the peripheral cell phone device, in a manner determined by the results of the analysis of the USB endpoint descriptor data and via the USB interface, at least one:
   A. one or more SMS messages;
   B. a cell phone log or a portion thereof;
   C. one or more cell phone-address-book entries; and
   D. an ESN or MEID hardware identifier.

23. A method of retrieving cell-phone related data by a host device from a peripheral cell phone device that is coupled to the host device via a USB (Universal Serial Bus) port, the method comprising: a. receiving USB endpoint descriptor data by the host device from the peripheral cell phone device that is coupled to the host device via the USB port;
  b. analyzing the received USB endpoint descriptor data by the host device; and
  c. in a manner contingent upon the results of the analysis of the USB endpoint descriptor data, retrieving by the host device from the peripheral cell phone device at least one of:
  A. one or more SMS (Short Message Service) messages;
  B. a cell phone log or a portion thereof;
  C. one or more cell phone-address-book entries; and
  D. an IMEI (International Mobile Station Equipment) or ESN (Electronic Serial Number) or MEID (Mobile Equipment Identifier) hardware identifier,
  wherein: i. upon coupling between the peripheral cellphone device and the host, the host device receives device identifier data from the peripheral device via the USB port; ii. the method further comprises preventing the loading, into host device memory, of drivers specified directly or indirectly by the device identifier data by: A. intercepting, on the host side, the device identifier data en route to a plug-and-play manager executing on the host,
  thereby preventing receipt by the plug-and-play manager of the device identifier data received from the peripheral cell-phone device; and B. replacing the device identifier data with substitute hardware identifier data different from the intercepted device identifier, and wherein instead of the drivers specified directly or indirectly by the device identifier data received from the peripheral cell-phone device, the host device: i. loads one or more substitute drivers; and ii. communicates with the peripheral cell-phone device using the one or more loaded substitute drivers.

24. The method of claim 23 wherein:
  i. the method further comprises maintaining, on the host side, a description of a mapping between USB endpoint data and cell-phone identifier data, the cellphone identifier data specifying at least one of a vendor name, a model number or a chipset family ID associated with the peripheral cell phone device; and ii. the analyzing of the received USB endpoint descriptor data by the host device is performed according to the description of the mapping.

25. The method of claim 23 wherein: i. the method further comprises maintaining, on the host side, a database describing a relation between USB endpoint descriptor data and information about specific phone models; and ii. the analyzing of the received USB endpoint descriptor data by the host device is performed according to the host-side database.

26. The method of claim 23 wherein the intercepting is performed on the host device by a proxy driver or by modified OS code executing on the host device.

27. The method of claim 23, wherein: i. the method further comprises maintaining, on the host side, a description of a mapping between USB endpoint data and cellphone identifier data, the cellphone identifier data specifying at least one of a vendor name, a model number or a chipset family ID associated with the peripheral cell phone device; and ii. the analyzing of the received USB endpoint descriptor data by the host device is performed according to the description of the mapping.

28. The method of claim 23, wherein the analysis includes comparing the USB endpoint descriptor data to contents of a database.

29. The method of claim 28, wherein the host device retrieves from the peripheral cell phone device, in a manner determined by the results of the analysis of the USB endpoint descriptor data and via the USB interface, at least one:
  A. one or more SMS messages;
  B. a cell phone log or a portion thereof;
  C. one or more cell phone-address-book entries; and
  D. an ESN or MEID hardware identifier.

30. The method of claim 23, wherein: i. the method further comprises maintaining, on the host side, a database describing a relation between USB endpoint descriptor data and information about specific phone models; and ii. the analyzing of the received USB endpoint descriptor data by the host device is performed according to the host-side database.

31. The method of claim 30, wherein the host device retrieves from the peripheral cell phone device, in a manner determined by the results of the analysis of the USB endpoint descriptor data and via the USB interface, at least one:
  A. one or more SMS messages;
  B. a cell phone log or a portion thereof;
  C. one or more cell phone-address-book entries; and
  D. an ESN or MEID hardware identifier.

* * * * *